United States Patent
Torii et al.

(10) Patent No.: US 6,575,277 B1
(45) Date of Patent: Jun. 10, 2003

(54) CLUTCH AND DRIVE DEVICE HAVING THE CLUTCH

(75) Inventors: Katsuhiko Torii, Hamamatsu (JP); Hiroaki Yamamoto, Kosai (JP); Shinji Oka, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/762,118

(22) PCT Filed: Aug. 3, 1999

(86) PCT No.: PCT/JP99/04158

§ 371 (c)(1), (2), (4) Date: Feb. 1, 2001

(87) PCT Pub. No.: WO00/08349

PCT Pub. Date: Feb. 17, 2000

(30) Foreign Application Priority Data

| Aug. 3, 1998 | (JP) | 10-219050 |
| Dec. 22, 1998 | (JP) | 10-364594 |
| Apr. 16, 1999 | (JP) | 11-109495 |
| Apr. 19, 1999 | (JP) | 11-110805 |

(51) Int. Cl.⁷ ............................................. F16D 41/06
(52) U.S. Cl. .................... 192/12 B; 192/223.2
(58) Field of Search ................. 192/12 R, 12 B, 192/15, 223, 223.2; 188/134

(56) References Cited

U.S. PATENT DOCUMENTS

| 3,554,337 A | * | 1/1971 | Denkowski | 192/223.2 |
| 3,693,770 A | * | 9/1972 | Charchian et al. | 192/30 W |
| 6,260,685 B1 | * | 7/2001 | Montanana | 192/223.2 |

FOREIGN PATENT DOCUMENTS

| JP | 40-11767 | 6/1940 |
| JP | 62-176526 | 11/1987 |
| JP | 01234651 | 9/1989 |
| JP | 3-112138 | 11/1991 |
| JP | 07-071491 | 3/1995 |
| JP | 07-103260 | 4/1995 |
| JP | 7-28239 | 5/1995 |
| JP | 08-200401 | 8/1996 |
| JP | 09-191608 | 7/1997 |
| JP | 11-051092 | 2/1999 |

OTHER PUBLICATIONS

International Search Report (PCT/JP99/04158).
International Preliminary Examination Report (PCT/JP99/04158).

* cited by examiner

Primary Examiner—Saul Rodriguez
(74) Attorney, Agent, or Firm—Patterson, Thuente, Skaar & Christensen

(57) ABSTRACT

A clutch comprises a driving rotor (11; 52; 83; 202; 302) coupled to a driving source (2) such as a motor, and a driven rotor (12; 53; 85; 204; 303) directly engaged with the driving rotor. Both rotors are accommodated in a housing (13; 51; 82; 201; 301). A lock member (14; 54; 86; 119; 205; 304) comprised of rollers or balls is located between the driven rotor and the housing. When the driven rotor itself is rotated, the lock member is held between the driven rotor and the housing to block the rotation of the driven rotor relative to the housing. When the driving source rotates the driving rotor, the lock member is released from the held state to allow the driving rotor to rotate the driven rotor relative to the housing. Such a clutch can block the transmission of the rotation from the driven rotor to the driving rotor without fail, and can reduce the strength required to both rotors.

44 Claims, 34 Drawing Sheets

Fig.6(a) Fig.6(b)
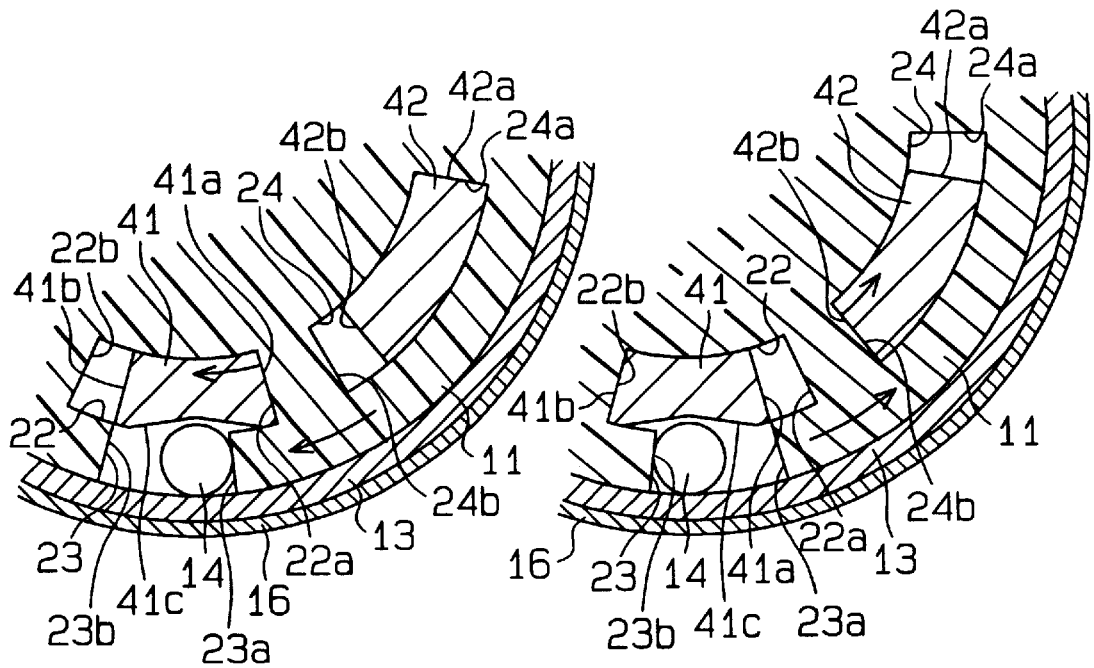
Fig.7(a) Fig.7(b)
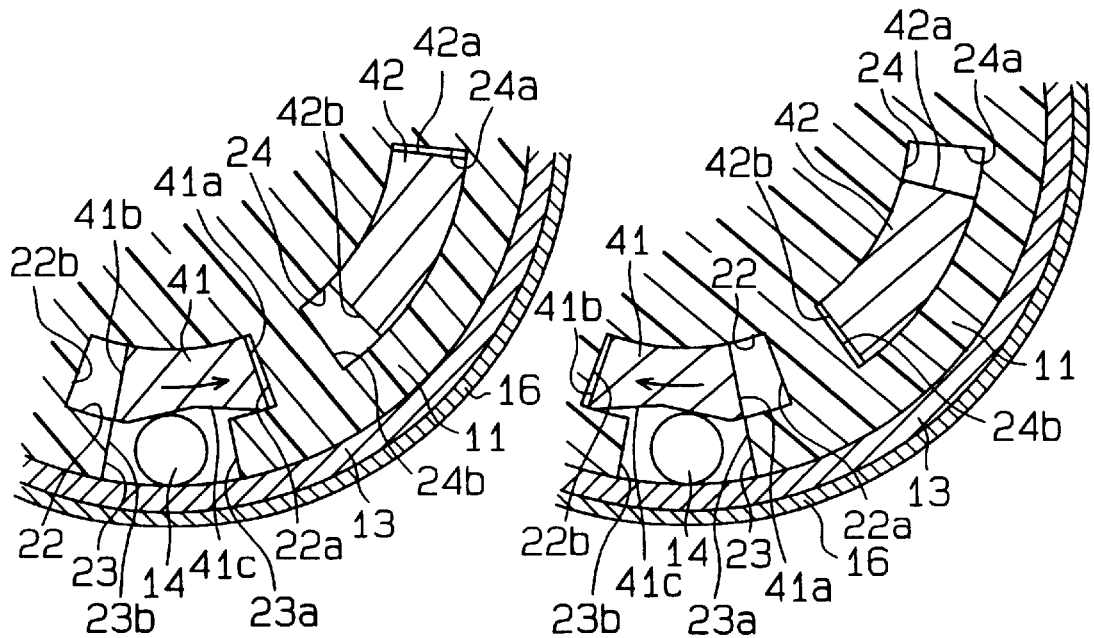

Fig. 35(a)
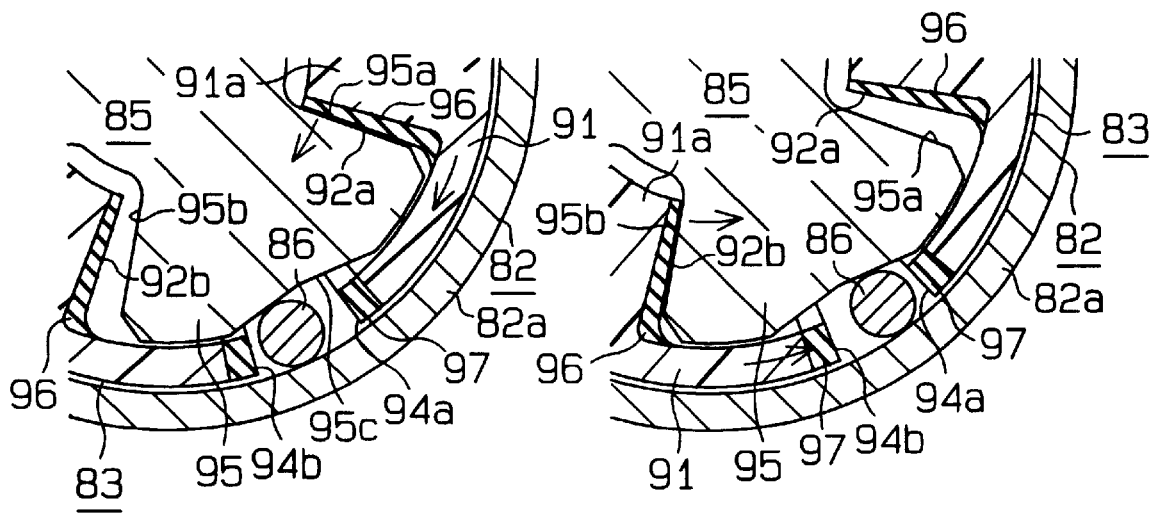
Fig. 35(b)
Fig. 36(a)
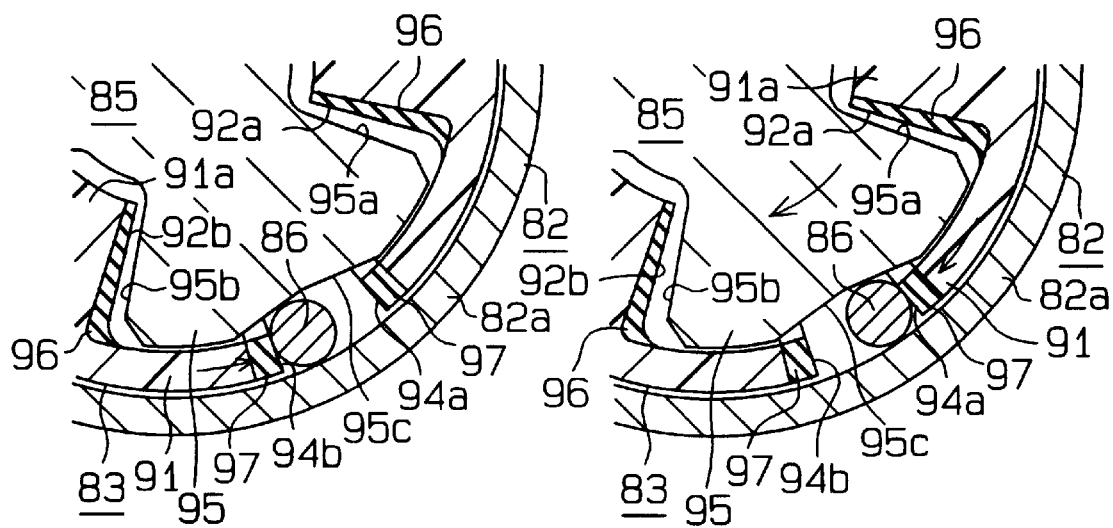
Fig. 36(b)

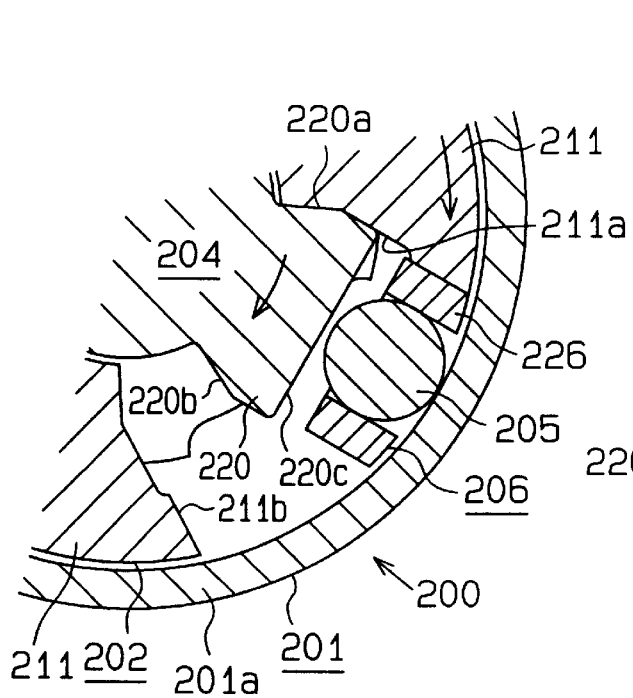
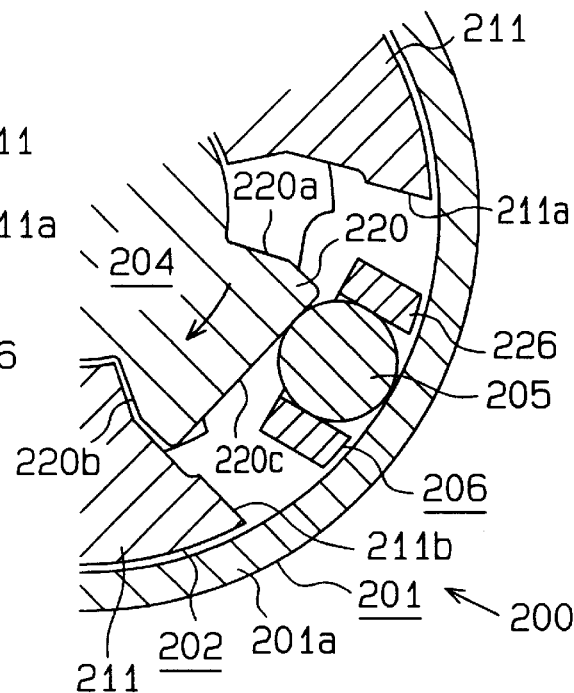
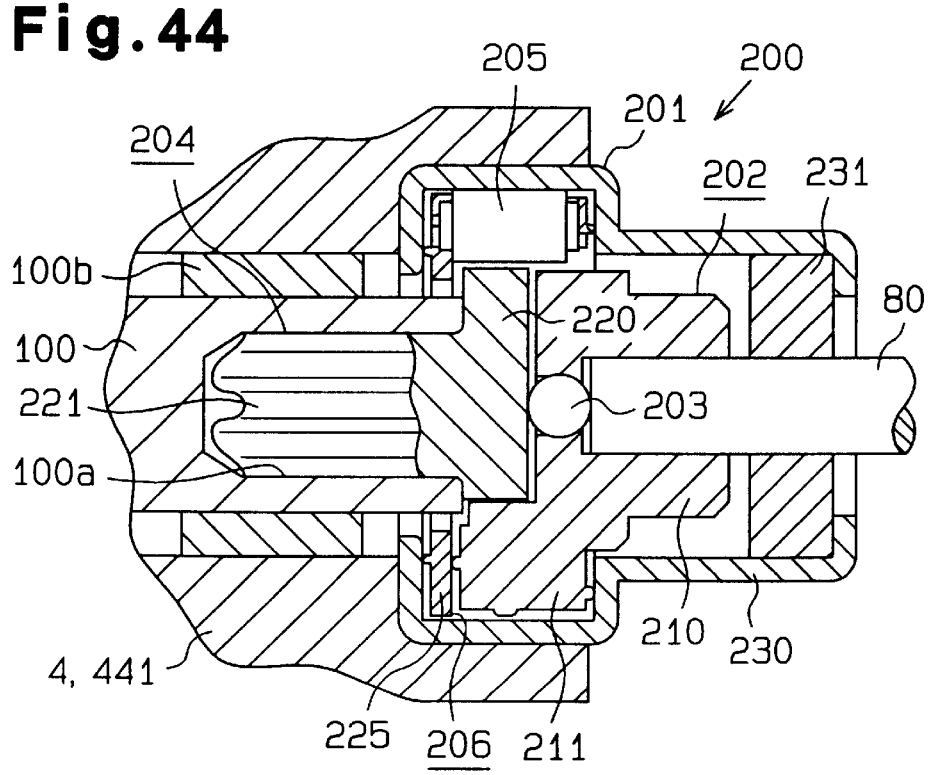

CLUTCH AND DRIVE DEVICE HAVING THE CLUTCH

BACKGROUND OF THE INVENTION

The present invention relates to a clutch comprising a driving rotor and a driven rotor, and more particularly, to a clutch for blocking the transmission of rotation from a driven rotor to a driving rotor and a driving apparatus equipped with the clutch.

A general power window apparatus comprises a driving apparatus serving as a driving source, and a driven device driven by the driving apparatus which moves a windowpane up and down, specifically, a lifting mechanism. The driving apparatus includes an output unit equipped with a gear mechanism. The rotation of the motor is transmitted to the lifting mechanism through the gear mechanism. The lifting mechanism converts the rotation of the motor to up/down movements of the windowpane.

When external force is applied to the windowpane while the motor is not driven, the external force is transmitted from the windowpane to the motor through the lifting mechanism and the gear mechanism. Therefore, when external force is applied to the windowpane, the windowpane is allowed to move. Further, the gear constituting the gear mechanism may be damaged.

To prevent the movement of the windowpane caused by external force, the driving apparatus is equipped with a clutch. The clutch is located in the middle of a power transmission path between the motor and the lifting mechanism in the output unit. The clutch allows the power of the motor to be transmitted to the lifting mechanism through the output unit. However, when external force is applied to the windowpane, the clutch is locked to make a rotation impossible in order to prevent the external force from moving the lifting mechanism. In other words, the clutch blocks the transmission of movement from the lift mechanism to the motor.

Japanese Unexamined Patent Publication No. Hei 7-103260 discloses a clutch of this type. As illustrated in FIG. 52, the clutch 750 comprises a cylindrical clutch housing 751, a driving rotor 762, a driven rotor 753, and a plurality of rolling bodies 754. The driving rotor 762 is rotated by a driving source (not shown) such as a motor. The driving rotor 762 has a plurality of engagement bodies 752 arranged at equal angular intervals which are rotatably accommodated in a clutch housing 751. The driven rotor 753 is accommodated in the clutch housing 751 such that it is surrounded by the engagement bodies 752. The driven rotor 753 is provided with a plurality of restriction faces 753a on its outer peripheral face. The rolling bodies 754 are located between the restriction faces 753a and the inner peripheral face of the clutch housing 751 such that they are positioned between respective two adjacent engagement bodies 752.

As the driving rotor 762 is rotated by the driving source, ends 752a of the engagement bodies 752 are engaged with the corresponding rolling bodies 754. With further rotation of the driving rotor 762, the rolling bodies 754 are held between the engagement bodies 752 and the restriction faces 753a of the driven rotor 753 to couple the driven rotor 753 to the driving rotor 762 for rotation integral therewith. Thus, the rotation of the driving rotor 762 is transmitted to the driven rotor 753 through the rolling bodies 754, causing the driven rotor 753 to rotate together with the driving rotor 762 in the clutch housing 751. With the rotation of the driven rotor 753, a driven device (not shown) coupled to the driven rotor 753 is driven.

On the other hand, as the driven rotor 753 is rotated by a movement of the driven device resulting from external force or the like, the restriction faces 753a moves the rolling bodies 754 toward the inner peripheral face of the clutch housing 751 through the respective two adjacent engagement bodies 752. With further rotation of the driven rotor 753, the rolling bodies 754 are held between the restriction faces 753a and the inner peripheral face of the clutch housing 751 to lock the driven rotor 753 to the clutch housing 751 to prevent the rotation thereof. Thus, the transmission of rotation from the driven rotor 753 to the driving rotor 762 is blocked, together with the movement of the driven device being blocked.

In the foregoing clutch 750, when the rolling bodies 754 are held between the restriction faces 753a and the engagement bodies 752 by the rotation of the driving rotor 762, the rolling bodies 754 may not be released from the held state when the driven rotor 753 is rotated subsequently by a movement of the driven device. In such a case, the driven rotor 753 is not locked in a manner disabling the rotation, thereby allowing the rotation of the driven rotor 753 to be transmitted to the driving rotor 762 through the rolling bodies 754, thereby failing to block the movement of the driven device.

Japanese Unexamined Patent Publication No. Hei 8-200401, on the other hand, discloses a clutch for transmitting the rotation of a driving rotor to a driven rotor through a knock pin (switch pin). However, the knock pin is in contact with a member engaged with the knock pin with a small area. For this reason, during the transmission of rotation, force intensively acts between the knock pin and the member engaged with the knock pin. For making the clutch durable to such intensive force, the clutch must be formed with a high strength. This increases a manufacturing cost of the clutch.

SUMMARY OF THE INVENTION

It is an object of the present invention to provide a clutch that is capable of reliably blocking the transmission of rotation from a driven rotor to a driving rotor and of reducing a required strength, and a driving apparatus equipped with the clutch.

To achieve the above object, a clutch according to the present invention comprises a driving rotor coupled to a driving source, a driven rotor directly engaged with the driving rotor such that the driven rotor is driven by the driving rotor, a housing for accommodating the driving rotor and the driven rotor, and a lock member located between the driven rotor and the housing. The lock member is circulated about an axial center of the driving rotor associated with rotation of the driving rotor. The lock member is held between the driven rotor and the housing to block rotation of the driven rotor relative to the housing when the driven rotor itself is rotated. The lock member is released from the held state to allow the driving rotor to rotate the driven rotor relative to the housing when the driving source rotates the driving rotor.

The rotation of the driven rotor itself relative to the housing is blocked by the lock member which is held between the driven rotor and the housing. When the driving source rotates the driving rotor, the lock member is released from the held state. This allows the transmission of the rotation from the driving rotor to the driven rotor without fail and blocks the transmission of the rotation from the driven rotor to the driving rotor without fail, as compared with a clutch in which a lock member is brought into a held state whenever the driving rotor is rotated or the driven rotor is rotated. Further, since the driven rotor is directly engaged with the driving rotor, a large contact area can be ensured between both rotors. For this reason, the strength required for both rotors can be reduced.

The present invention also provides a driving apparatus comprising a clutch constructed as described above. The driving apparatus comprises a motor having a rotating shaft and functioning as a driving source, and an output unit coupled to the motor. The output unit comprises a decelerating mechanism for decelerating the rotation of the rotating shaft before transmission to a driven device. The clutch is located between the rotating shaft and the decelerating mechanism.

The clutch located between the rotating shaft and the decelerating mechanism is not subjected to a large load. Therefore, the durability required for the clutch can be reduced with a result of a smaller-size clutch.

In another aspect of the driving apparatus according to the present invention, the clutch is located between the decelerating mechanism and the driven device in the output unit. In this way, a movement of the driven device based on force applied to the driven device can be satisfactorily blocked in a stage near the driven device.

BRIEF DESCRIPTION OF THE DRAWINGS

FIGS. 6(a) and 6(b) are partial cross-sectional views for explaining the operation of the clutch in FIG. 1;

FIGS. 7(a) and 7(b) are partial cross-sectional views for explaining the operation of the clutch in FIG. 1;

FIG. 10 is a plane cross-sectional view of the clutch of FIG. 9, and more specifically, a cross-sectional view taken along the line 10—10 in FIG. 11;

FIG. 11 is a cross-sectional view taken along the 11—11 line in FIG. 10;

FIGS. 35(a) and 35(b) are partial cross-sectional views for explaining the operation of the clutch of FIG. 30;

FIGS. 36(a) and 36(b) are partial cross-sectional views for explaining the operation of the clutch of FIG. 30;

FIGS. 43(a) and 43(b) are partial cross-sectional view for explaining the operation of the clutch of FIG. 40;

FIG. 44 is a cross-sectional view illustrating a clutch according to a fourteenth embodiment of the present invention;

DETAILED DESCRIPTION OF THE PREFERRED EMBODIMENTS

First Embodiment

In the following, a first embodiment which embodies the present invention in a power window apparatus will be described with reference to FIGS. 1 through 8.

Figure 8:
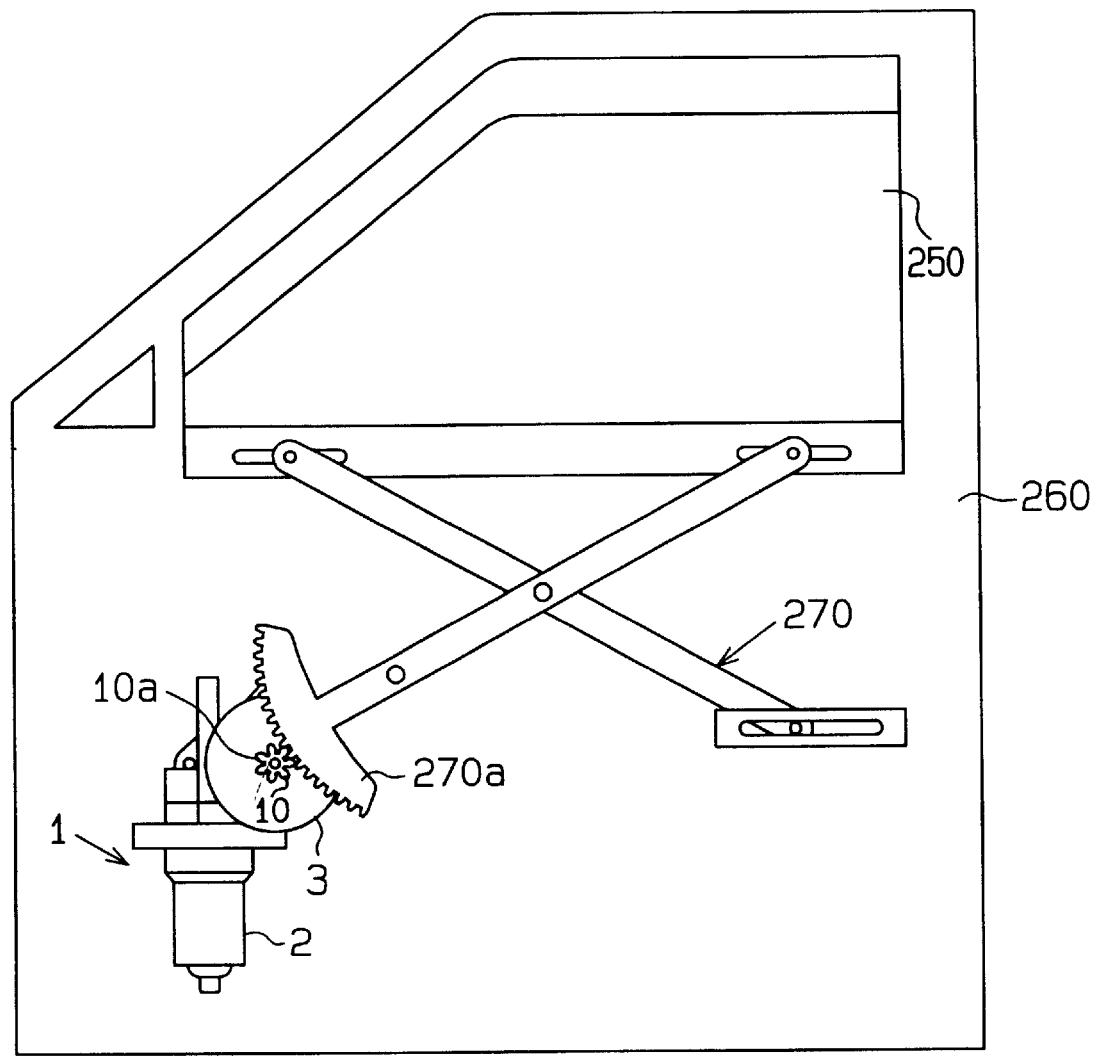
FIG. 8 is a general structural view of a power window apparatus equipped with the driving apparatus of FIG. 1.

As illustrated in FIG. 8, the power window apparatus is located within a door 260 of a vehicle for moving a windowpane 250 up and down. The power window apparatus comprises a driving apparatus 1 fixed to the inside of the door 260, and a lifting mechanism 270 driven by the driving apparatus 1 for moving the windowpane 250 up and down. The driving apparatus 1 includes a motor 2 and an output unit 3. The output unit 3 has an output shaft 10 formed with a gear 10a. The rotation of the motor 2, which is decelerated by the output unit 3, is transmitted to the output shaft 10. The lifting mechanism 270 as a driven device includes two arms which intersect each other, wherein both arms are interlocked by a shaft in the middle. Upper ends of both arms are coupled to the windowpane 250. One of the arms has a fan-shaped gear 270a, at a lower end thereof, meshed with the gear 10a of the output shaft 10. As the motor 2 is driven to rotate the gear 10a, the lifting mechanism 270 moves the windowpane 250 up and down.

Figure 1:
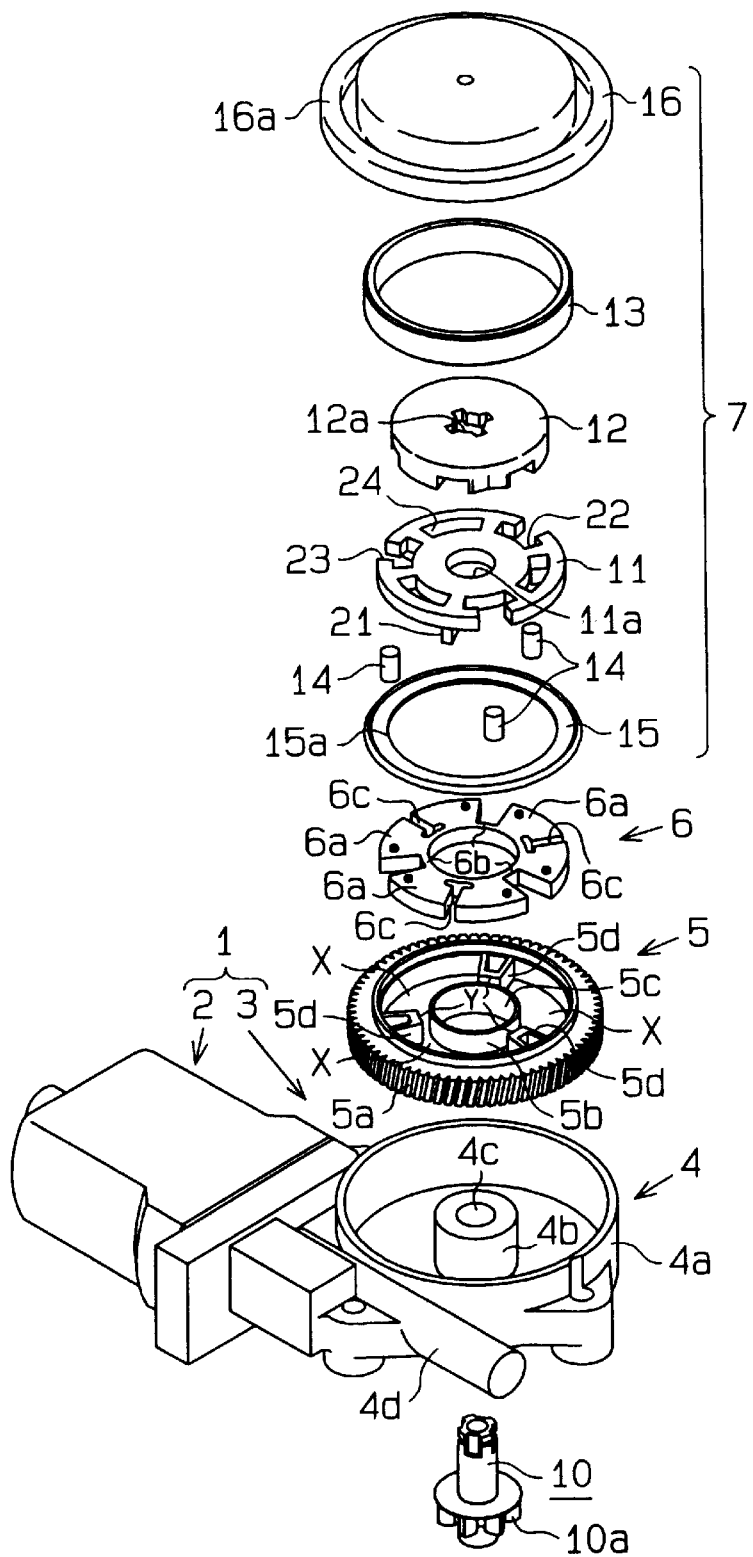
FIG. 1 is an exploded perspective view illustrating a driving apparatus equipped with a clutch according to a first embodiment of the present invention.
Figure 5:
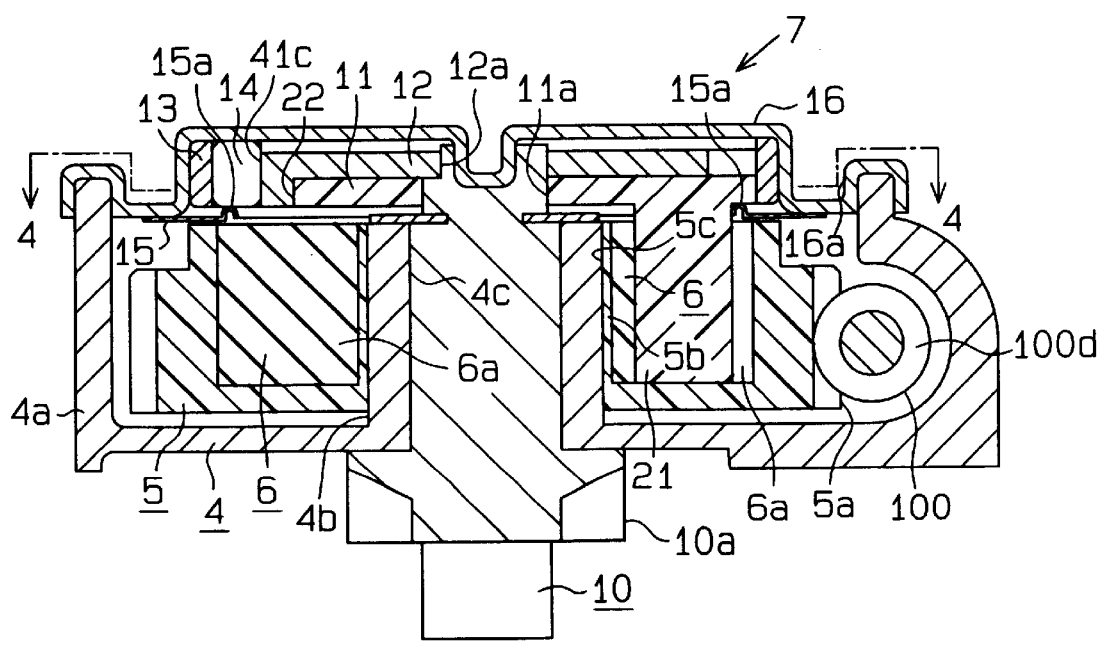
FIG. 5 is a cross-sectional view taken along the 5—5 line in FIG. 4.

As illustrated in FIGS. 1 and 5, the driving apparatus 1 has the output unit 3 coupled to the motor 2. The output unit 3 comprises a unit housing 4, a worm shaft 100 (see FIG. 5), a worm wheel 5, a buffer member 6, a clutch 7, and an output shaft 10. The worm shaft 100 and the worm wheel 5 comprise a worm gear mechanism which functions as a decelerating mechanism and a torque amplifying mechanism.

The unit housing 4 comprises a worm accommodating portion 4d in the form of closed cylinder for accommodating the worm shaft 100. The worm shaft 100 illustrated in FIG. 5 is formed integrally with the rotating shaft of the motor 2, and extends from the motor into the worm accommodating portion 4d.

As illustrated in FIGS. 1 and 5, the unit housing 4 comprises a wheel accommodating portion 4a for accommodating the worm wheel 5. The wheel accommodating portion 4a generally has a closed cylindrical shape, with a support cylinder 4b being implanted on its inner bottom. The support cylinder 4b has a shaft hole 4c for rotatably supporting the output shaft 10.

The worm wheel 5, which is made of a resin material, includes a gear wheel 5a having a cylindrical body and an annular bottom plate, and a central cylindrical body 5b extending from the bottom plate of the gear wheel 5a. The support cylinder 4b is fitted into the shaft hole 5c of the cylindrical body 5b to rotatably support the worm wheel 5 by the support cylinder 4b in the wheel accommodating portion 4a. In this event, the gear wheel 5a is meshed with spiral teeth 100d of the worm shaft 100.

Three holding walls 5d arranged at equal angular intervals (120°) extend in radial directions from the inner peripheral face of the gear wheel 5a to the cylindrical body 5b. A holding chamber X is formed between two adjacent holding walls 5d. Further, a coupling groove Y for coupling two adjacent holding chambers X is formed between each holding wall 5d and the outer peripheral face of the cylindrical body 5b.

The buffer member 6, which is made of rubber, is located in the worm wheel 5. The buffer member 6 includes three fan-shaped rubber segments 6a arranged at equal angular intervals (120°), and elongated coupling rubbers 6b for coupling two adjacent rubber segments 6a to each other, and generally has an annular shape. The rubber segments 6a are located in the respective holding chambers X, and the coupling rubbers 6b are located in the respective coupling grooves Y. Therefore, the buffer member 6 is mounted to the worm wheel 5 for rotation integral therewith. Each rubber segment 6a has a radially extending slit 6c at an intermediate location in the circumferential direction.

As illustrated in FIG. 1, the clutch 7 comprises a driving rotor 11, a driven rotor 12, an outer ring 13 as a housing, a plurality (three in this embodiment) of rollers 14, a washer 15 as a restriction plate, and a cap 16 as a restriction plate.

Figure 2:
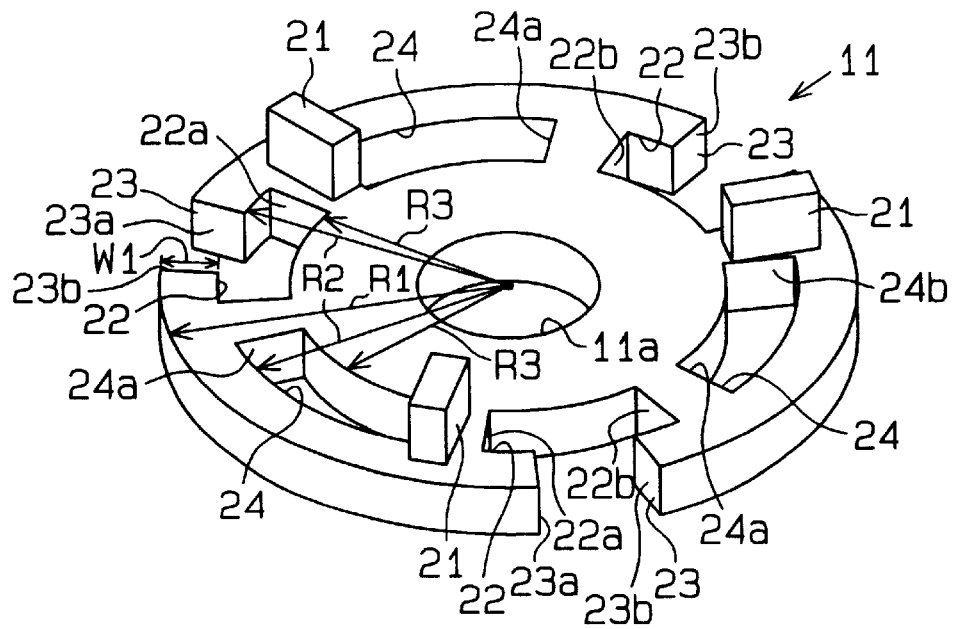
FIG. 2 is a perspective view illustrating a driving rotor located in the clutch in FIG. 1.

As illustrated in FIGS. 1 and 2, the driving rotor 11 is formed of a resin material in a generally disc shape. The driving rotor 11 has three stopper pieces 21 arranged at equal angular intervals. As illustrated in FIG. 5, when the driving rotor 11 is mounted on the worm wheel 5, these stopper pieces 21 are engaged with the slits 6c of the buffer member 6, respectively. Therefore, the rotation of the worm wheel 5 is transmitted to the driving rotor 11 through the buffer member 6, causing the driving rotor 11 to rotate integrally with the worm wheel 5.

Figure 4:
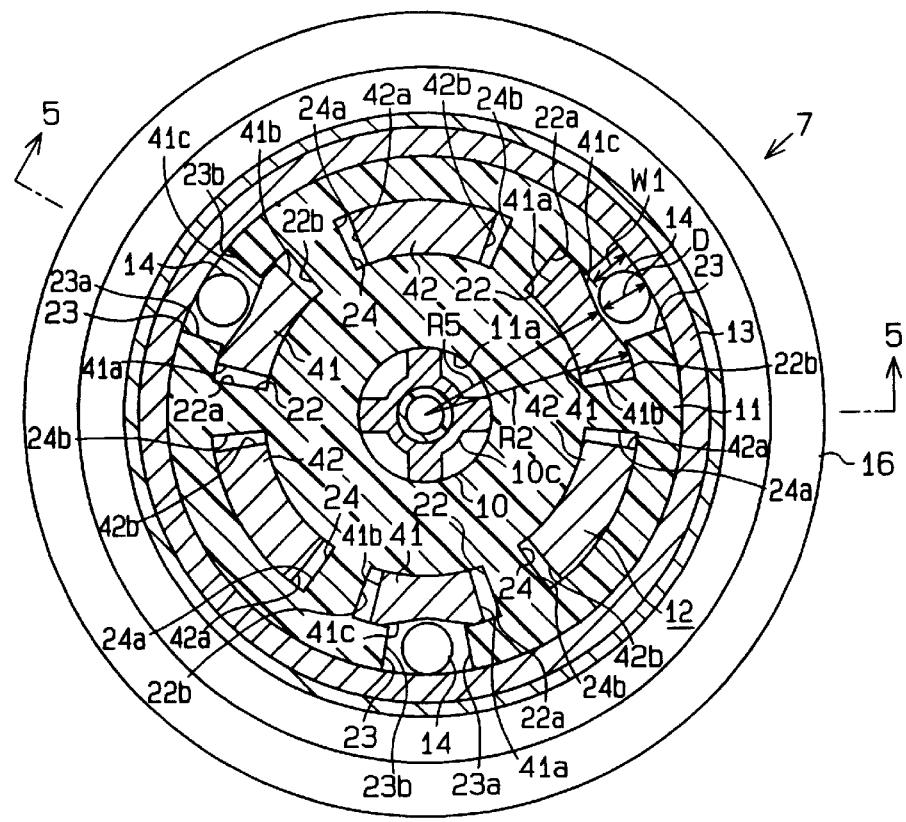
FIG. 4 is a plane cross-sectional view of the clutch in FIG. 1, and more specifically, a cross-sectional view taken along the line 4—4 in FIG. 5.

As illustrated in FIGS. 1, 2 and 4, the driving rotor 11 has a shaft hole 11a, at the center thereof, which allows the output shaft 10 to insert therethrough. The driving rotor 11 has a first engagement hole 22 and a second engagement hole 24, which extend in the circumferential direction, between two adjacent stopper pieces 21. The first engagement hole 22 is open to the outer peripheral side of the driving rotor 11 through a notch 23. The notch 23 is positioned at an intermediate location in the circumferential direction of the first engagement hole 22. Assuming that the diameter of the driving rotor 11 is R1; the outer diameter of both the engagement holes 22, 24 is R2; and the inner diameter of both the engagement holes 22, 24 is R3, the width W1 of the notch 23 in the radial direction is represented by R1–R2.

Each notch 23 is defined by a first surface 23a and a second surface 23b which oppose each other in the circumferential direction and function as pressing faces. The distance between the first surface 23a and the second surface 23b in the circumferential direction is larger than the width W1.

The first engagement hole 22 is defined on both circumferential sides thereof by a first engagement face 22a and a second engagement face 22b as driving engagement faces. The second engagement hole 24 is defined on both circumferential sides thereof by a first engagement face 24a and a second engagement face 24b as driving engagement faces.

Figure 3:
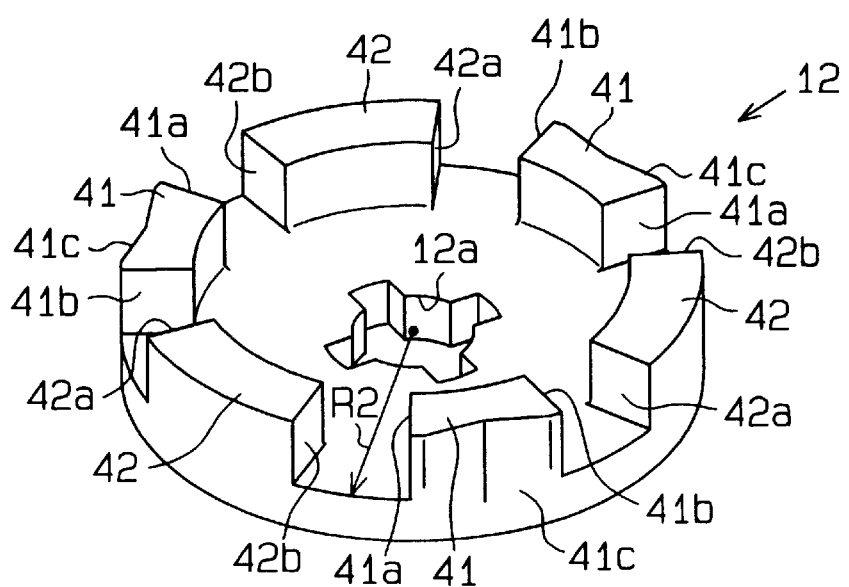
FIG. 3 is a perspective view illustrating a driven rotor located in the clutch in FIG. 1.

As illustrated in FIGS. 1 and 3, the driven rotor 12 is formed of a metal material in a generally disc shape, and overlapped on the driving rotor 11. The driven rotor 12 has a diameter equal to the outer diameter R2 of both engagement holes 22, 24. The driven rotor 12 has a fitting hole 12a of a cross shape in cross section at the center thereof. An end of the output shaft 10 is fitted into the fitting hole 12a. Thus, the driven rotor 12 is integrally rotatable with the output shaft 10.

The driven rotor 12 has a plurality of engagement bodies 41 which extend in radial directions and protrude in the axial direction. In FIG. 3, three first engagement bodies 41 are arranged at equal angular intervals. As illustrated in FIG. 4, each of the first engagement bodies 41 is accommodated in the first engagement hole 22 of the driving rotor 11. Each of the first engagement bodies 41 has a circumferential width smaller than the circumferential width of the first engagement hole 22 and larger than the circumferential width of the notch 23. Thus, the first engagement bodies 41 are movable in the first engagement hole 22 within the circumferential length of the first engagement hole 22.

The first engagement body 41 has, on both circumferential sides thereof, a first side face 41a opposite to the first engagement face 22a of the first engagement hole 22 and a second side face 41b opposite to the second engagement face 22b of the first engagement hole 22. The first side face 41a and the second side face 41b function as driven engagement faces. As illustrated in FIG. 6(a), as the driving rotor 11 rotates in the clockwise direction, the first engagement face 22a comes in contact with the first surface 41a and presses the same. Therefore, the driven rotor 12 integrally rotates in the clockwise direction together with the driving rotor 11. As illustrated in FIG. 6(b), as the driving rotor 11 rotates in the counterclockwise direction, the second engagement face 22b comes in contact with the second side face 41b and presses the same. Therefore, the driven rotor 12 integrally rotates in the counterclockwise direction together with the driving rotor 11.

As illustrated in FIGS. 3 and 4, each of the first engagement bodies 41 has a shallow V-shaped groove on its outer peripheral face at an intermediate location in the circumferential direction. The V-shaped groove is defined by a V-shaped restriction face 41c formed on the outer peripheral face of the first engagement body 41. The distance R5 from the center of the driven rotor 12 to the intermediate location of the restriction face 41c in the circumferential direction, i.e., to the bottom center of the V-shaped groove is smaller than the radius of a portion of the driven engagement body 41 except for the restriction face 41c.

The driven rotor 12 has a plurality of second engagement bodies 42 which extend in radial directions and protrude in the axial direction between two adjacent first engagement bodies 41. In FIG. 3, three second engagement bodies 42 are arranged at equal angular intervals. As illustrated in FIG. 4, each of the second engagement bodies 42 is accommodated in the second engagement hole 24 of the driving rotor 11. Each of the second engagement bodies 42 has a circumferential width smaller than the circumferential width of the second engagement hole 24. Thus, the second engagement bodies 42 are movable in the second engagement hole 24 within the circumferential length of the second engagement hole 24.

The second engagement body 42 has, on both circumferential sides thereof, a first side face 42a opposite to the first engagement face 24a of the second engagement hole 24 and a second side face 42b opposite to the second engagement face 24b of the second engagement hole 24. The first side face 42a and the second side face 42b function as driven engagement faces. As illustrated in FIG. 6(a), simultaneously with the first engagement face 22a coming in contact with the first side face 41a, the first engagement face 24a comes in contact with the first side face 42a. As illustrated in FIG. 6(b), simultaneously with the second engagement face 22b coming in contact with the second side face 41b, the second engagement face 24b comes in contact with the second side surface 42b.

The driving rotor 11 and the driven rotor 12 are rotatably accommodated in the outer ring 13. The outer ring 13 is formed in an annular shape, and is fixed to the unit housing 4 through the cap 16 as illustrated in FIG. 5. As illustrated in FIG. 4, the rollers 14 as rolling bodies are located between the restriction faces 41c and the inner peripheral face of the outer ring 13 within the notch 23 of the driving rotor 11. The rollers 14 extend in parallel with the axis of the driving rotor 11. The roller 14 has a diameter D larger than the radial width W1 of the notch 23.

As illustrated in FIG. 6(a), as the driving rotor 11 rotates in the clockwise direction, the first engagement face 22a comes in contact with the first side face 41a, and the first surface 23a of the notch 23 comes in contact with the roller 14. In this event, the axial center of the roller 14 is positioned on a radial line which passes the axial center of the driven rotor 12 and an intermediate location of the restriction face 41c in the circumferential direction. Conversely, as illustrated in FIG. 6(b), as the driving rotor 11 rotates in the counterclockwise direction, the second engagement face 22b comes in contact with the second side surface 41b, and the second surface 23b of the notch 23 comes in contact with the roller 14. In this event, the axial center of the roller 14 is also positioned on the radial line which passes the axial center of the driven rotor 12 and the intermediate location of the restriction face 41c in the circumferential direction.

As illustrated in FIGS. 4, 6(a) and 6(b), when the roller 14 is placed at a position corresponding to the intermediate location of the restriction face 41c in the circumferential direction, the roller 14 is placed between the restriction face 41c and the inner peripheral face of the outer ring 13 with a clearance. Stated another way, the roller 14 is not held between the restriction face 35c and the inner peripheral face of the outer ring 13. In the following, such a state is referred to as the "free state" of the roller 14. When the roller 14 is in the free state, the driven rotor 12 is allowed to rotate relative to the outer ring 13.

Thus, as illustrated in FIGS. 6(a) and 6(b), when the driving rotor 11 rotates in the clockwise direction or in the counterclockwise direction, the roller 14 is brought into the free state, so that the driven rotor 12 can rotate relative to the outer ring 13 together with the driving rotor 11. The roller 14 circulates about the axial center of the driving rotor 11 as it is pressed by the first surface 23a or second surface 23b of the notch 23, and maintained in the free state.

On the other hand, as illustrated in FIG. 7(a), as the driven rotor 12 itself rotates in the counterclockwise direction, the restriction face 41c of the first engagement body 41 moves relative to the roller 14 such that the roller 14 is held between the restriction face 41c and the inner peripheral face of the outer ring 13. As illustrated in FIG. 7(b), when the driven rotor 12 itself rotates in the clockwise direction, the restriction face 41c of the first engagement body 41 moves relative to the roller 14 as well, such that the roller 14 is held between the restriction face 41c and the inner peripheral face of the outer ring 13. In the following, the state in which the roller 14 is held between the restriction face 41c and the inner peripheral face of the outer ring 13 is referred to as the "lock state" of the roller 14. When the roller 14 is in the lock state, the driven rotor 12 is prevented from rotating relative to the outer ring 13. The roller 14 functions as a lock member.

As illustrated in FIGS. 1 and 5, the washer 15 is formed of a metal material, preferably of brass, in an annular shape. The washer 15 is fixed to the cap 16 and positioned to surround the stopper pieces 21 of the driving rotor 11. As illustrated in FIG. 5, the washer 15 has a spring 15a, at its inner peripheral location, as urging means which is in contact with a lower surface of the roller 14. The spring 15a urges the roller 14 upward in FIG. 5, in other words, axially toward the inner surface of the cap 16. The washer 15 and the cap 16 comprise restricting means for restricting axial movements of the roller 14.

The cap 16, which is formed of a metal material substantially in a closed cylinder, is mounted on the unit housing 4 to close an opening of the wheel accommodating portion 4a. The washer 15 is fitted into the cap 16 in a manner disabling the rotation. The cap 16 is formed at an outer peripheral location with a fitting portion 16a which fits into the wheel accommodating portion 4a.

As illustrated in FIG. 5, the output shaft 10 is inserted into the support cylinder 4b of the wheel accommodating portion 4a from the bottom of the unit housing 4, and inserted through the shaft hole 11a of the driving rotor 11, with its upper end protruding upward from the shaft hole 11a. The upper end of the output shaft 10 is fitted into the fitting hole 12a of the driven rotor 12. The output shaft 10 is formed with a hole in the upper end surface, into which a positioning boss formed on the cap 16 is fitted. On the other hand, a portion of the output shaft 10, which protrudes outward from the unit housing 4, is provided with a gear, as mentioned above. The gear 10a is meshed with a fan-shaped gear 270a of a lifting mechanism 270 (see FIG. 8).

Next, the operation of the power window apparatus constructed as described above will be described.

As the motor 2 is started, the worm shaft 100 rotates the worm wheel 5. The rotation of the worm wheel 5 is transmitted to the driving rotor 11 of the clutch 7 through the buffer member 6. The driving rotor 11 causes the driven rotor 12 to rotate together therewith. In this event, as described with reference to FIGS. 6(a) and 6(b), the rollers 14 are maintained in a free state, the driven rotor 12 is allowed to rotate relative to the outer ring 13. The rotation of the driven rotor 12 is transmitted to the output shaft 10. The rotation of the output shaft 10 drives the lifting mechanism 270 to open or close the windowpane 250.

On the other hand, when external force is applied to the windowpane 250 while the motor 2 is being stopped, the external force is transmitted to the output shaft 10 through the lifting mechanism 270 to rotate the output shaft 10. The rotation of the output shaft 10 is transmitted to the driven rotor 12. In this event, as previously explained with reference to FIGS. 7(a) and 7(b), the roller 14 is held between the restriction face 41c of the first engagement body 41 and the inner peripheral face of the outer ring 13, and thus brought into the lock state. When the roller 14 is in the lock state, the rotation of the driven rotor 12 relative to the outer ring 13 is blocked. The outer ring 13 is mounted to the unit housing in a manner disabling the rotation. This results in blocking movements of the output shaft 10, the lifting mechanism 270 and the windowpane 250. It is therefore impossible to open or close the windowpane 250 with the external force. Of course, neither the driving rotor 11 nor the worm wheel 5 and the worm shaft 100 coupled thereto rotates.

In this way, while the clutch 7 allows the transmission of the movement from the motor 2 to the lift mechanism 270 (driven device), it prevents movements of the output unit 3 based on force applied to the lifting mechanism 270 to block the transmission of the movement from the lift mechanism 270 to the motor 2.

This embodiment has advantages shown below.

Since the rollers 14 are maintained in the free state when the driving rotor 11 is rotated by the motor 2, the driven rotor 12 can integrally rotate together with the driving rotor 11. Thus, the windowpane 250 can be opened or closed as the motor 2 is driven.

When the driven rotor 12 is rotated based on force applied to the windowpane 250, the rollers 14 are brought into a lock state to block the rotation of the driven rotor 12, thereby ensuring to block the transmission of the rotation of the driven rotor 12 to the driving rotor 11.

Each of the plurality of rollers 14 is brought into the lock state to block the rotation of the driven rotor 12 whether the driven rotor 12 is rotated in the forward or backward direction. In other words, each of the rollers 14 functions to block not only the rotation of the driven rotor 12 in one direction but also the rotation in both directions. Therefore, as compared with a clutch which comprises rollers for blocking a driven rotor from rotating in one direction and rollers for blocking the driven rotor from rotating in the other direction, the number of rollers 14 can be reduced, resulting in a reduction in the number of parts. This permits a simplified structure of the clutch 7 and a reduction in the size and cost of the clutch 7.

When the driving rotor 11 rotates from the lock state of the rollers illustrated in FIGS. 7(a) and 7(b), the rollers 14 simply and reliably transit to the free state by the driving rotor 11 which directly presses the rollers 14, or by a movement of the driven rotor 12 associated with the rotation of the driving rotor 11. In this way, the rotation of the driving rotor 11 is transmitted to the driven rotor 12 without fail.

The engagement faces 22a or 22b of the three first engagement holes 22 are in contact with the three first engagement bodies 41 corresponding thereto over the entire surfaces thereof, and the engagement faces 24a or 24b of the three second engagement holes 24 are in contact with the three engagement bodies corresponding thereto over the entire surfaces, thereby transmitting the driving power from the driving rotor 11 to the driven rotor 12. Stated another way, since the driving rotor 11 is in contact with the driven rotor 12 with a relatively wide area to transmit the driving power, force applied to both the rotors 11, 12 per unit area is relatively small. This improves the durability of the driving rotor 11 and the driven rotor 12 as compared with the clutch which transmits the power through a knock pin as in Japanese Unexamined Patent Publication No. Hei 8-200401 previously described in Background Art. In other words, the strength required for the driving rotor 11 and the driven rotor 12 can be reduced. Thus, the driving rotor 11, in particular, can be molded of a synthetic resin which is light in weight, inexpensive, and easy to manufacture.

The rollers 14 of the clutch 7 are in the lock state only when force is transmitted from the lifting mechanism 270 to the driven rotor 12. The rollers 14 are in the free state when the power is transmitted from the motor 2 to the driving rotor 11. Supposing the employment of a clutch which is constructed such that the rollers are brought into the lock state even when the power is transmitted from the motor to the driving rotor, the rollers and the members for locking the rollers tend to be charged with a burden. In this respect, the clutch 7 of this embodiment, in which the rollers 14 are brought into the lock state only when the power is transmitted from the lifting mechanism 270 to the driven rotor 12, is superior in durability. Moreover, it is ensured to transmit the rotation of the driving rotor 11 to the driven rotor 12, and to block the rotation of the driven rotor 12 from being transmitted to the driving rotor 11.

The rollers 14 formed in a cylindrical shape, is in linear contact with the inner peripheral face of the outer ring 13 and the restriction faces 41c of the first engagement body 41 in its lock state. Therefore, in comparison with the case where a ball is used in place of the cylindrical roller 14, for example, the lock state can be more reliably provided.

The washer 15 has a spring 15a for urging the roller 14 toward the inner surface of the cap 16. As a result, the roller 14 is stabilized in posture and movement, so that the roller 14 can smoothly transit from the free state to the lock state and vice versa.

The clutch 7 is positioned on the side near the lifting mechanism 270 in the output unit 3. Therefore, a movement of the lifting mechanism 270 caused by force applied to the windowpane 250 can be satisfactorily blocked in a stage near the lifting mechanism 270.

Second Embodiment

Figure 9:
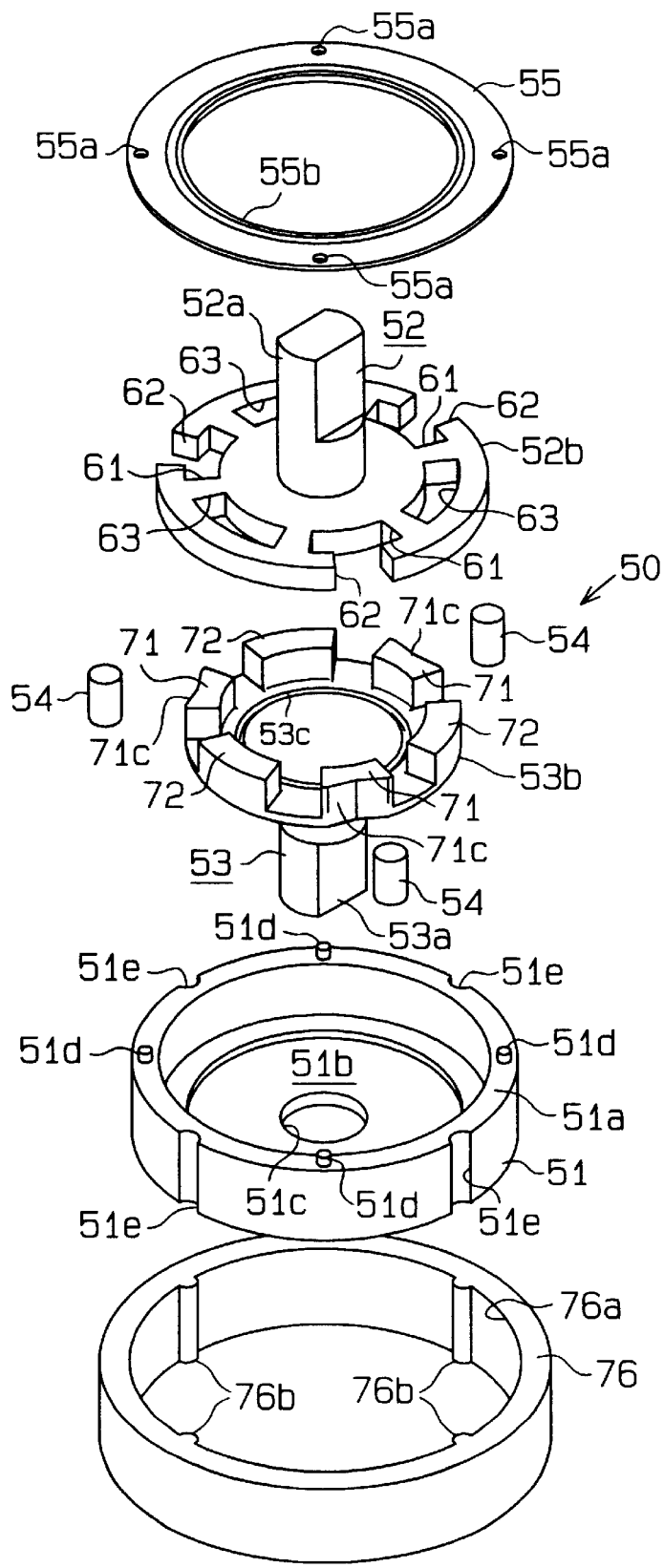
FIG. 9 is an exploded perspective view of a clutch according to a second embodiment of the present invention.

Next, a clutch according to a second embodiment of the present invention will be described with reference to FIGS. 9 through 13. FIG. 9 illustrates an exploded perspective view of a clutch 50 in this embodiment. The clutch 50 is also located in a driving apparatus for a power window apparatus, in a manner similar to the clutch 7 illustrated in FIG. 1. The clutch 50 comprises a clutch housing 51, a driving rotor 52, a driven rotor 53, a plurality (three in this embodiment) of rollers 54, and a washer 55.

Figures 10, 11:
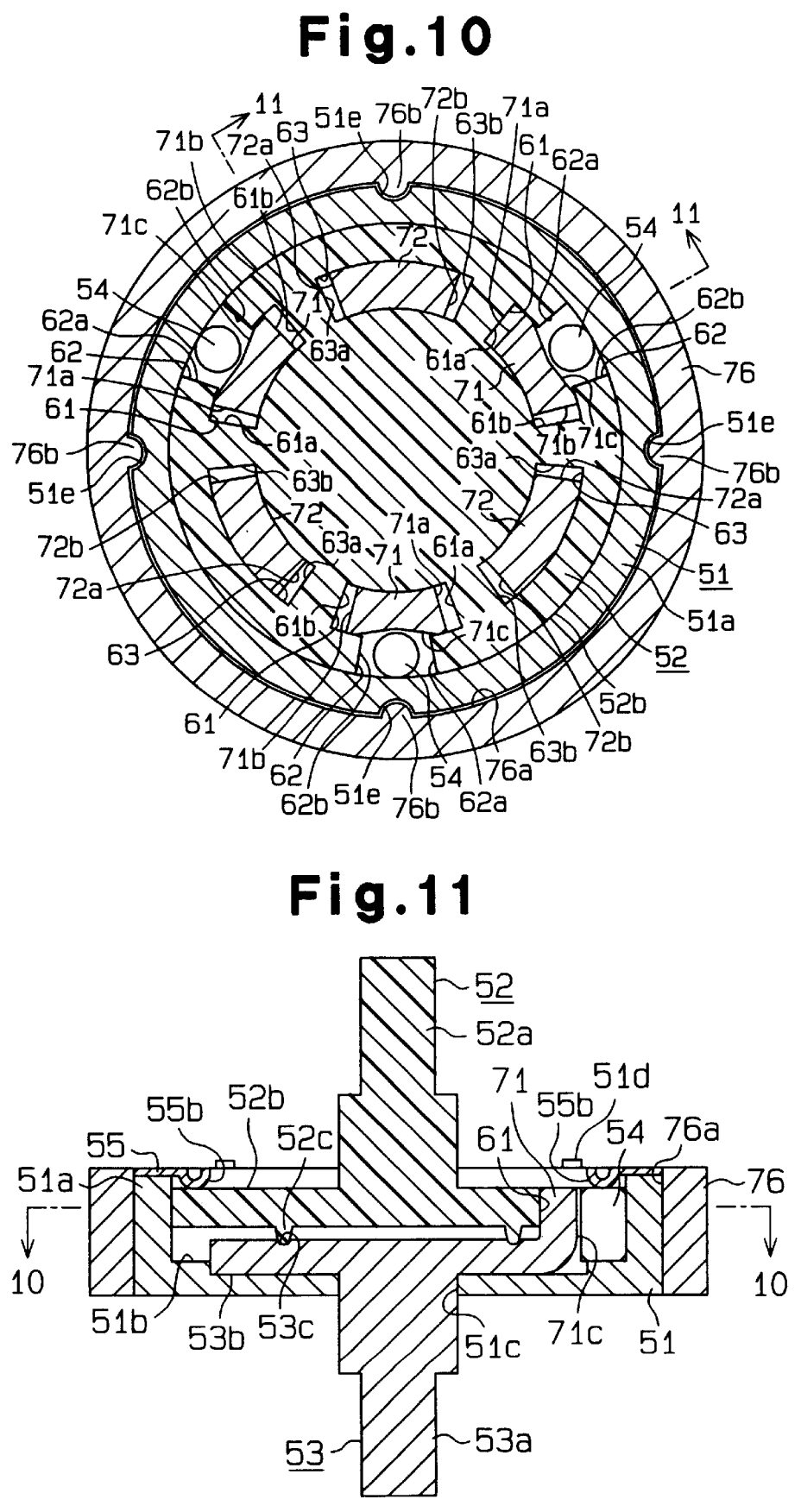

The driving rotor 52, which is made of a resin material, comprises a coupling shaft 52a and a disk 52b. Though not particularly illustrated, the coupling shaft 52a is coupled to a rotating shaft of a motor through a gear mechanism or the like, in a manner similar to the embodiment illustrated in FIG. 1. As illustrated in FIG. 11, an annular protrusion 52c is formed on the base of the disk 52b, arranged coaxially with the coupling shaft 52a. The disk 52b corresponds to the driving rotor 11 illustrated in FIG. 2 from which the stopper pieces 21 are removed and in which the annular protrusion 52c is provided for the driving rotor 11.

More specifically, as illustrated in FIGS. 9 and 10, the disk 52b has first engagement holes 61, second engagement holes 63, and a notch 62 corresponding to the first engagement holes 22, the second engagement holes 24, and a notch 23 of the driving rotor 11 illustrated in FIG. 2. Each of the first engagement holes 61 are defined on both its circumferential sides by a first engagement face 61a and a second engagement face 61b as driving engagement faces. Each of the second engagement holes 63 is defined on both circumferential sides thereof by a first engagement face 63a and a second engagement face 63b as driving engagement faces. Each notch 62 is defined by a first surface 62a and a second surface 62b which oppose each other in the circumferential direction and function as pressing faces.

The driven rotor 53, which is made of a metal material, comprises a coupling shaft 53a and a disk 53b. Though not particularly illustrated, the coupling shaft 53a is coupled to the output shaft, in a manner similar to the embodiment illustrated in FIG. 1. The disk 53b has an annular groove 53c for engagement with the annular protrusion 52c of the driving rotor 52. The disk 53b corresponds to the driven rotor 12 illustrated in FIG. 3 from which the fitting hole 12a is removed and in which the annular groove 53c is provided.

More specifically, as illustrated in FIGS. 9 and 10, the disk 53b has first engagement bodies 71 and second engagement bodies 72 corresponding to the first engagement bodies 41 and the second engagement bodies 42 of the driven rotor 12 illustrated in FIG. 3. Each of the first engagement bodies 71 has, on both circumferential sides thereof, a first side face 71a opposite to the first engagement face 61a of the first engagement hole 61 and a second side face 71b opposite to the second engagement face 61b of the first engagement hole 61. Each of the first engagement bodies 71 also has a V-shaped restriction face 71c at an intermediate location of its outer peripheral face in the circumferential direction. Each of the second engagement bodies 72 has, on both circumferential sides thereof, a first side face 72a opposite to the first engagement face 63a of the second engagement hole 63 and a second side face 72b opposite to the second engagement face 63b of the second engagement hole 63.

The driving rotor 52 and the driven rotor 53, placed one above the other, are rotatably accommodated in the clutch housing 51. The clutch housing 51 has an outer ring 51a in a generally cylindrical shape and a bottom plate 51b as a restriction plate. The bottom plate 51b is formed with a shaft hole 51c at the center thereof. The coupling shaft 53a of the driven rotor 53 is inserted through the shaft hole 51c. The outer ring 51a is formed on its upper surface with a plurality (four in this embodiment) of bosses 51a arranged at equal angular intervals (90°). The outer ring 51a is formed on its outer peripheral face with a plurality (four in this embodiment) of stopper grooves 51e, which extend in radial directions, arranged at equal angular intervals (90°).

As illustrated in FIG. 9, the clutch housing 51 is fixed to an outer housing 76 in a generally cylindrical shape. More specifically, the outer housing 76 comprises an inner wall surface 76a having a diameter equivalent to the diameter of the outer peripheral face of the clutch housing 51. The inner wall surface 76a is formed with stopper protrusions 76b corresponding to the stopper grooves 51e. When the clutch housing 51 is fitted into the outer housing 76, the stopper grooves 51e are engaged with the stopper protrusions 76b to block the rotation of the clutch housing 51 relative to the outer housing 76. A rotation stopping structure comprised of the stopper grooves 51e and the stopper protrusions 76b may be located between the outer ring 13 and the cap 16 in the embodiment of FIGS. 1 through 8.

The rollers 54 as rolling bodies correspond to the rollers 14 illustrated in FIG. 1, and are positioned between the restriction faces 71c and the inner peripheral face of the clutch housing 51 within the notches 62 of the driving rotor 52.

Figure 12A:
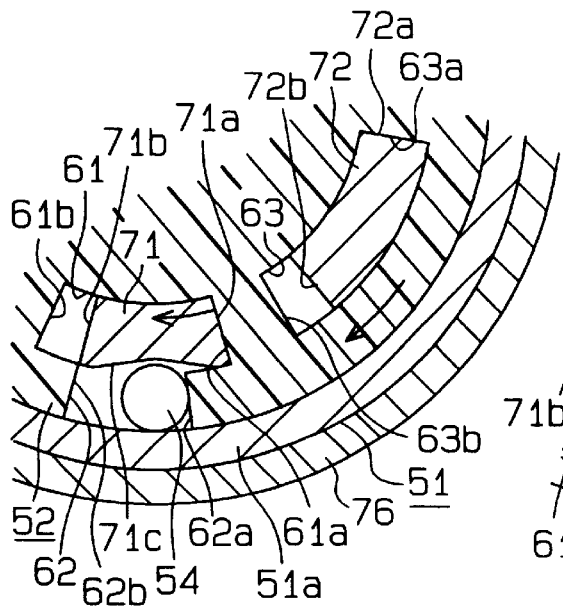
FIGS. 12(a) and 12(b) are partial cross-sectional views for explaining the operation of the clutch of FIG. 9.
Figure 12B:
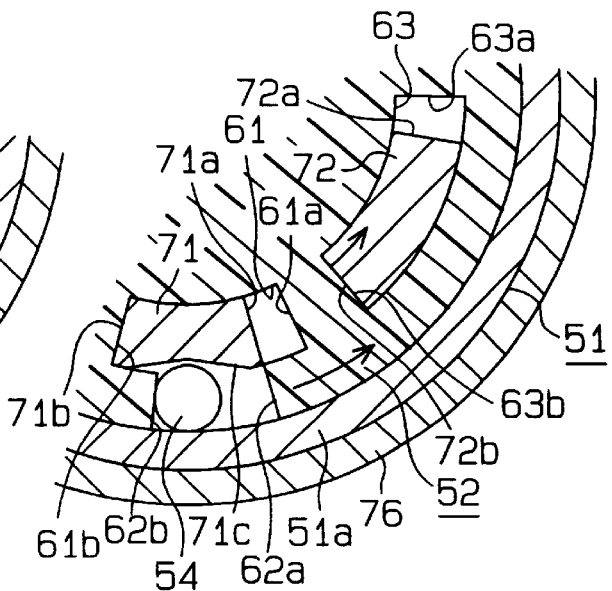

As illustrated in FIG. 12(a), as the driving rotor 52 rotates in the clockwise direction, the first engagement face 61a of the first engagement hole 61 comes in contact with the first engagement body 71, while the first engagement face 63a of the second engagement hole 63 comes in contact with the second engagement body 72. Further, the first surface 62a of the notch 62 comes in contact with the roller 54. On the other hand, as illustrated in FIG. 12(b), as the driving rotor 52 rotates in the counterclockwise direction, the second engagement face 61b of the engagement hole 61 comes in contact with the first engagement body 71, while the second engagement face 63b of the second engagement hole 63 comes in contact with the second engagement body 72. Further, the second surface 62b of the notch 62 comes in contact with the roller 54.

Therefore, the roller 54 illustrated in FIGS. 12(a) and 12(b) is left in a state in which it is not held between the restriction face 71c of the driven rotor 53 and the inner peripheral face of the clutch housing 51, i.e., in the free state, as has been described also with reference to FIGS. 6(a) and 6(b). Thus, the driven rotor 53 can rotate relative to the clutch housing 51 while pressed by the driving rotor 52.

Figure 13A:
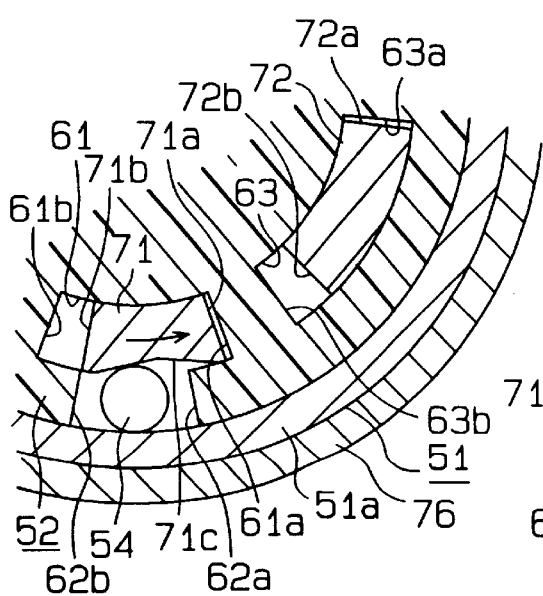
FIGS. 13(a) and 13(b) are partial cross-sectional views for explaining the operation of the clutch of FIG. 9.
Figure 13B:
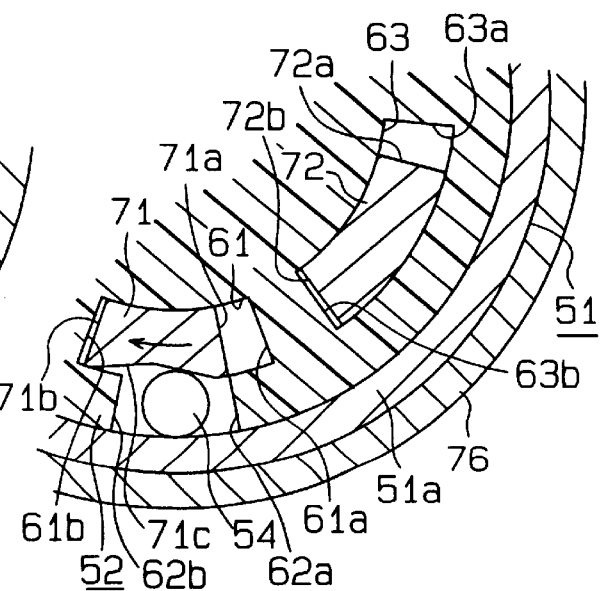

On the other hand, as illustrated in FIGS. 13(a) and 13(b), when the driven rotor 53 itself rotates in the counterclockwise direction or in the clockwise direction, the restriction face 71c moves relative to the roller 54 such that the roller 54 is held between the restriction face 71c and the inner peripheral face of the clutch housing 51, as has been described also with reference to FIGS. 7(a) and 7(b). Thus, the roller 54 is bought into the lock state, thereby blocking the rotation of the driven rotor 53 relative to the clutch housing 51. The roller functions as a lock member.

As illustrated in FIGS. 9 and 11, the washer 55 is placed on the driving rotor 52 as a restriction plate. The washer 55 has a boss holes 55a corresponding to the bosses 51d of the clutch housing 51. The bosses 51d are fitted into the boss holes 55a to securely mount the washer 55 on the clutch housing 51. At an inner peripheral location of the washer 55, a spring 55b is formed as urging means for urging the roller 54 toward the bottom plate 51b of the clutch housing 51. The bottom plate 51b and the washer 55 comprise restricting means for restricting the roller 54 from moving in the axial direction.

The clutch 50 constructed as described above has similar actions and effects to those of the clutch 7 in the embodiment of FIGS. 1 through 8.

Third Embodiment

Figure 14:
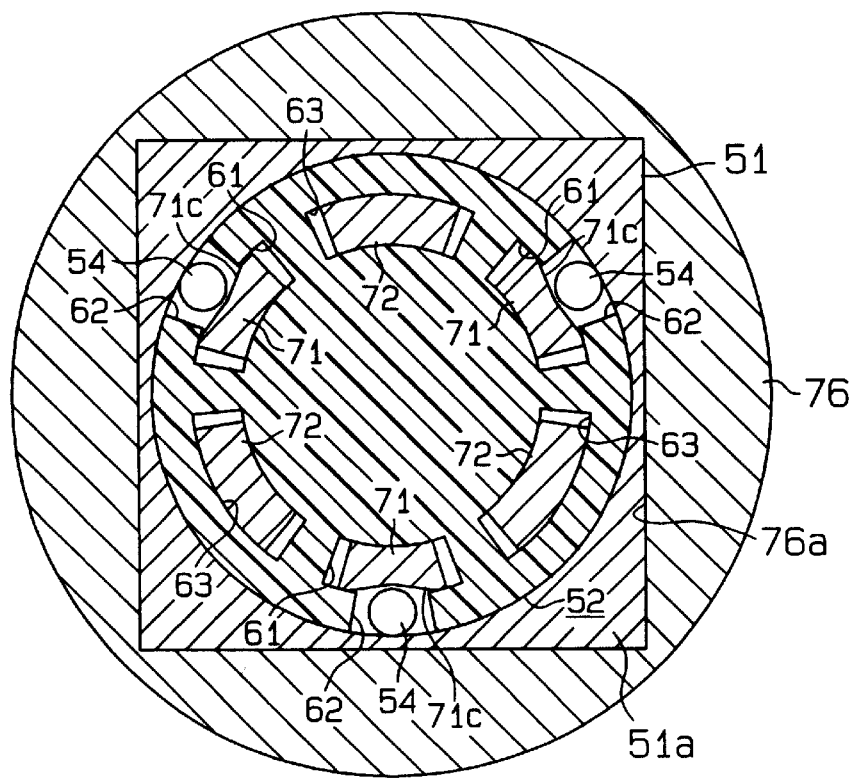
FIG. 14 is a plane cross-sectional view illustrating a clutch according to a third embodiment of the present invention.

Next, a third embodiment of the present invention will be described with reference to FIG. 14. This embodiment is an example of modifications to the embodiment of FIGS. 9 through 13. Specifically, in this embodiment, an outer ring 51a of a clutch housing 51 has a rectangular outer shape, and an inner wall surface 76a of the outer housing 76 has a shape corresponding to the outer surface of the outer ring 51a, as illustrated in FIG. 14. By fitting the outer ring 51a on the inner wall surface 76a, the clutch housing 51 is fitted into the outer housing 76 in a manner disabling the rotation relative thereto. Alternatively, the outer shape of the outer ring 51a and the inner wall surface 76a of the outer housing 76 corresponding thereto may be formed in a polygonal shape other than the rectangular shape.

Fourth Embodiment

Figure 15:
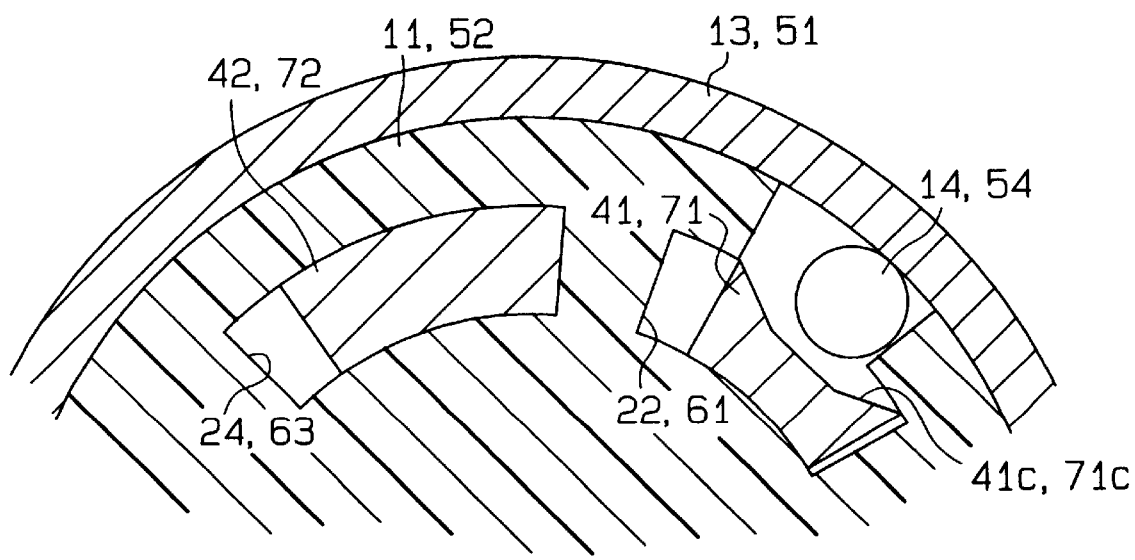
FIG. 15 is a partial plane cross-sectional view illustrating a clutch according to a fourth embodiment of the present invention.

Next, a fourth embodiment of the present invention will be described with reference to FIG. 15. This embodiment is an example of modifications to the embodiment of FIGS. 1 through 8 or the embodiment of FIGS. 9 through 13. Specifically, in this embodiment, a restriction face 41c or 71c formed on the first engagement body 41 or 71 is not V-shaped, as illustrated in FIG. 15. The restriction face 41c or 71c is formed by a flat base positioned in an intermediate region in the circumferential direction and a pair of slopes formed on both sides of the base.

Fifth Embodiment

Figure 16A:
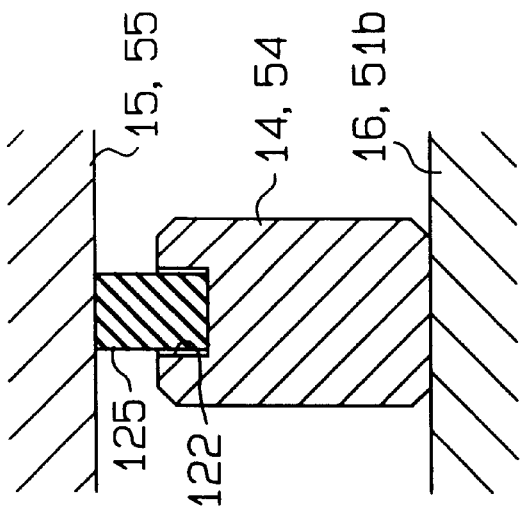
FIGS. 16(a) through 16(c) are partial front sectional views illustrating a clutch according to a fifth embodiment of the present invention.
Figure 16B:
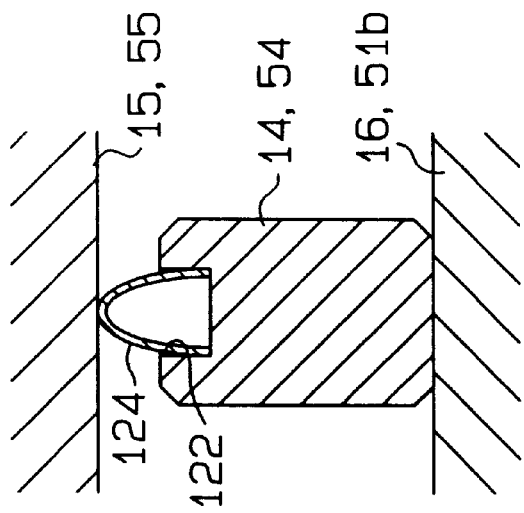
Figure 16C:
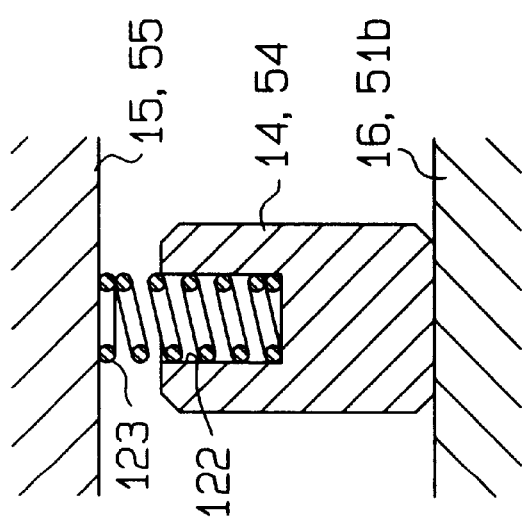

Next, a fifth embodiment of the present invention will be described with reference to FIGS. 16(a) through 16(c). This embodiment is an example of modifications to the embodiment of FIGS. 1 through 8 or the embodiment of FIGS. 9 through 13. Specifically, in this embodiment, the springs 15a, 55b are removed from the washers 15, 55 in the embodiment of FIGS. 1 through 8 or the embodiment of FIGS. 9 through 13. Instead, as illustrated in FIGS. 16(a) through 16(c), an accommodating hole 122 is formed in one end face of the roller 14 or 54, and an elastic body 123, 124 or 125 is located between the accommodating hole 122 and the washer 15 or 55 as urging means. The elastic bodies 123, 124, 125 urge the rollers 14, 54 toward the cap 16 or the base 51b of the clutch housing 51. While any elastic material may be used for this purpose, a coil spring 123 is used as an elastic body in FIG. 16(a); a plate spring 124 is used as an elastic body in FIG. 16(b); and a rubber 125 is used as an elastic body in FIG. 16(c).

The roller 14 or 54 may be located in a direction reverse to that in FIGS. 16(a) through 16(c), so that the elastic body 123, 124 or 125 is located between the accommodating hole 122 and the cap 16 or the bottom plate 51b. It should be noted that the feature for urging the roller 14 or 54 is not essential and may be removed.

Sixth Embodiment

Next, a driving apparatus 1 according to a sixth embodiment of the present invention will be described with reference to FIGS. 17 through 22, centered on differences with the embodiment of FIGS. 1 through 8. Members equivalent to those in the embodiment of FIGS. 1 through 8 are designated the same reference numerals.

Figure 17:
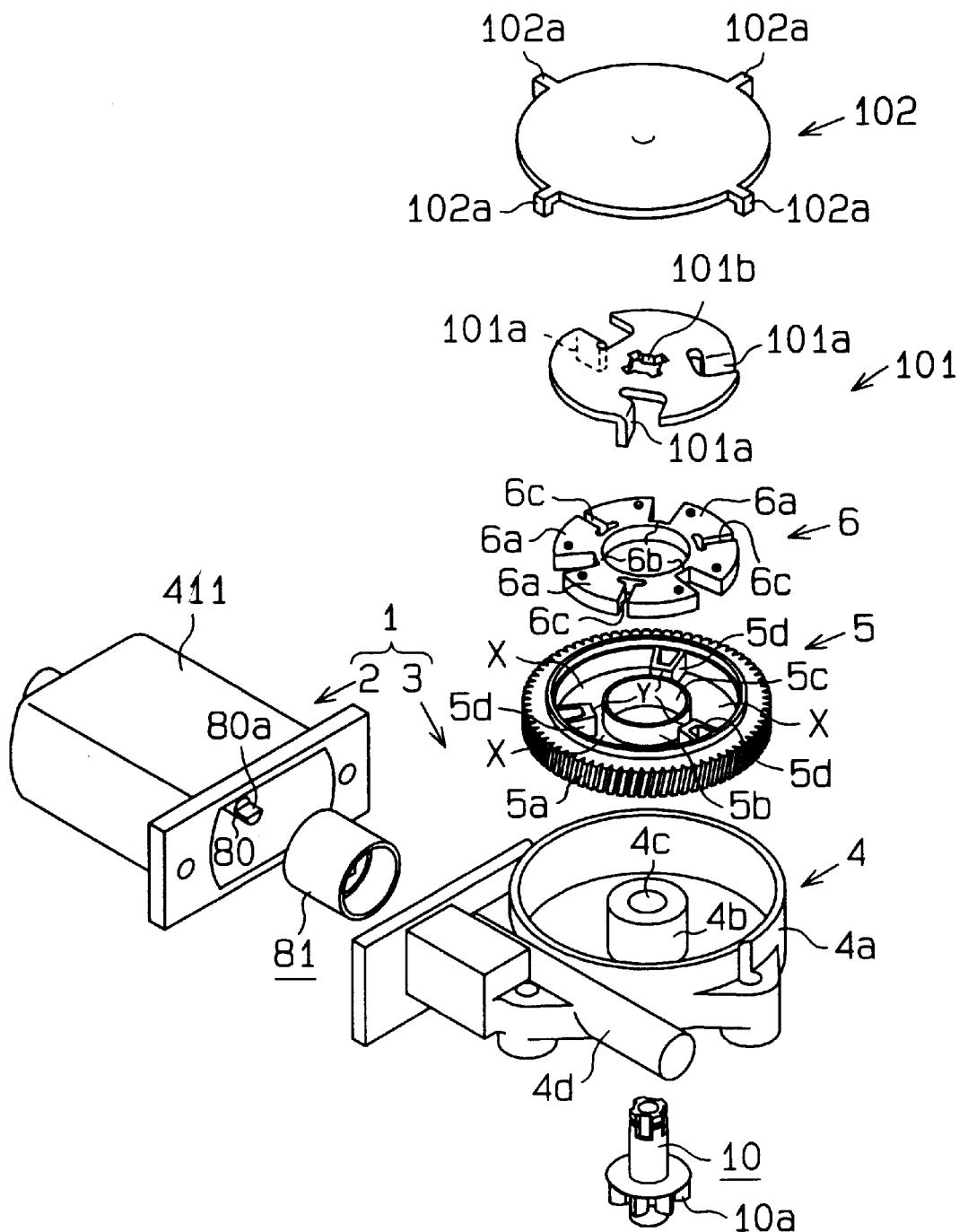
FIG. 17 is an exploded perspective view illustrating a driving apparatus equipped with a clutch according to a sixth embodiment of the present invention.

As illustrated in FIG. 17, the driving apparatus 1 of this embodiment differs from the embodiment of FIGS. 1 through 8 in that a clutch 81 is positioned between a worm shaft 100 and a rotating shaft 80 of a motor 2, which are separated from each other, rather than within the output unit 3.

Figure 18:
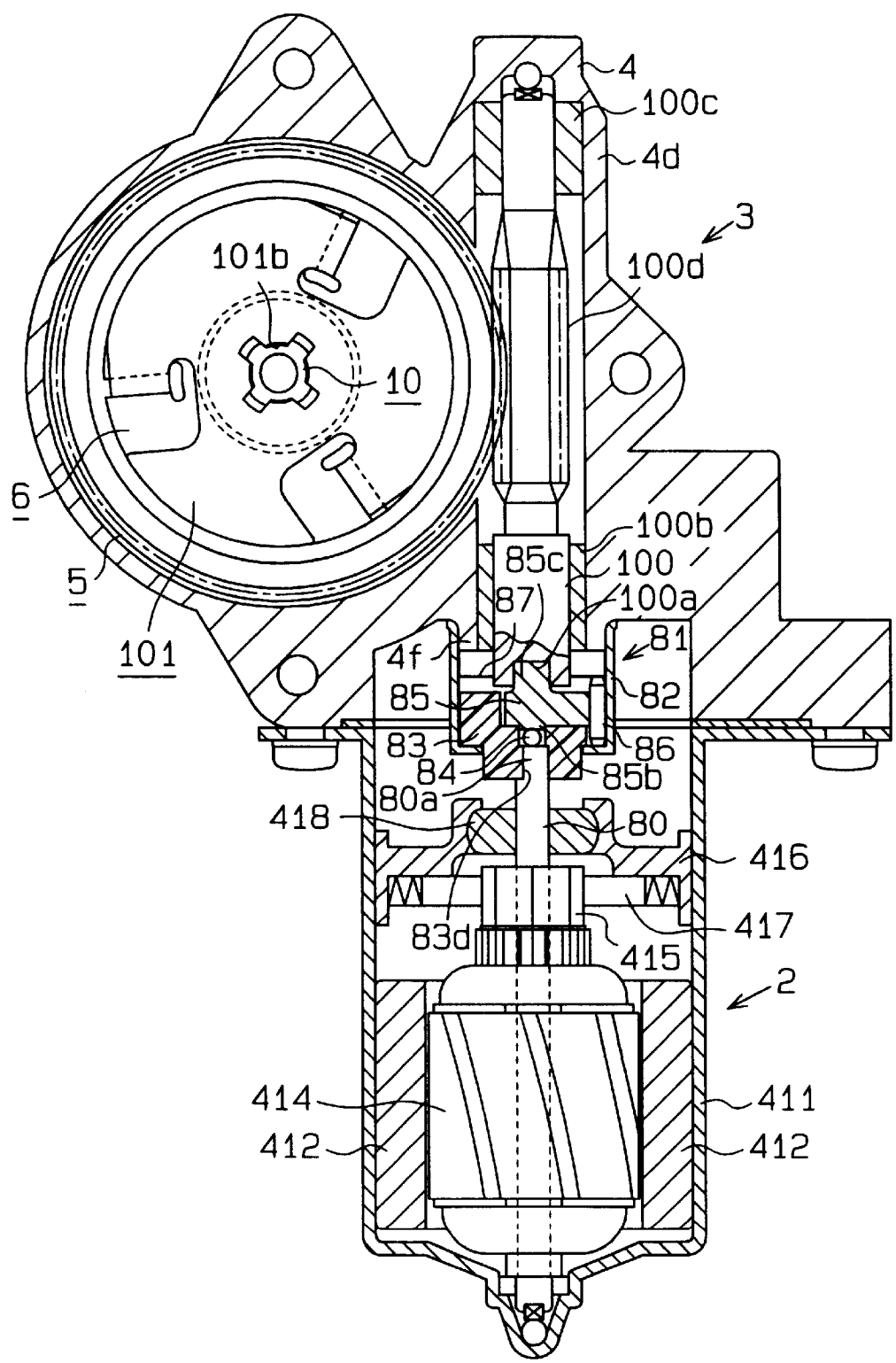
FIG. 18 is a plane cross-sectional view of the driving apparatus of FIG. 15.

Describing first the motor 2, the motor 2 comprises a motor housing 411 formed in a closed cylinder as shown in FIG. 18. A brash holder 416 made of a resin material is fitted into the opening of the motor housing 411. The brash holder 416 forms part of the motor housing 411. Two magnets 412 are secured on the inner face of the motor housing 411 such that they oppose each other. A rotating shaft 80 is rotatably supported between the inner bottom of the motor housing 411 and the brush holder 416. A bearing 418 is located between the brush holder 416 and the rotating shaft 80. A distal end of the rotating shaft 80 is formed with a fitting portion 80a having a generally D-shaped cross section by cutting away a portion of the peripheral face of the rotating shaft 80 to be flat.

An armature 414 with a coil wound around it is fixed on the rotating shaft 80 such that it is surrounded by the magnets 412. A commutator 415 is fixed on the rotating shaft 80 between the armature 414 and the bearing 418, and is surrounded by the brush holder 416. A brush 417 is attached to a portion of the brush holder 416, which surrounds the commutator 415, such that the brush 417 is in contact with the commutator 415. As a current from an external power source (not shown) is supplied to the armature 414 through the brush 417 and the commutator 415, the rotating shaft 80 is rotated together with the commutator 415 and the armature 414.

Figure 19:
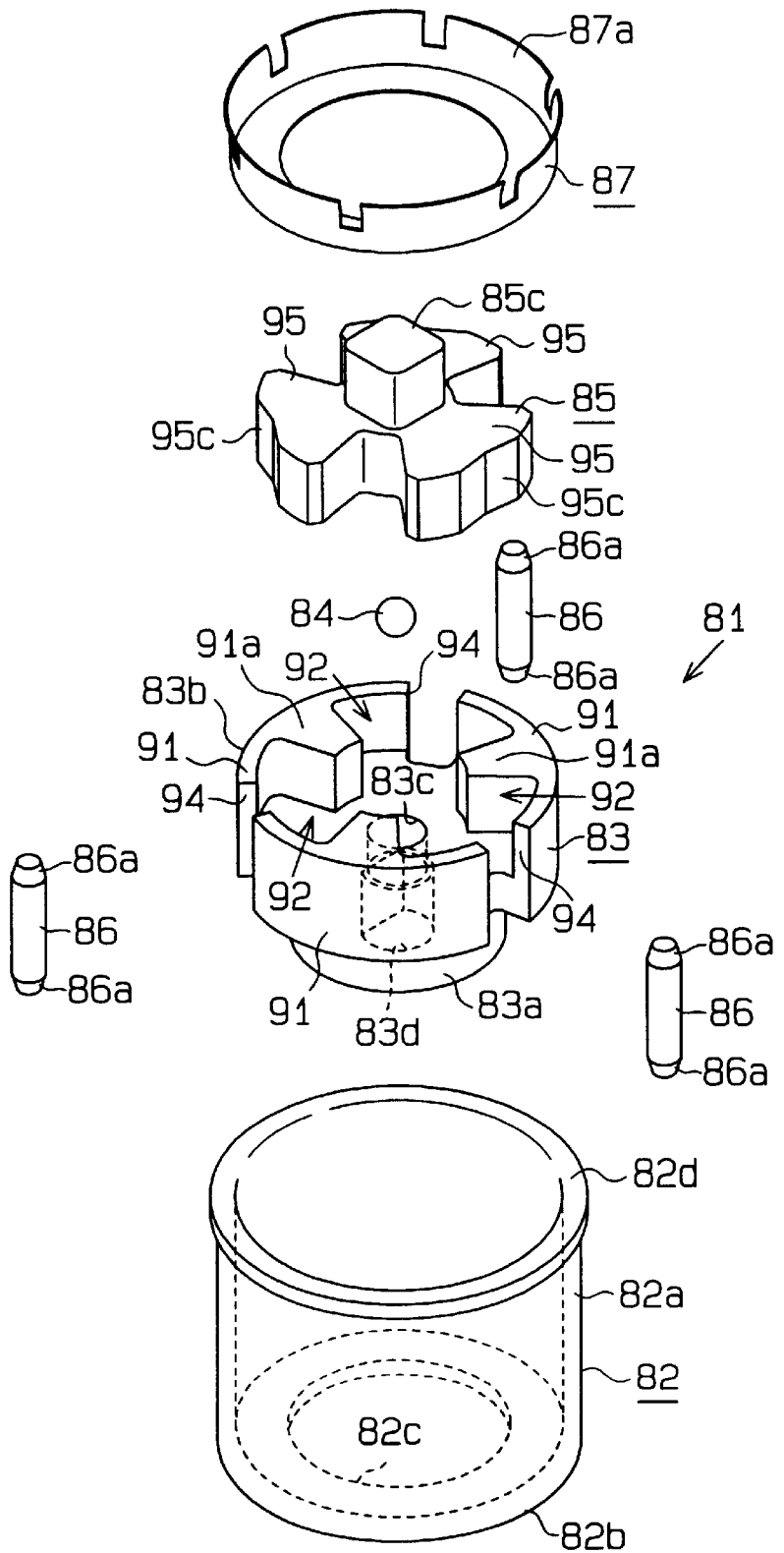
FIG. 19 is an exploded perspective view of a clutch located in the driving apparatus of FIG. 15.
Figure 20:
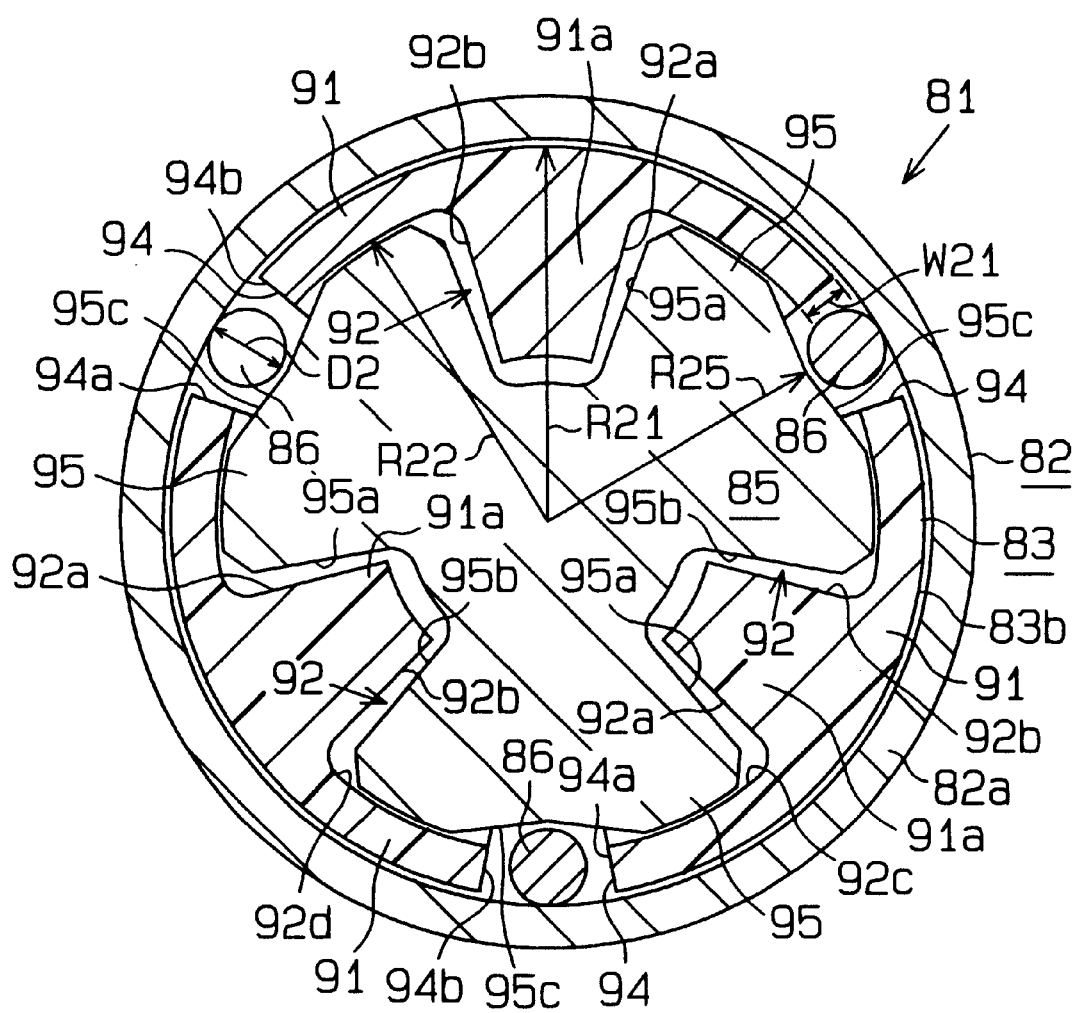
FIG. 20 is a plane cross-sectional view of the clutch of FIG. 19.
Figure 21:
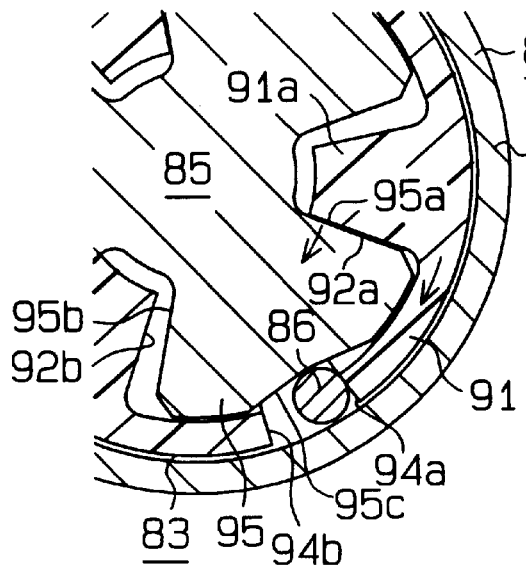
FIGS. 21(a) and 21(b) are partial cross-sectional views for explaining the operation of the clutch of FIG. 19.
Figure 21:
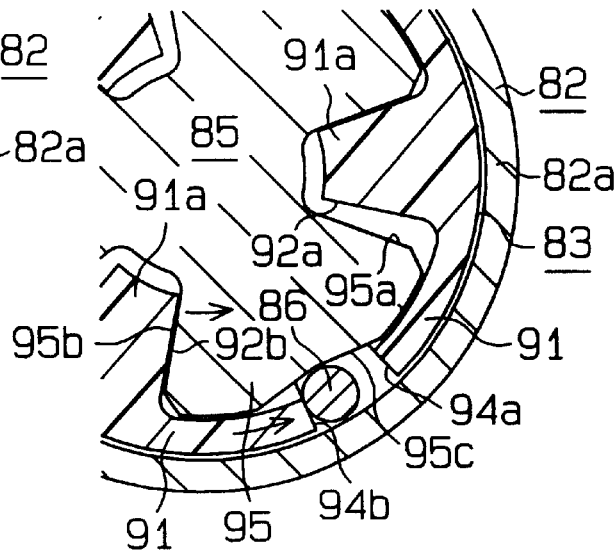
Figure 22:
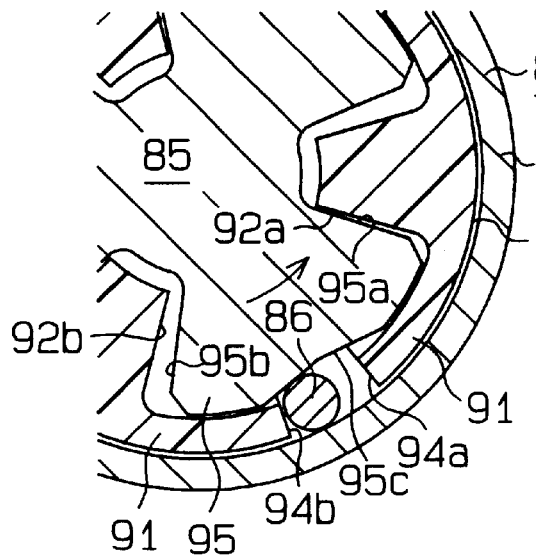
FIGS. 22(a) and 22(b) are partial cross-sectional views for explaining the operation of the clutch of FIG. 19.
Figure 22:
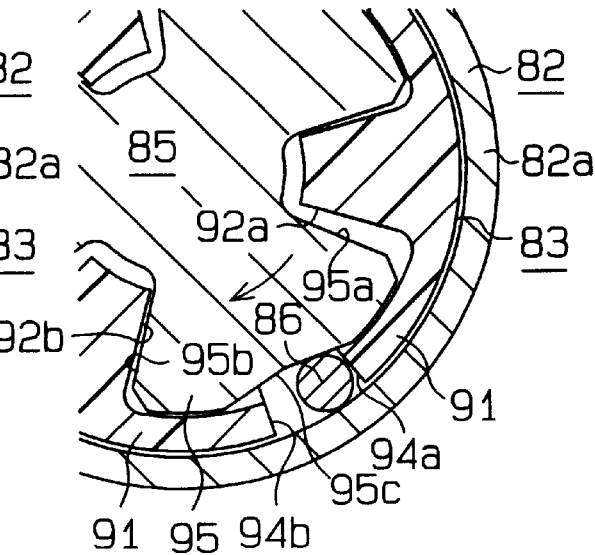

Next, the clutch 81 will be described. As illustrated in FIGS. 17 and 18, the clutch 81 is coupled to the distal end of the rotating shaft 80 of the motor 2. As illustrated in FIGS. 18 through 20, the clutch 81 comprises a clutch housing 82, a driving rotor 83, a ball 84, a driven rotor 85, a plurality (three in this embodiment) of cylindrical rollers 86, and a support ring 87.

The driving rotor 83, which is formed of a resin material, has a smaller diameter portion 83a and a larger diameter portion 83b. The driving rotor 83 has a shaft hole 83c which extends through the driving rotor 83. A portion of the shaft hole 83c forms a fitting hole 83d having a shape corresponding to the fitting portion 80a of the rotating shaft 80. As illustrated in FIG. 18, the fitting portion 80a of the rotating shaft 80 is fitted into the fitting hole 83d such that the driving rotor 83 is rotated integrally with the rotating shaft 80.

As illustrated in FIGS. 19 and 20, the larger diameter portion 83b has a plurality (three in this embodiment) of arcuate walls 91 arranged at regular angular intervals. When the diameter of the outer peripheral face of the arcuate walls 91 is R21 and the diameter of the inner peripheral face of the arcuate walls 91 is R22, the thickness W21 of the arcuate walls 91 in the radial direction is represented by R21–R22. Each of the arcuate walls 91 has a first side face 94a and a second side face 94b as pressing faces on both circumferential ends. The larger diameter portion 83b has a notch 94 between two adjacent arcuate walls 91. Specifically, each notch 94 is formed between the first side face 94a and the second side face 94b opposite to the first side face 94a. The width of each notch 94 in the circumferential direction, i.e. the width between the opposing first side face 94a and second side face 94b in the circumferential direction is larger than the thickness W21 of the arcuate walls 91 in the radial direction.

A driving engagement body 91a extends from the inner peripheral face of each arcuate wall 91 to the center of the larger diameter portion 83b. The driving engagement bodies 91a are located at intermediate locations of the respective arcuate walls 91 in the circumferential direction, and mutually arranged at equal angular intervals. An accommodation chamber 92 generally in a fan shape is formed between two adjacent driving engagement bodies 91a. These accommodation chambers 92 communicate with one another near the center of the larger diameter portion 83b to form a single accommodation space for accommodating the driven rotor 85, later described. Each driving engagement body 91a has a first side face 92a and a second side face 92b as driving engagement faces on both circumferential sides. Each accommodation chamber 92 is formed between the first side face 92a and the second side face 92b opposing the first side face 92a.

As illustrated in FIG. 19, the ball 84 is made of metal, and is accommodated in the shaft hole 83c of the driving rotor 83.

As illustrated in FIGS. 18 through 20, the driven rotor 85, which is made of a metal material, is located within the accommodation space formed by the larger diameter portion 83b of the driving rotor 83 for rotation relative to the driving rotor 83. The driven rotor 85 has a plurality (three in this embodiment) of driven engagement bodies 95 arranged at equal angular intervals and formed generally in a fan shape. The radius of the driven engagement bodies 95 is identical to or slightly smaller than the radius R22 of the inner peripheral face of the arcuate walls 91. Each driven engagement body 95 is accommodated in the accommodation chamber 92 of the driving rotor 83. The width of the driven engagement bodies 95 in the circumferential direction is smaller than the width of the accommodation chamber 92 in the circumferential direction, and larger than the width of the notch 34 in the circumferential direction.

The driven rotor 85 has a short shaft portion 85b (see FIG. 18) which fits into the shaft hole 83c of the driving rotor 83. The driven rotor 85 is rotatable relative to the driving rotor 83 about the shaft portion 85b. The ball 84 located in the shaft hole 83c is positioned between an end face of the shaft portion 85b and an end face of the rotating shaft 83 of the motor 2. The ball 84 prevents the driven rotor 85 from being strongly pressed by the driving rotor 83 to smoothly provide the relative rotation between the driving rotor 83 and the driven rotor 85. The driven rotor 85 also has a fitting shaft 85c which is located coaxial with the shaft portion 85b and extends in the direction opposite to the shaft portion 85b. The fitting shaft 85c has a generally rectangular cross section, as illustrated in FIG. 19.

Each driven engagement body 95 has a first side face 95a opposite to the first side face 92a of the driving engagement body 91a, and a second side face 95b opposite to the second side face 92b of the driving engagement body 91a. As illustrated in FIG. 21(a), as the driving rotor 83 rotates in the clockwise direction, the first side face 92a of the driving engagement body 91a comes into contact with the first side face 95a of the driven engagement body 95. In this state, the driven rotor 85 integrally rotates in the clockwise direction together with the driving rotor 83. Conversely, as illustrated in FIG. 21(b), as the driving rotor 83 rotates in the counterclockwise direction, the second side face 92b of the driving engagement body 91a comes in contact with the second side face 95b of the driven engagement body 95. In this state, the driven rotor 85 integrally rotates in the counterclockwise direction together with the driving rotor 83.

As illustrated in FIGS. 19 and 20, each of the engagement bodies 95 has a V-shaped restriction face 95c formed on the outer peripheral face of the engagement body 95. The distance R25 from the center of the driven rotor 82 to the intermediate location of the restriction face 95c in the circumferential direction is smaller than the radius of a portion of the driven engagement body 41 except for the restriction face 95c.

The driving rotor 83 and the driven rotor 85 are accommodated in the clutch housing 82. A slight gap is formed between the outer peripheral face of the driving rotor 83 and the inner peripheral face of the clutch housing 82. The clutch housing 82, which is formed of a metal material, comprises a cylindrical body 82a and a bottom plate 82b. A shaft hole 82c is formed at the center of the bottom plate 82b. The smaller diameter portion 83a of the driving rotor 83 is inserted through the shaft hole 82c. A fitting portion 82d extending in the axial direction of the cylindrical body 82a is formed on the opening of the cylindrical body 82a.

As illustrated in FIG. 20, the roller 86, as a rolling body, is located between the restriction face 95c and the inner peripheral face of the clutch housing 82 in the notch 94 of the driving rotor 83. The roller 86 extends in parallel with the axis of the driving rotor 83. The diameter D2 of the roller 86 is larger than the thickness W21 of the arcuate wall 91. As illustrated in FIG. 19, the roller 86 has tapered faces 86a in both end portions.

As illustrated in FIG. 21(a), as the driving rotor 83 rotates in the clockwise direction, the first side face 92a of the driving engagement body 91a comes in contact with the first side face 95a of the driven engagement body 95, and the first side face 94a of the arcuate wall 91 comes in contact with the roller 86. Conversely, as illustrated in FIG. 21(b), as the driving rotor 83 rotates in the counterclockwise direction, the second side face 92b of the driving engagement body 91a comes in contact with the second side surface 95b, of the driven engagement body 95 and the second side face 94b of the arcuate wall 91 comes in contact with the roller 86.

The roller 86 illustrated in FIGS. 21(a) and 21(b) is left in a state in which it is not held between the restriction face 95c of the driven rotor 85 and the inner peripheral face of the clutch housing 82, i.e., in the free state, as has been described also with reference to FIGS. 6(a) and 6(b). Thus, the driven rotor 85 can rotate relative to the clutch housing 82, while it is pressed by the driving rotor 83. The roller 91 circulates about the axial center of the driving rotor 83 while pressed by the arcuate wall 91, and is maintained in the free state.

On the other hand, as illustrated in FIGS. 22(a) and 22(b), when the driven rotor 85 itself rotates in the counterclockwise direction or in the clockwise direction, the restriction face 95c moves relative to the roller 86 such that the roller 86 is held between the restriction face 95c and the inner peripheral face of the clutch housing 82, as has been described also with reference to FIGS. 7(a) and 7(b). Thus, the roller 86 is bought into the lock state, thereby blocking the rotation of the driven rotor 85 relative to the clutch housing 82. The roller 86 functions as a lock member.

As the driving rotor 83 rotates from the lock state of the roller 86 illustrated in FIG. 22(a) in the clockwise direction, the first side face 92a of the driving engagement body 91a first comes into contact with the first side face 95a of the driven engagement body 95, causing the driven rotor 85 to rotate in the clockwise direction. In association, the roller 86 is released from the lock state. Subsequently, the first side face 94a of the arcuate wall 91 comes in contact with the roller 86 so that the roller 86 is maintained in the free state, as explained in connection with FIG. 21(a).

Likewise, as the driving rotor 83 rotates from the lock state of the roller 86 illustrated in FIG. 22(a) in the counterclockwise direction, the second side face 94b of the arcuate wall 91 presses the roller 86 to release the roller 86 from the lock state. Subsequently, the second side face 92b of the driving engagement body 91a comes in contact with the second side face 95b of the driven engagement body 95, causing the driven rotor 85 to rotate in the counterclockwise direction. Simultaneously, as explained with reference to FIG. 21(b), the roller 86 is maintained in the free state.

On the other hand, as the driving rotor 83 rotates from the lock state of the roller 86 illustrated in FIG. 22(b) in the counterclockwise direction, the second side face 92b of the driving engagement body 91a first comes in contact with the second side face 95b of the driven engagement body 95, causing the driven rotor 85 to rotate in the counterclockwise direction. In association, the roller 86 is released from the lock state. Subsequently, the second side face 94b of the arcuate wall 91 comes in contact with the roller 86 to maintain the roller 86 in the free state, as explained with reference to FIG. 21(b).

Likewise, as the driving rotor 83 rotates from the lock state of the roller 86 illustrated in FIG. 22(b) in the clockwise direction, the first side face 94a of the arcuate wall 91 first presses the roller 86 to release the roller 86 from the lock state. Next, the first side face 92a of the driving engagement body 91a comes in contact with the first side face 95a of the driven roller 95, causing the driven roller 85 to rotate in the clockwise direction. Simultaneously, as explained with reference to FIG. 21(a), the roller 86 is maintained in the free state.

In the above-mentioned transition of the roller 86 from the lock state to the free state, the timing at which the arcuate wall 91 collides with the roller 86 is different from the timing at which the driving engagement body 91a collides with the driven engagement body 95. This reduces noise which occurs associated with the collision, as compared with the case where the timing at which the arcuate wall 91 collides with the roller 86 is coincident with the timing at which the driving engagement body 91a collides with the driven engagement body 95.

As illustrated in FIGS. 18 and 19, the support washer 87 is made of a metal material, preferably of brass, and has a crown-shaped and diverging fitting portion 87a. The support washer 87 is inserted into the clutch housing 82 from the opening of the clutch housing 82. In this event, the fitting portion 87a elastically presses the inner peripheral face of the clutch housing 82 to fix the support washer 87 in the clutch housing 82. With the support washer 87, the driving rotor 83, the driven rotor 85, the ball 84 and the rollers 86 are held in the clutch housing 82. Particularly, the rollers 86 are restricted by the bottom plate 82b of the clutch housing 82 and the support washer 87 in its axial movements.

Next, the output unit 3 will be described. As illustrated in FIGS. 17 and 18, the output unit 3 of this embodiment comprises the worm shaft 100, the worm wheel 5 and the buffer member 6 located in the output unit 3 illustrated in FIG. 1. The output unit 3 of this embodiment also comprises a transmission plate 101 and a disc-shaped plate cover 102, instead of the clutch 7 located in the output unit 3 illustrated in FIG. 1.

As illustrated in FIG. 18, the unit housing 4 is fixed to a motor housing 411 with screws or bolts. The clutch 81 is positioned in a space between the unit housing 4 and the motor housing 411.

As illustrated in FIG. 18, a worm accommodating portion 4d of the unit housing 4 rotatably supports the worm shaft 100 by a pair of slide bearings 100b, 100c. The worm shaft 100, unlike the embodiment of FIGS. 1 through 8, is disconnected from the rotating shaft 80 of the motor 2. The worm shaft 100 is positioned substantially coaxially with the rotating shaft 80 of the motor 2 attached to the output unit 3. A support for supporting one end of the worm accommodating portion 4d, in other words, one end of the worm shaft 100, forms a mounting cylinder 4f for mounting the clutch housing 82 thereon. The fitting portion 82d of the clutch housing 82 is fitted on the mounting cylinder 4f in a manner disabling the rotation relative thereto.

The worm shaft 100 is formed in one end surface thereof with a fitting hole 100a of a rectangular shape in cross section. Fitted into the fitting hole 100a is the fitting shaft 85c of the driven rotor 85 of the clutch 81. Therefore, the worm shaft 100 rotates integrally with the driven rotor 85. The cross-sectional shapes of fitting shaft 85c and the fitting hole 100c are not limited to be rectangular, but any shape such as a D-shape and so on may be employed as long as no relative rotation is produced between the worm shaft 100 and the driven rotor 85.

As illustrated in FIG. 17, the transmission plate 101 is made of a metal plate in a generally disc shape, and is mounted on the worm wheel 5 so as to hold the buffer member 6 therebetween. The transmission plate 101 has three stopper pieces 101a which are bent to extend in the axial direction. When the transmission plate 101 is mounted on the worm wheel 5, these stopper pieces 101a are engaged with the slits 6c of the buffer member 6, respectively. Therefore, the rotation of the worm wheel 5 is transmitted to the transmission plate 101 through the buffer member 6, causing the transmission plate 101 to rotate integrally with the worm wheel 5.

The transmission plate 101 has at the center thereof a fitting hole 101b of a cross shape in cross section into which an end portion of the output shaft 10 is fitted. Therefore, the rotation of the transmission plate 101 is directly transmitted to the output shaft 10.

As illustrated in FIG. 17, the plate cover 102 covers the opening of the wheel accommodating portion 4a. The plate cover 102 has four caulking pieces 102a on its outer peripheral edge. With the plate cover 102 carried on the wheel accommodating portion 4a, the caulking pieces 102a are caulked on the outer peripheral face of the wheel accommodating portion 4a to fix the plate cover 102 on the wheel accommodating portion 4a. The plate cover 102 restricts axial movements of parts within the wheel accommodating portion 4a.

The driving apparatus 1 constructed as described above has substantially similar actions and effects to those of the driving apparatus 1 in the embodiment of FIGS. 1 through 8. Particularly, in this embodiment, the clutch 81 is positioned between the rotating shaft 80 of the motor 2 and the worm shaft 100. A torque generated by the rotating shaft 80 and the worm shaft 100 coupled thereto through the clutch 81 is extremely smaller than a torque generated by the worm wheel 5. Therefore, a small load is applied to the clutch 81 between the rotating shaft 80 and the worm shaft 100. For this reason, the clutch 81 is not required to have a very high strength, so that the clutch 81 can be reduced in size by decreasing the strength required for the clutch 81. As a result, it is possible to reduce the size and cost of the driving apparatus 1.

The rotating shaft 80 and the worm shaft 100 are coupled through the clutch 81, and are originally separated in the manufacturing steps of the driving apparatus 1. Therefore, for assembling the driving apparatus 1, the three separately managed units, i.e., the motor 2 with the rotating shaft 80, the output unit 3 with the worm shaft 100, and the clutch 81 can be readily assembled. In addition, the management of these three units 2, 3, 81 is also facilitated.

For assembling the driving apparatus 1, the clutch 81 is first mounted to the mounting cylinder 4f of the output unit 3, and the driven rotor 85 is fitted into the worm shaft 100. Next, the motor 2 is mounted to the output unit 3, and the rotating shaft 80 is fitted into the driving rotor 83. When the motor 2 is coupled to the output unit 3, the rotating shaft 80 should be essentially positioned coaxially with the worm shaft 100. Nevertheless, a slight misalignment may occur between the rotating shaft 80 and the worm shaft 100.

In this embodiment, however, there is a slight gap existing between the inner peripheral face of the clutch housing 82 and the outer peripheral face of the driving rotor 83. This gap allows the driving rotor 83 to move in the radial direction relative to the clutch housing 82. Therefore, the misalignment between the rotating shaft 80 and the worm shaft 100 is compensated for by the radial movement of the driving rotor 83 relative to the clutch housing 82. In other words, the clutch 81 also functions as a mechanism for compensating for the misalignment between the rotating shaft 80 and the worm shaft 100. Therefore, no dedicated feature need be separately provided for compensating for such misalignment, thereby making it possible to reduce the cost of the driving apparatus 1.

The misalignment between the rotating shaft 80 and the worm shaft 100 results from the fact that both shafts 80, 100 are separate parts. However, by allowing the misalignment between both shafts 80, 100 and compensating for the misalignment by means of the clutch 81, it is possible to prevent excessive force from being applied to both shafts 80, 100. This permits smooth rotation of both shafts 80, 100.

Supposing that the rotating shaft 80 and the worm shaft 100 are formed along a single common shaft, bending force may be applied to the common shaft when the motor 2 is coupled to the output unit 3. This would not only make impossible smooth rotation of the common shaft but also burden a bearing which receives the common shaft. For this reason, a complicated bearing structure need be employed.

In contrast, this embodiment, which has the rotating shaft 80 and the worm shaft 100 formed as separate parts, is free from such problem.

The mounting cylinder 4f for supporting one end of the worm shaft 100 also serves as a member for fixing the clutch 81 to the output unit 3. Therefore, a dedicated member need not be provided for fixing the clutch 81 to the output unit 3, thus contributing to a reduction in the cost of the driving apparatus 1.

Since the clutch 81 is mounted to the mounting cylinder 4f for supporting the worm shaft 100, the clutch 81, more specifically, the driven rotor 85 can be readily positioned to be coaxial with the worm shaft 100, thereby avoiding misalignment between the driven rotor 85 and the worm shaft 100. This results in prevention of strange noise and vibrations associated with the misalignment between the driven rotor 85 and the worm shaft 100.

The buffer member 6 made of rubber is provided between the worm wheel 5 and the transmission plate 101. The elasticity of the buffer member 6 allows relative movements between the worm wheel 5 and the transmission plate 101. For example, when the windowpane 250 (see FIG. 8) is applied with a load, this prevents the load from being impulsively transmitted to respective parts comprising the output unit 3 and the motor 2. Particularly, the impulse is prevented from being applied to the teeth of the respective parts 5, 100 comprising the worm gear mechanism, thereby ensuring smooth movements of these parts.

Both ends of the roller 86 are tapered, so that both end faces of the roller 86 have a reduced area. Therefore, the contact areas of the roller 86 with the support washer 87 and the bottom plate 82b of the clutch housing 82 are smaller. This reduces a sliding resistance of the roller 86 to the support washer 87 and the bottom plate 82b, permits smooth movements of the clutch 81, and reduces noise.

Alternatively, the clutch 50 illustrated in FIG. 9 may be located between the rotating shaft 80 and the worm shaft 100, instead of the clutch 81 of this embodiment.

Seventh Embodiment

Figure 23:
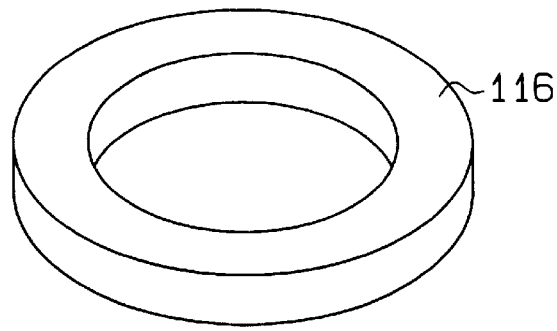
FIG. 23 is a perspective view illustrating a support ring located in a clutch according to a seventh embodiment of the present invention.
Figure 24:
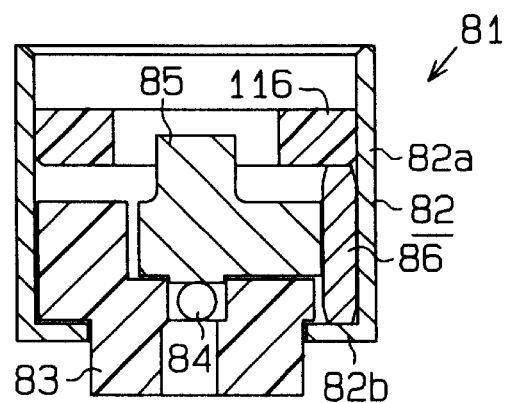
FIG. 24 is a front cross-sectional view illustrating a clutch comprising the support ring of FIG. 23.

Next, a seventh embodiment of the present invention will be described with reference to FIGS. 23 and 24. This embodiment is an example of modifications to the embodiment of FIGS. 17 through 22. Specifically, as illustrated in FIGS. 23 and 24, a clutch 81 of this embodiment comprises a support ring 116 made of resin as a restriction plate, instead of the support washer 87 illustrated in FIG. 19. The support ring 116 is press fitted into the clutch housing 82 from the opening of the clutch housing 82, and fixed therein. With the support ring 116, the driving rotor 83, the driven rotor 85, the ball 84 and the rollers 86 are held in the clutch housing 82. Particularly, the rollers 86 are restricted in axial movements by the restriction plate, i.e., the bottom plate 82b and the support ring 116. Since the support ring 116 is made of a resin material, sliding noise generated between the rollers 86 and the support ring 116 is suppressed, as compared with that made of metal.

In the embodiment of FIGS. 1 through 8, at least one of the two members for restricting axial movements of the rollers 14, i.e., the washer 15 and the cap 16 may be formed of a resin material. Similarly, in the embodiment of FIGS. 9 through 13, at least one of the two members for restricting axial movements of the rollers 54, i.e., the washer 55 and the bottom plate 51b of the clutch housing 51 may be formed of a resin material.

Eighth Embodiment

Figure 25:
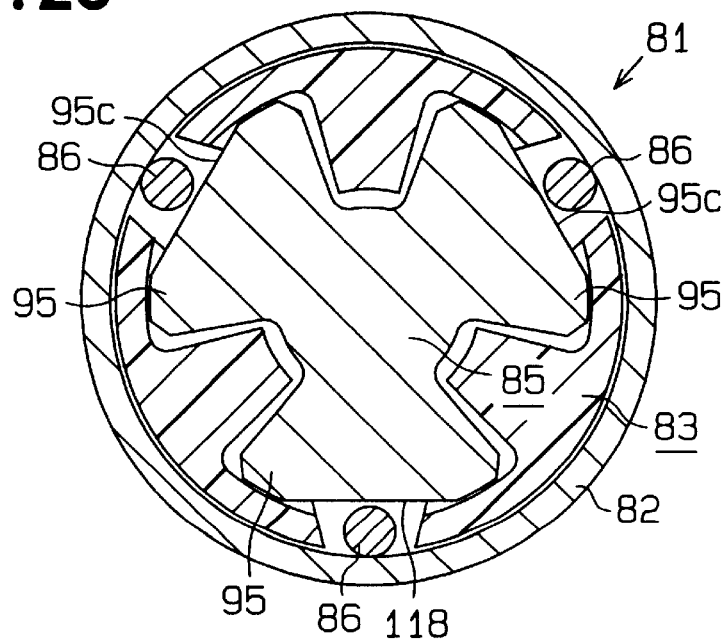
FIG. 25 is a plane cross-sectional view illustrating a clutch according to an eighth embodiment of the present invention.

Next, an eighth embodiment of the present invention will be described with reference to FIG. 25. This embodiment is an example of modifications to the embodiment of FIGS. 17 through 22. Specifically, as illustrated in FIG. 25, a restriction face 95c of a driven engagement body 95 in this embodiment is planar rather than V-shaped. Such a planar restriction face may also be applied to the restriction face 41c of the driven rotor 12 illustrated in FIG. 3, and to the restriction face 71c of the driven rotor 53 illustrated in FIG. 9.

Ninth Embodiment

Figure 26A:
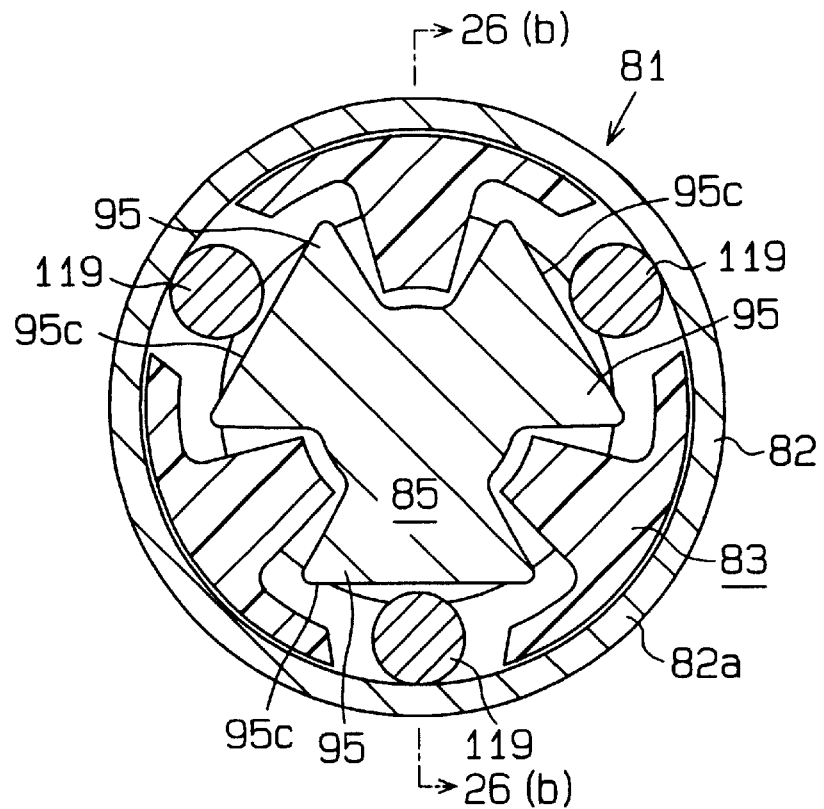
FIG. 26(a) is a plane cross-sectional view illustrating a clutch according to a ninth embodiment of the present invention, and more specifically, a cross-sectional view taken along the line 26(a)—26(a) in FIG. 26(b)
Figure 26B:
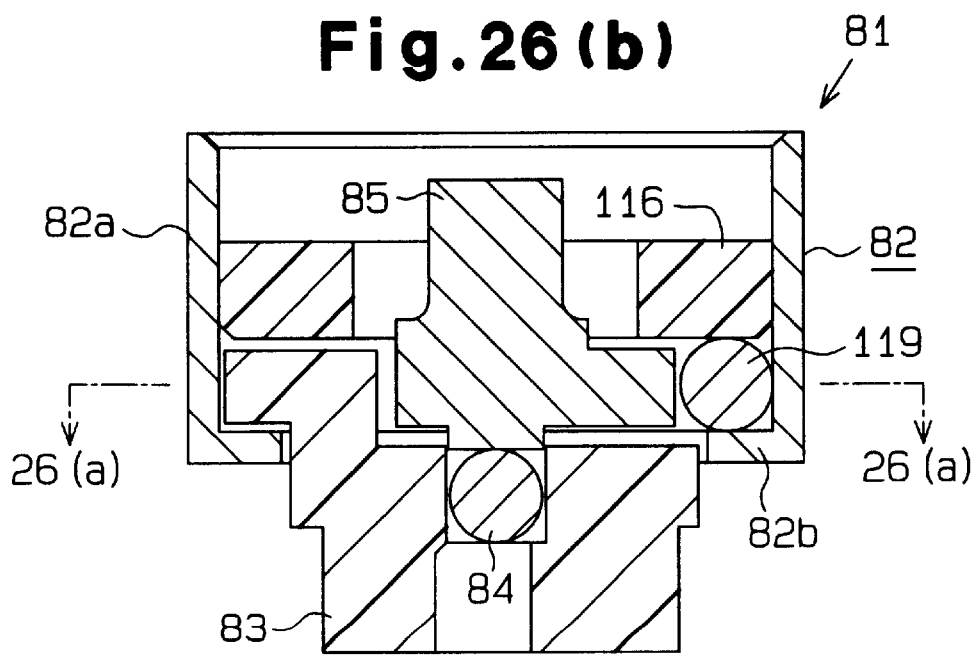
FIG. 26(b) is a cross-sectional view taken along the line 26(b)—26(b) in FIG. 26(a)

Next, a ninth embodiment of the present invention will be described with reference to FIGS. 26(a) and 26(b). This embodiment is an example of modifications to the embodiment of FIGS. 17 through 22. Specifically, as illustrated in FIGS. 26(a) and 26(b), a clutch 81 of this embodiment uses balls 119 as rolling bodies functioning as lock members, instead of the cylindrical rollers 86 illustrated in FIG. 19. Also, in the clutch 81 of this embodiment, the support ring 116 made of resin, illustrated in FIG. 23, is used, and a restriction face 95c of the driven engagement body 95 is planar, similar to the embodiment of FIG. 25. However, the support washer 87 illustrated in FIG. 19 may be used, or the restriction face 95c may be formed in a V-shape.

The ball 119 is in point contact with the clutch housing 82 and the support ring 116. Therefore, contact areas of the ball 119 to the clutch housing 82 and the support ring 116 are smaller. This reduces a sliding resistance of the ball 119 to the clutch housing 82 and the support ring 116 to reduce noise therebetween.

The balls 119 may be the same parts as balls 84 for receiving the driven rotor 85. In this way, the parts can be commonly used to contribute to a reduction in the manufacturing cost.

The rollers 14 illustrated in FIG. 1, or the rollers 54 illustrated in FIG. 54 may be replaced with balls.

Tenth Embodiment

Next, a tenth embodiment of the present invention will be described with reference to FIGS. 27 through 37, centered on differences with the embodiment of FIGS. 17 through 22. Members equivalent to those in the embodiment of FIGS. 17 through 22 are designated the same reference numerals.

Figure 27:
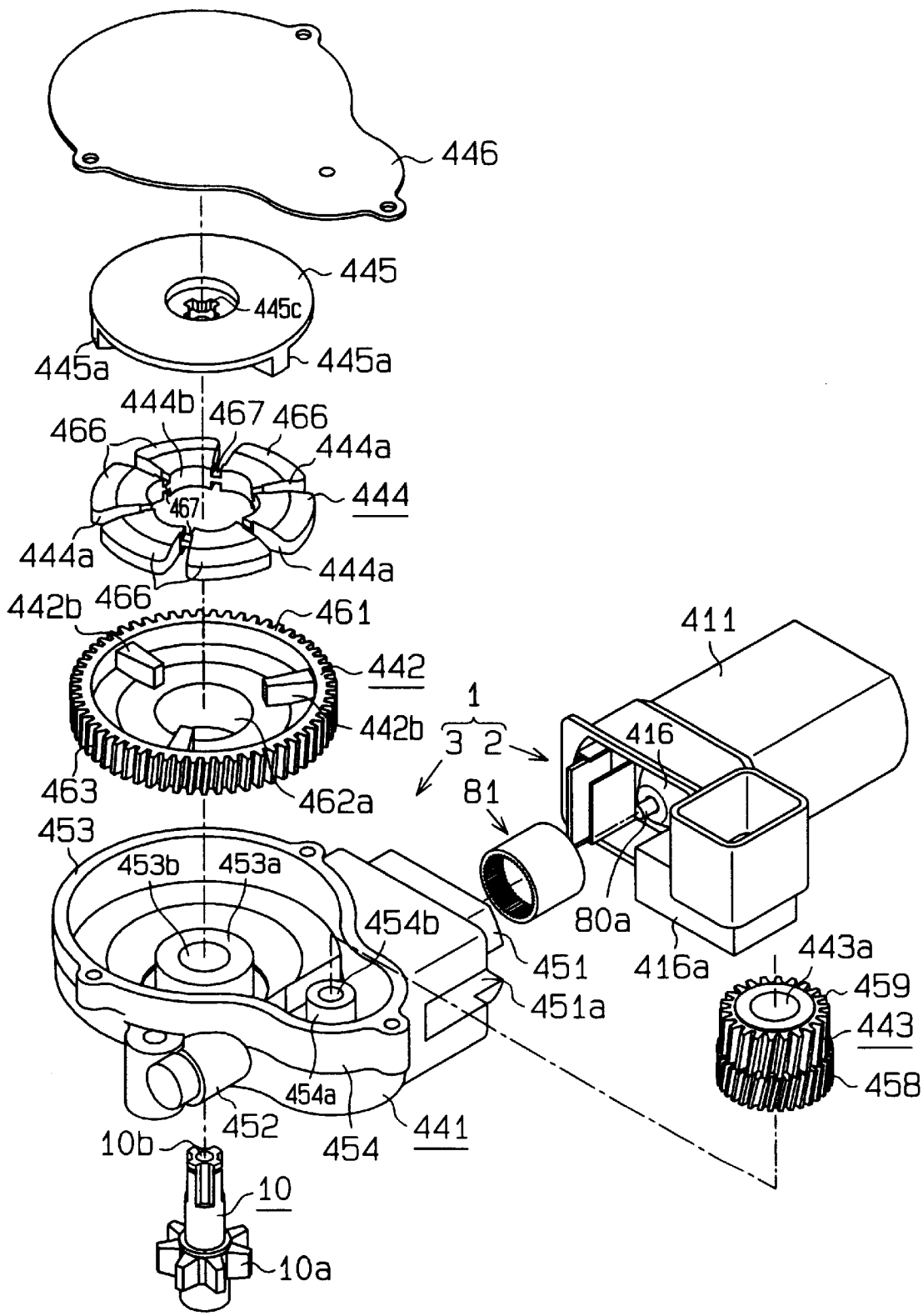
FIG. 27 is an exploded perspective view illustrating a driving apparatus equipped with a clutch according to a tenth embodiment of the present invention.
Figure 28:
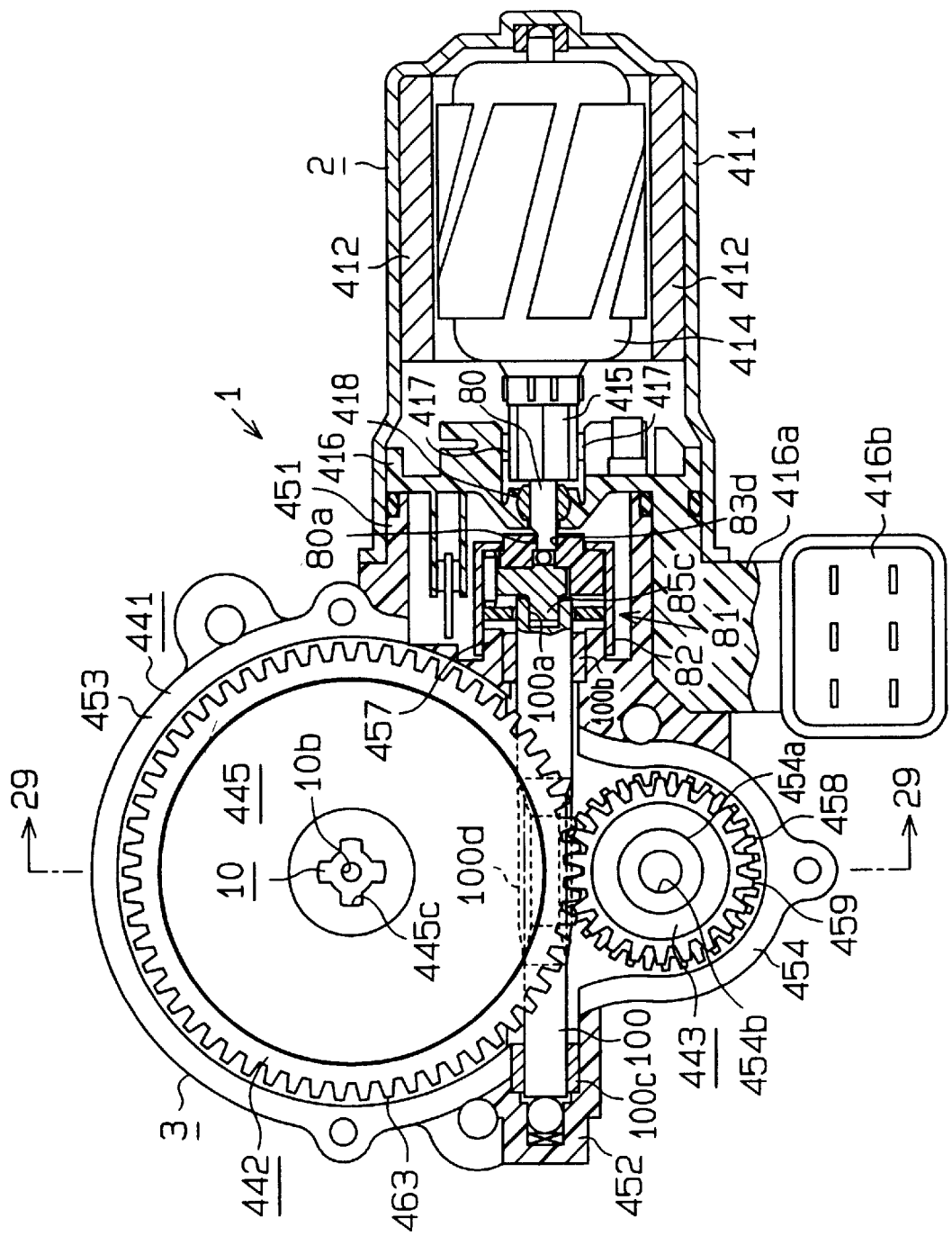
FIG. 28 is a plane cross-sectional view of the driving apparatus of FIG. 27.

As illustrated in FIGS. 27 and 28, while a motor 2 in this embodiment is basically the same as the motor illustrated in FIG. 18, a brush holder 416 is provided with an extension 416a which extends outward from the motor housing 411. The extension 416a is provided with a power supply unit 416b. A current from an external power supply (not shown) is supplied to an armature 414 through the power supply unit 416b, a brush 417 and a commutator 415.

Figure 30:
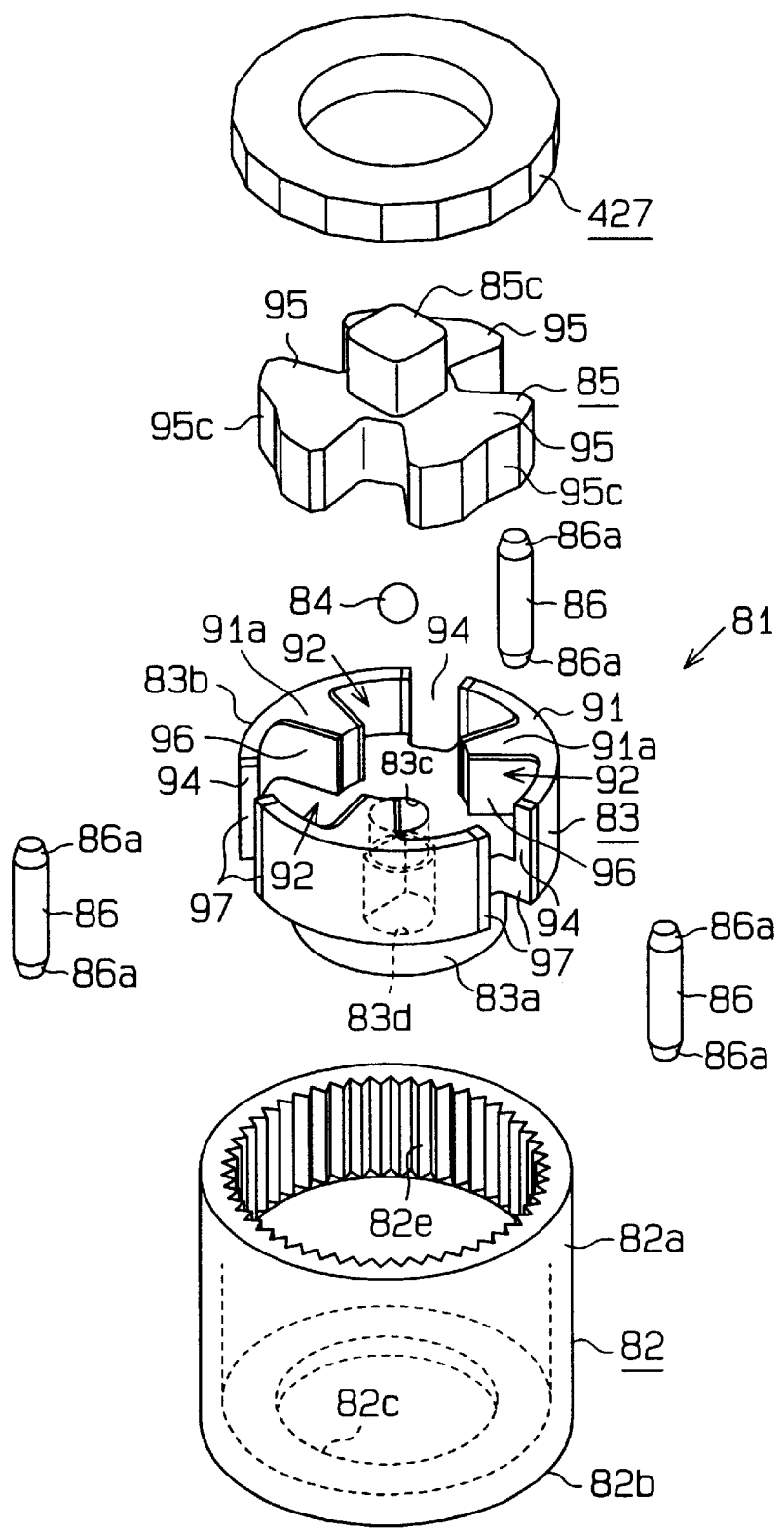
FIG. 30 is an exploded perspective view illustrating the clutch located in the driving apparatus of FIG. 27.

As illustrated in FIG. 30, while a clutch 81 in this embodiment is basically the same as the clutch 81 illustrated in FIG. 19, a clutch housing 82 made of metal has multiple splines 82e, which axially extend, on the inner peripheral face thereof near an opening. The clutch 81 also has a support ring 427 substantially similar to the support ring 116 made of resin, illustrated in FIG. 23. The support ring 427 as a restriction plate has its outer periphery in a polygonal shape, more specifically, in an equilateral octadecagonal shape.

Figure 31:
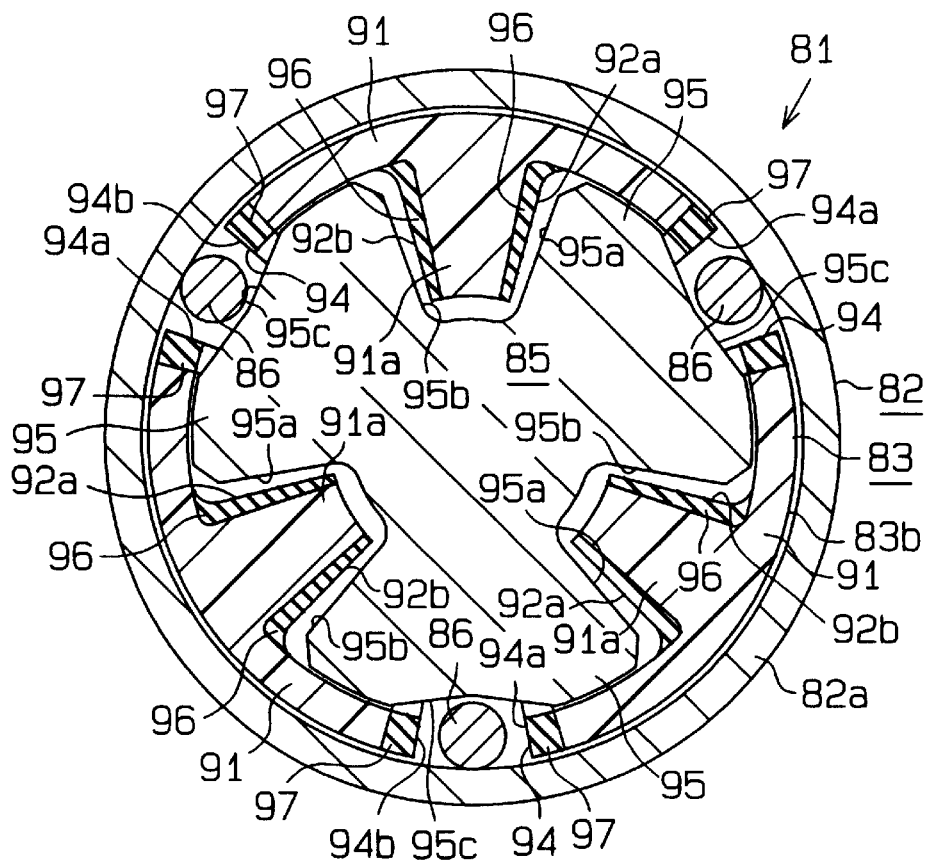
FIG. 31 is a plane cross-sectional view of the clutch of FIG. 30.

As illustrated in FIGS. 30 and 31, buffer members 96, made of rubber or the like, are attached on both circumferential sides of each of driving engagement bodies 91a. A face of the buffer member 96 opposite to a first side face 95a of a driven engagement body 95 functions as a first side face 92a of the driving engagement body 91a. A face of the buffer member 96 opposite to a second side face 95b of the driven engagement body 95 functions as a second side face 92b of the driving engagement body 91a. The width of each driving engagement body 91a in the circumferential direction, in other words, the spacing between the first side face 92a and the second side face 92b in the circumferential direction is the same as that of the driving engagement body 91a in FIG. 20.

Buffer members 97 made of rubber are attached on both circumferential sides of each arcuate wall 91 of the drive rotor 83. Faces of both buffer members 97 opposing each other, with a rotor 86 held therebetween, function as a first side face 94a of the arcuate wall 91 and a second side face 94b of the arcuate wall 91. A notch 94 is defined between the first and the second side face 94a, 94b which oppose each other. The width of the notch 94 in the circumferential direction is the same as that of the notch 94 illustrated in FIG. 20.

Figure 33A:
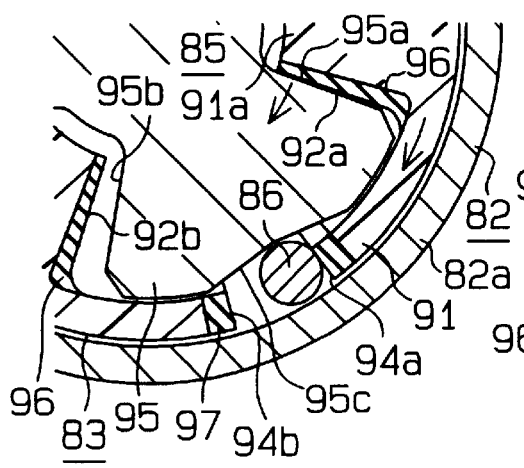
FIGS. 33(a) and 33(b) are partial cross-sectional views for explaining the operation of the clutch of FIG. 30.
Figure 33B:
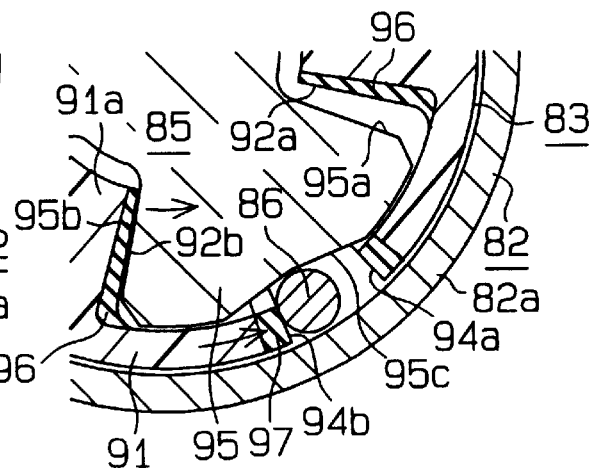

FIGS. 33(a) and 33(b) are views corresponding to FIGS. 21(a) and 21(b), respectively. In FIGS. 33(a) and 33(b), as is the case of FIGS. 21(a) and 21(b), the driving rotor 83 rotates in the clockwise direction or in the counterclockwise direction to maintain the rollers 86 in the free state, thereby allowing the driven rotor 85 to rotate. In this event, the driving engagement body 91a collides with the driven engagement body 95 through the buffer member 96, while the arcuate wall 91 collides with the roller 86 through the buffer member 97. Therefore, noise and impulse generated to the accompaniment of the collision are relieved.

Figure 34A:
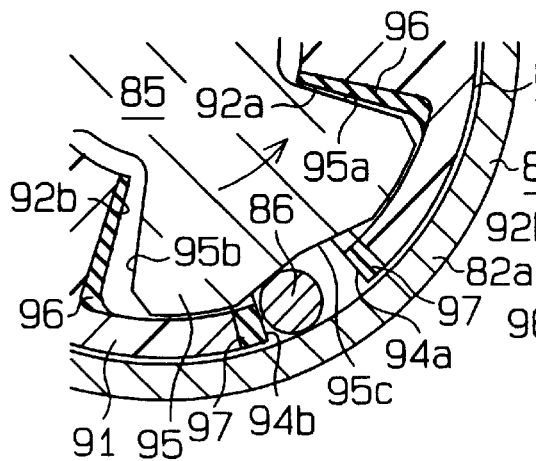
FIGS. 34(a) and 34(b) are partial cross-sectional views for explaining the operation of the clutch of FIG. 30.
Figure 34B:
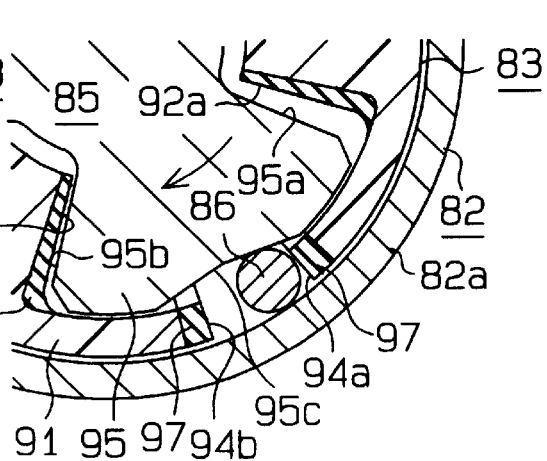

FIGS. 34(a) and 34(b) are views corresponding to FIGS. 22(a) and 22(b), respectively. In FIGS. 34(a) and 34(b), as is the case of FIGS. 22(a) and 22(b), when the driven rotor 85 itself rotates in the counterclockwise direction or in the clockwise direction, the roller 86 transits to the lock state to block the rotation of the driven rotor 85 relative to the clutch housing 82.

FIG. 35(a) illustrates the operation of the roller 86 when it transits from the lock state illustrated in FIG. 34(a) to the free state, resulting from the rotation of the driving rotor 83 in the clockwise direction. FIG. 35(b) illustrates the operation of the roller 86 when it transits from the lock state illustrated in FIG. 34(b) to the free state, resulting from the rotation of the driving rotor 83 in the counterclockwise direction. FIG. 36(a) illustrates the operation of the roller 86 when it transits from the lock state illustrated in FIG. 34(a) to the free state, resulting from the rotation of the driven rotor 83 in the counterclockwise direction. FIG. 36(b) illustrates the operation of the roller 86 when it transits from the lock state illustrated in FIG. 34(b) to the free state, resulting from the rotation of the driving rotor 83 in the clockwise direction. Description on the operation involved in the transition of the roller 86 from the rock state to the free state, illustrated in these figures, which have been made in the embodiment of FIGS. 17 through 22, is therefore omitted here.

During the foregoing transition of the roller 86 from the lock state to the free state, the driving engagement body 91a collides with the driven engagement body 95 through the buffer member 96, while the arcuate wall 91 collides with the roller 86 through the buffer member 97. Therefore, noise and impulse generated to the accompaniment of the collision are relieved.

Next, the output unit 3 will be described. As illustrated in FIGS. 27 and 28, the output unit 3 comprises a unit housing 441, a worm shaft 100, a worm wheel 443, a helical gear 442, a buffer member 444, an end plate 445, a cover 446, and an output shaft 10. The worm shaft 100, the worm wheel 443 and the helical gear 442 comprise a worm gear mechanism which functions as a decelerating mechanism and a torque amplifying mechanism.

Figure 37:
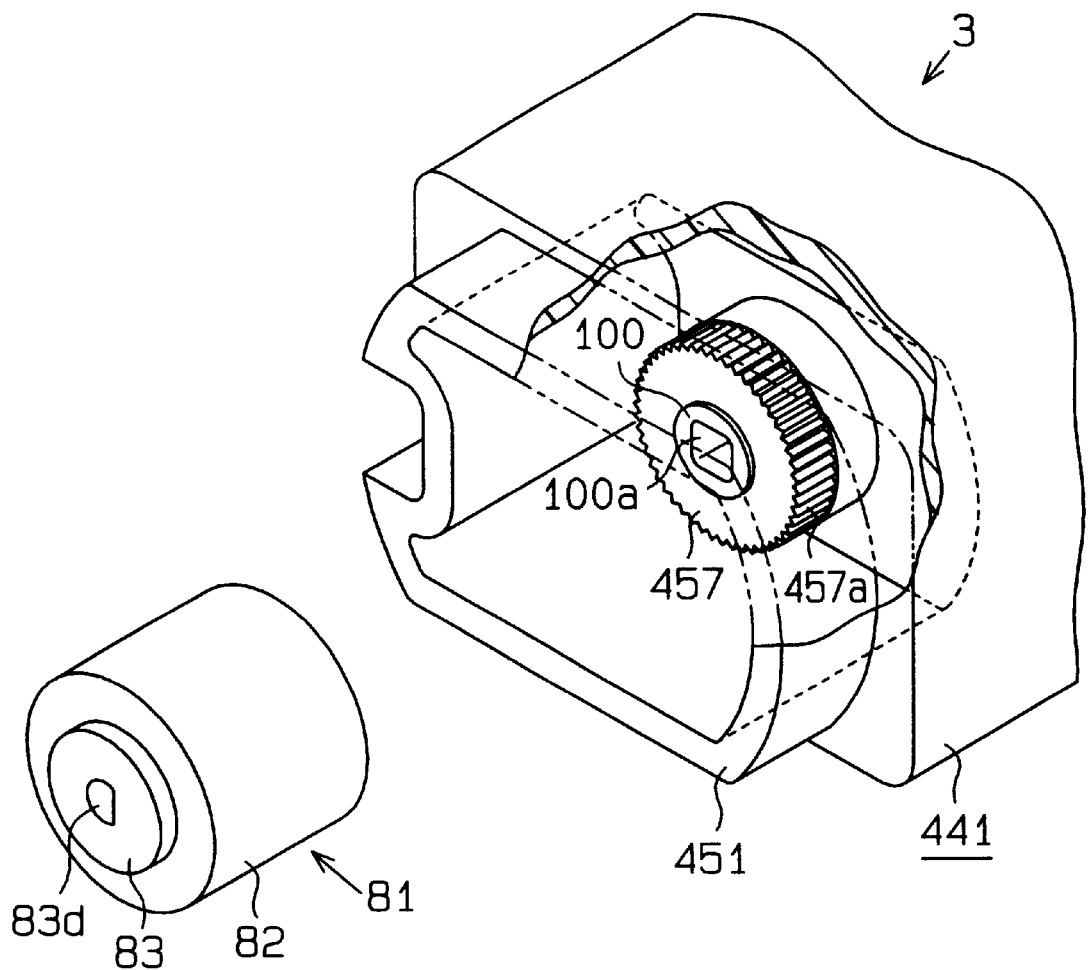
FIG. 37 is a partial perspective view illustrating a structure for coupling an output unit to a clutch in the driving apparatus of FIG. 27.

As illustrated in FIGS. 27, 28 and 37, the unit housing 441 has a fitting cylinder 451 in a flat cylindrical shape which fits into the open end of the motor housing 411. The fitting cylinder 451 is inserted into the open end of the motor housing 411 to fix the output unit 3 to the motor 2. The fitting cylinder 451 has a groove 451a on its outer peripheral face for engagement with the extension 416a of the motor 2. When the output unit 3 is fixed to the motor 2, the clutch 81 is located inside the fitting cylinder 451.

Figure 32:
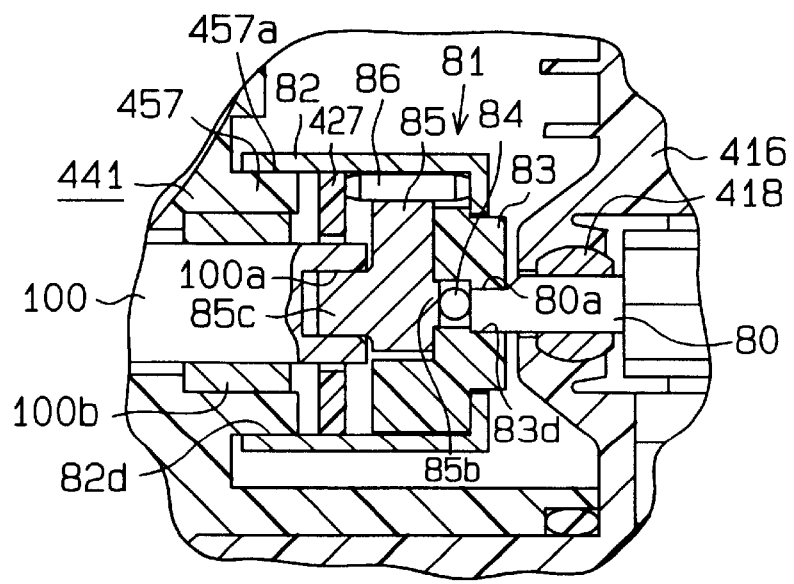
FIG. 32 is a partial cross-sectional view illustrating a portion of the clutch in the driving apparatus of FIG. 28 in an enlarged view.

As illustrated in FIGS. 28 and 32, the worm shaft 100 is rotatably supported by the unit housing 441 so as to be positioned substantially coaxially with the rotating shaft 80 of the motor 2 attached to the output unit 3. The unit housing 441 comprises a closed supporting cylinder 452 for supporting a distal end (the left-hand end in FIG. 28) of the worm shaft 100, and a mounting cylinder 457 for supporting a proximal end of the worm shaft 100. The supporting cylinder 452 and the mounting cylinder 457 are located on the same axis. The supporting cylinder 452 and the mounting cylinder 457 support the worm shaft 100 through slide bearings 100c, 100b, respectively. As illustrated in FIG. 37, the mounting cylinder 457 is located within the fitting cylinder 451.

The mounting cylinder 457 as a support for supporting the proximal end of the worm shaft 100 functions for mounting the clutch housing 82. Specifically, as illustrated in FIG. 37, the mounting cylinder 457 has an outer diameter corresponding to the inner diameter of the clutch housing 82. On the outer peripheral face of the mounting cylinder 457, multiple splines 457a are formed for engagement with the splines 82d (see FIG. 30) of the clutch housing 82. Both splines 82e, 457a are engaged with each other to mount the clutch housing 82 to the mounting cylinder 457 in a manner disabling the rotation.

Figure 29:
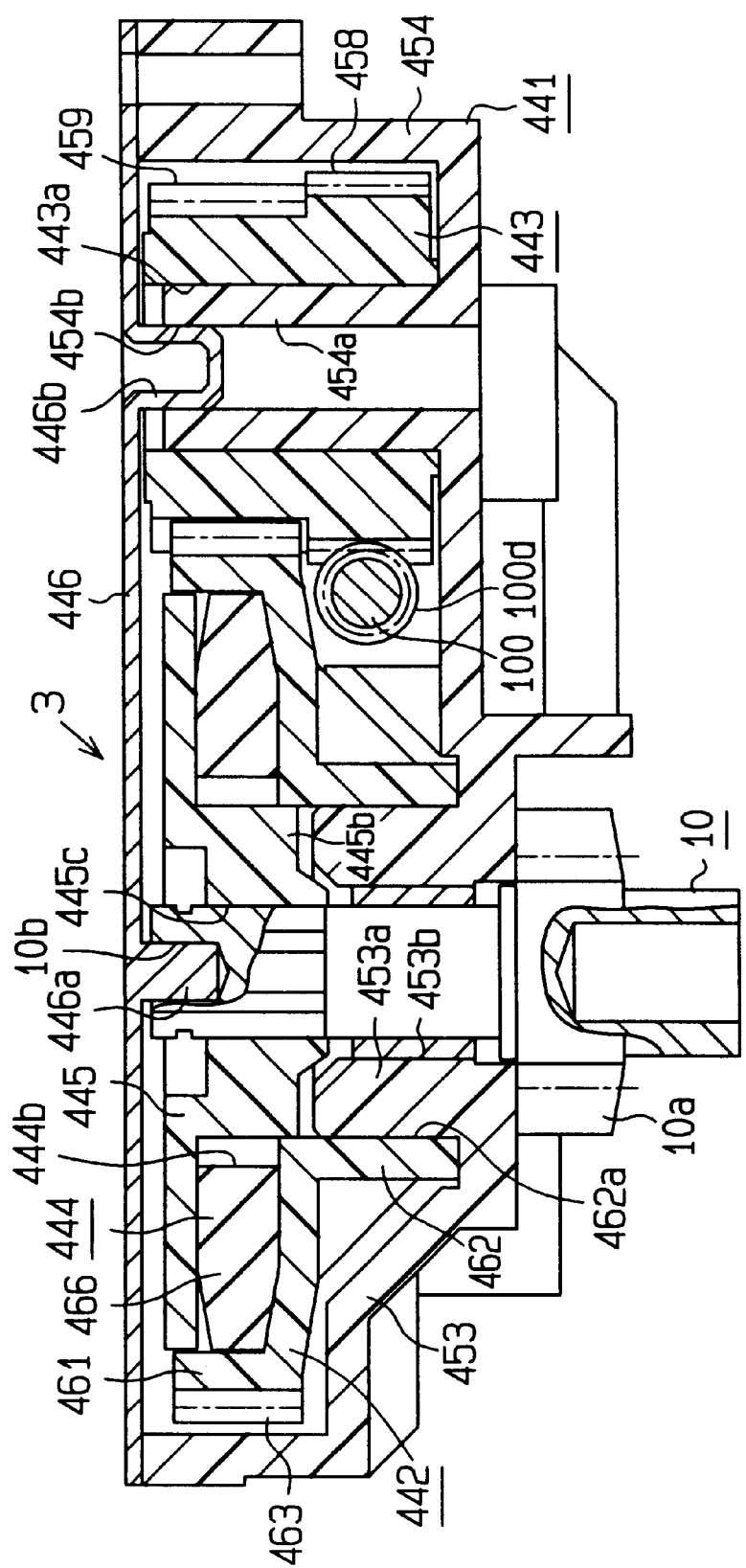
FIG. 29 is a cross-sectional view taken along the line 29—29 in FIG. 28.

As illustrated in FIGS. 27 through 29, the unit housing 441 comprises a first accommodating portion 454 for accommodating the worm wheel 443, and a second accommodating portion 453 for accommodating the helical gear 442. The accommodating portions 454, 453 are each formed generally in a closed cylinder, and are positioned on opposite sides to each other with respect to the worm shaft 100 interposed therebetween. Both the accommodating portions 454, 453 have inner spaces in communication with each other. The helical gear 442 has a diameter larger than that of the worm wheel 443, and the second accommodating portion 453 has a diameter larger than that of the first accommodating portion 454 in accordance with the difference in diameter.

The supporting cylinder 454a is implanted on the inner bottom of the first accommodating portion 454. The supporting cylinder 454a has an attachment hole 454b for attaching the cover 446 thereto. The worm wheel 443 is made of a resin material, and is divided into a first gear 458 and a second gear 459 at an intermediate location in the axial direction. Both gears 458, 459 are helical gears formed integrally with each other. The first gear 458 is slightly larger in diameter than the second gear 459. The worm wheel 443 has a-shaft hole 443a. The supporting cylinder 454a is fitted into the shaft hole 443a to rotatably support the worm wheel 443 by the supporting cylinder 454a in the first accommodating portion 454. In this event, the first gear 458 is meshed with the spiral teeth 100d of the worm shaft 100.

The supporting cylinder 453a is implanted on the inner bottom of the second accommodating portion 453. The supporting cylinder 453a has a shaft hole 453b for rotatably supporting the output shaft 10. The helical gear 442 is made of a resin material, and includes a gear wheel 461 comprised of a cylindrical body and an annular bottom plate, and a cylindrical body 462 extending from the bottom plate of the gear wheel 461. The supporting cylinder 453a is fitted into the shaft hole 462a of the cylindrical body 462 to rotatably support the helical gear 442 by the supporting cylinder 453a in the second accommodating portion 453. In this event, teeth 463 formed around the outer periphery of the gear wheel 461 are meshed with the second gear 459 of the worm wheel 443. On the inner side of the gear wheel 461, three radially extending stopper protrusions 442b are formed at equal angular intervals (120°).

The buffer member 444, which is made of rubber, is located in the gear wheel 461. The buffer member 444 includes six fan-shaped rubber segments 466 arranged at equal angular intervals (60°), and elongated coupling rubbers 467 for coupling adjacent rubber segments 466 to each other, and is generally has an annular shape. A slit 444a extending in a radial direction is formed between two adjacent rubber segments 466. The buffer member 444 is formed with a shaft hole 444b at the center thereof. The three slits 444a arranged at angular intervals of 120° are engaged with the three stopper protrusions 442b to mount the buffer member 444 in the helical gear 442 for rotation integral therewith.

The end plate 445, which is made of a generally disc-shaped resin material, is mounted on the helical gear 442 such that the buffer member 444 is held therebetween. On a lower face of the end plate 445 three radially extending stopper protrusions 445a are formed at equal angular intervals (120°). When the end plate 445 is mounted on the helical gear 442, these stopper protrusions 445a are engaged with the remaining slits 444a which are not engaged with the stopper protrusions 442b of the helical gear 442. Thus, the rotation of the helical gear 442 is transmitted to the end plate 445 through the buffer member 444, so that the end plate 445 rotates integrally with the helical gear 442.

The coupling cylinder 445b extends downward from the center of the end plate 445. The coupling cylinder 445b is inserted into the shaft hole 444b of the buffer member 444, with its distal end fitted into the shaft hole 462a of the helical gear 442. The coupling cylinder 445b has a fitting hole 445c of a cross shape in cross section.

The output shaft 10 is inserted into the supporting cylinder 453a of the second accommodating portion 453 from the bottom of the unit housing 441, with its upper end protruding upward from the supporting cylinder 453a. The upper end of the output shaft 10 is inserted into the fitting hole 445c. Thus, the output shaft 10 rotates integrally with the end plate 445. On an upper end face of the output shaft 10, an attachment hole 10b is formed for attaching the cover 446 thereto. On the other hand, a portion of the output shaft 10 protruding outward from the unit housing 441 is formed with the gear 10a, as described above. The gear 10a is meshed with the fan-shaped gear 270a of the lifting mechanism 270 (see FIG. 8).

The cover 446, which is made of a metal plate, is mounted on the unit housing 441 so as to cover openings of the first accommodating portion 454 and the second accommodating portion 453. The cover 446 comprises two bosses 446a, 446b. These bosses 446a, 446b are fitted into the attachment hole 10b of the output shaft 10 and the attachment hole 454b of the supporting cylinder 454a to position the cover 446 with respect to the unit housing 441. By attaching the cover 446 on the unit housing 441, parts within the unit housing 441 are restricted in axial movements.

The driving apparatus 1 constructed as described above has substantially similar actions and effects to the driving apparatus 1 in the embodiment of FIGS. 17 through 22. Particularly, in this embodiment, the driving rotor 83 is provided with the buffer members 96, 97. Therefore, the driving engagement body 91a collides with the driven rotor 95 through the buffer member 96, while the arcuate wall 91 collides with the roller 86 through the buffer member 97. This relieves noise and impulse which are generated to the accompaniment of the collision.

The clutch housing 82 and the mounting cylinder 457 have the splines 82e, 457a, respectively. Engagement of both splines 82e, 457e with each other prevents the rotation of the clutch housing 82 relative to the mounting cylinder 457, i.e., the unit housing 441 without fail.

Alternatively, an elastic material other than rubber, for example, a spring may be used for the buffer members 96, 97.

Eleventh Embodiment

Figure 38:
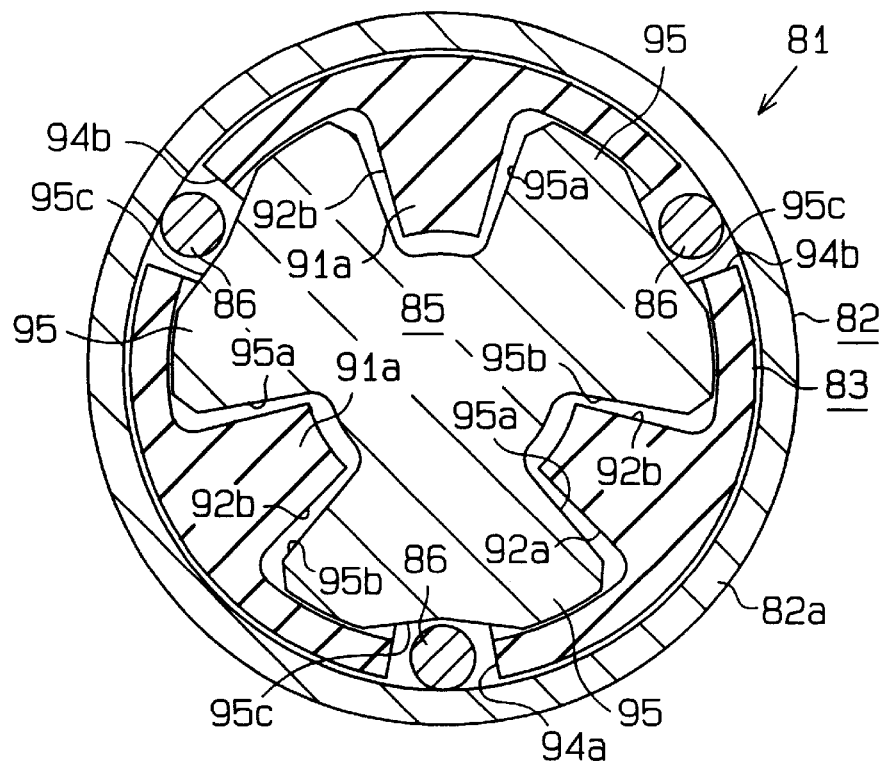
FIG. 38 is a plane cross-sectional view illustrating a clutch according to an eleventh embodiment of the present invention.

Next, an eleventh embodiment of the present invention will be described with reference to FIG. 38. This embodiment shows an example of modifications to the embodiment of FIGS. 27 through 37. Specifically, as illustrated in FIG. 38, in this embodiment, the entire driving rotor 83 is formed of a material which can relieve an impulse associated with a collision. As such a material, a mixture of a resin material and a rubber material is preferred.

Twelfth Embodiment

Figure 39:
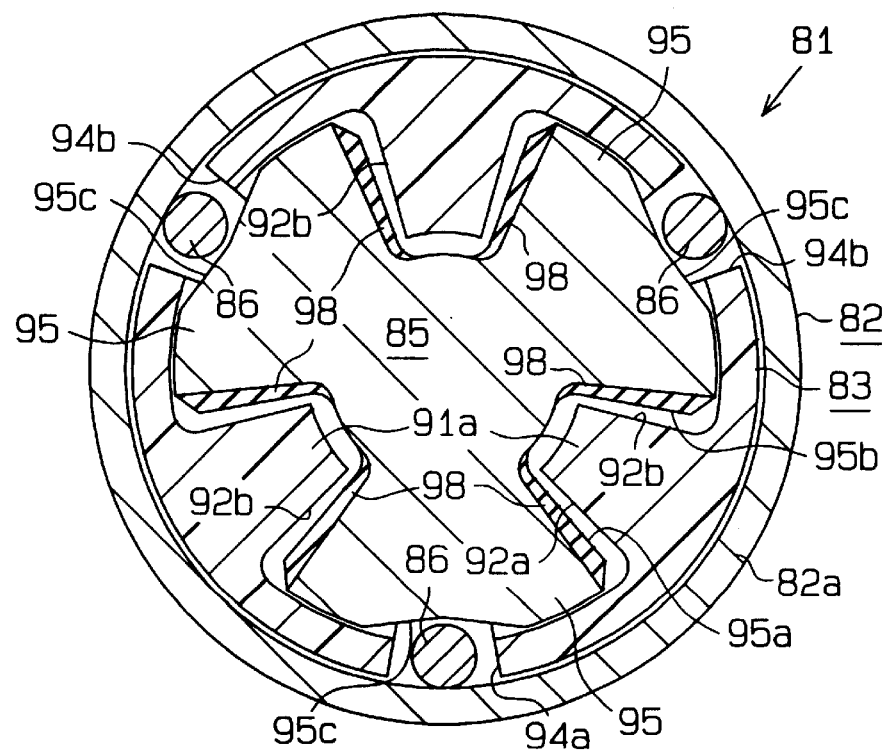
FIG. 39 is a plane cross-sectional view illustrating a clutch according to a twelfth embodiment of the present invention.

Next, a twelfth embodiment of the present invention will be described with reference to FIG. 39. This embodiment is an example of modifications to the embodiment of FIGS. 27 through 37. Specifically, as illustrated in FIG. 39, in this embodiment, buffer members 98 made of rubber or the like are provided for the driven rotor 85 rather than the driving rotor 83. More specifically, the buffer members 98 are located on both circumferential sides of each driven engagement body 95. In this case, a face of the buffer member 98 opposite to the first side face 92a of the driving engagement body 91a functions as the first side face 95a of the driven engagement body 95. A face of the buffer member 98 opposite to the second side face 92b of the driving engagement face 91a functions as the second side face 95b of the driven engagement body 95.

Similar to the embodiment of FIG. 38, the entire driven rotor 85 may be formed of a mixture of a resin material and a rubber material.

Thirteenth Embodiment

Next, a thirteenth embodiment of the present invention will be described with reference to FIGS. 40 through 43. This embodiment shows a further example of modifications to the clutch. A driving apparatus, to which the clutch of this embodiment is applied, may be any of the aforementioned driving apparatus illustrated in the embodiments of FIGS. 17 through 22 or FIGS. 27 through 37. Therefore, parts other than the clutch are indicated with the reference numerals used in the embodiments of FIGS. 17 through 22 or FIGS. 27 through 37.

Figure 40:
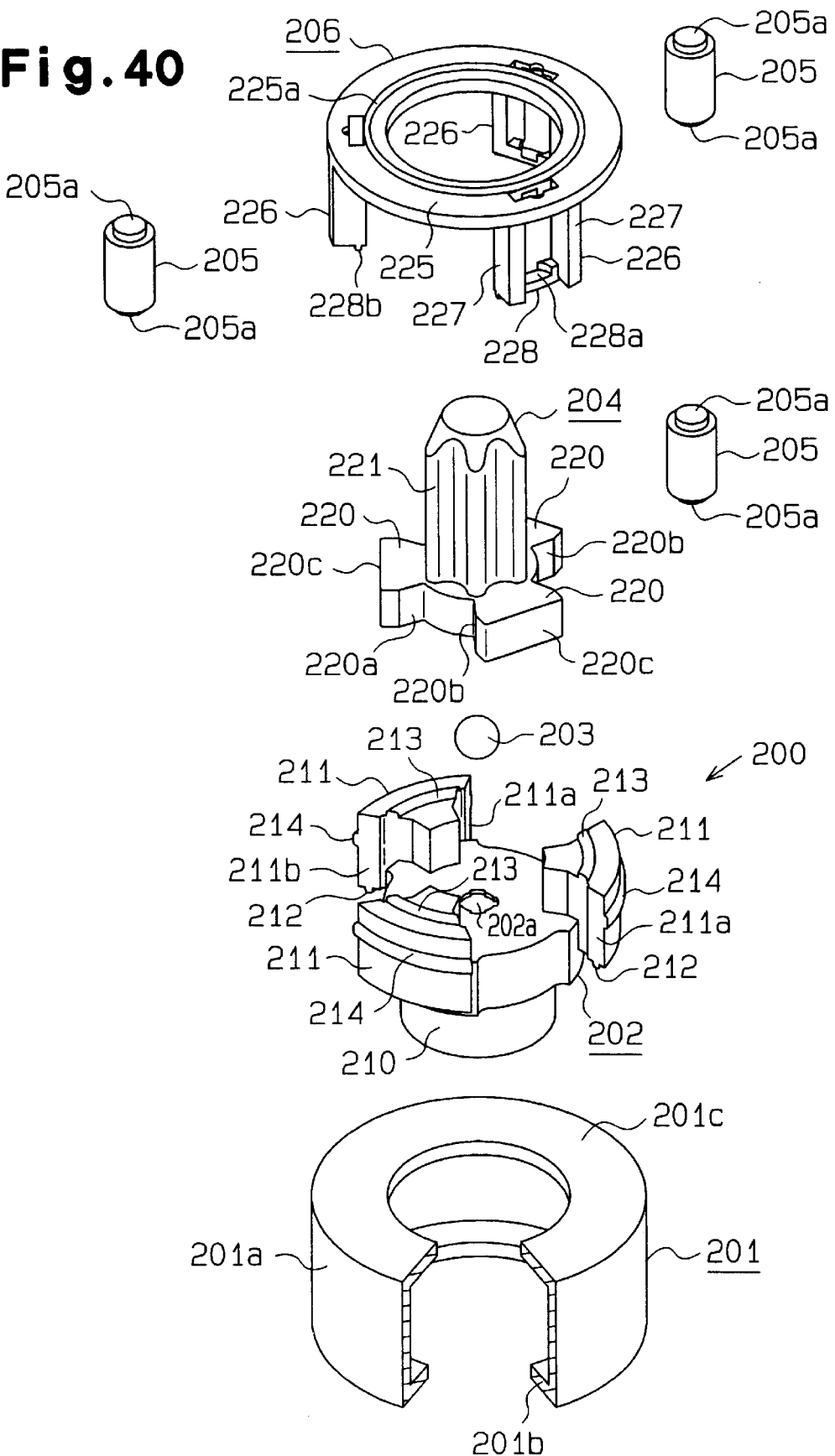
FIG. 40 is an exploded perspective view illustrating a clutch according to a thirteenth embodiment of the present invention.
Figure 41:
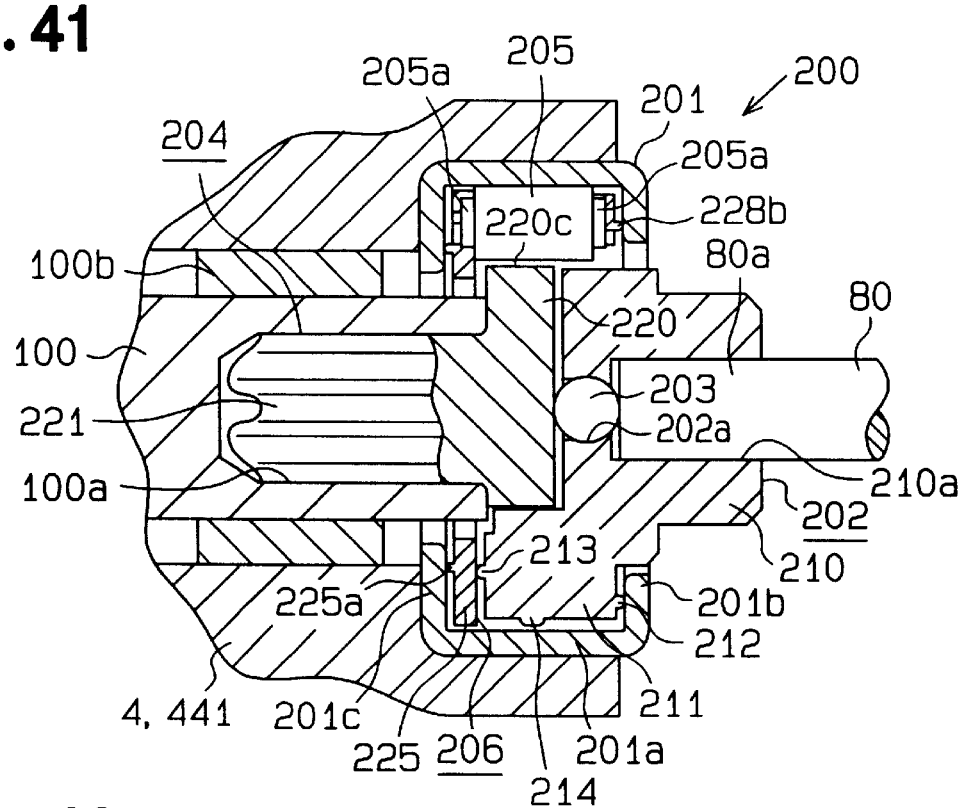
FIG. 41 is a cross-sectional view of the clutch of FIG. 40.

As illustrated in FIGS. 40 and 41, a clutch 200 of this embodiment basically has the same structure as the clutch 81 illustrated in FIG. 19 or 30. Specifically, the clutch 200 comprises a clutch housing 201, a driving rotor 202, a ball 203, a driven rotor 204, a plurality (three in this embodiment) of cylindrical rollers 205, and a support member 206. The driving rotor 202, the ball 203, the driven rotor 204, the rollers 205 and the support member 206 are assembled into the clutch housing 201 in such a manner that they cannot be removed. Then, the driving apparatus is assembled using the clutch 200 previously assembled as a single unit.

As illustrated in FIG. 41, the clutch 200 is fitted into the unit housing 4 or 441, in a manner disabling the rotation relative to it, such that the rotating shaft 80 of the motor 2 is coupled to the worm shaft 100. However, the clutch 200 may be attached to the motor 2, preferably, to the brush holder 416 (see FIG. 18 or 28). However, the brush holder 416 must be formed such that the clutch 200 is fitted into the brush holder 416.

As illustrated in FIGS. 40 and 41, the clutch housing 201, which is made of a metal material, comprises a cylindrical body 201a, and annular lid plates 201b, 201c located on openings at both ends of the cylindrical body 201a. The lid plates 201b, 201c are formed, for example, by bending both ends of the cylindrical body 201a toward the inside, for restricting axial movements of parts within the clutch housing 201.

The driving rotor 202, which is formed of a resin material, comprises a fitting cylinder 210 which protrudes outwardly from the lid plate 201b of the clutch housing 201. The fitting cylinder 210 has a fitting hole 210a into which the fitting portion 80a of the rotating shaft 80 is fitted. Therefore, the driving rotor 202 is coupled to the rotating shaft 80 for rotation integral therewith. The driving rotor 202 further comprises a plurality (three in this embodiment) of driving engagement bodies 211 which are arranged at equal angular intervals. Each of the driving engagement bodies 211 generally has a fan-shape, and has a first side face 211a and a second side face 211b functioning as a driving engagement face and a pressing face on both circumferential sides. A slight gap is formed between the outer peripheral faces of the driving engagement bodies 211 and the inner peripheral face of the clutch housing 201.

Each of the driving engagement bodies 211 has a first convex limb 212 and a second convex limb 213 respectively extending in the circumferential direction on both faces opposite to both lid plates 201b, 201c of the clutch housing 201. Each of the driving engagement bodies 211 also has a third convex limb 214 extending in the circumferential direction on its outer peripheral face. In each of the driving engagement bodies 211, only the first convex limb 212 is in contact with the lid plate 201b, and only the third convex limb 214 is in contact with the inner peripheral face of the clutch housing 201. Therefore, a sliding resistance between the driving rotor 202 and the clutch housing 201 is small. It should be noted that the first and third convex limbs 212, 214 may not be necessarily in contact with the clutch housing 201.

The ball 203, which is made of metal, is held in a holding hole 202a formed in the driving rotor 202.

The driven rotor 204, which is made of a metal material, is overlain on the driving rotor 202 for rotation relative to the driving rotor 202. The driven rotor 204 has a plurality (three in this embodiment) of generally fan-shaped driven engagement bodies 220 which are arranged at equal angular intervals. Each of the driven engagement bodies 220 is located between two adjacent driving engagement bodies 211. The driven rotor 204 is in contact with the ball 203. The ball 203 permits smooth relative rotation between the driven rotor 204 and the driving rotor 202. The driven rotor 204 further has a fitting shaft 221 which protrudes outwardly from the lid plate 201c of the clutch housing 201. The fitting shaft 221 is fitted into the fitting hole 100a of the worm shaft 100 such that the worm shaft 100 rotates integrally with the driven rotor 204. It should be noted that the driven rotor 204 may be formed integrally with the worm shaft 100.

Each of the driven engagement bodies 220 has a first side face 220a opposite to the first side face 211a of the driving engagement body 211, and a second side face 220*b* opposite to the second side face 211*b* of the driving engagement body 211. The first side face 220*a* and the second side face 220*b* function as driven engagement faces. Each of the driven engagement bodies 220 further has a planar restriction face 220*c* opposite to the inner peripheral face of the clutch housing 201.

The rollers 205 as rolling bodies, which are made of a metal material, are located between the restriction faces 220*c* and the inner peripheral face of the clutch housing 201 between two adjacent driving engagement bodies 211. The rollers 205 extend in parallel with the axis of the driving rotor 202. The rollers 205 function as lock members.

The support member 206, which is made of a resin material, comprises a ring plate 225 positioned between the lid plate 201*c* of the clutch housing 201 and the driving engagement body 211, and three roller supports 226 axially extending from the ring plate 225 to rotatably hold the rollers 205. The roller supports 226 are arranged on the ring plate 225 at equal angular intervals.

In the driving engagement body 211, only the second convex limb 213 is in contact with the ring plate 225. Therefore, a sliding resistance between the driving rotor 202 and the ring plate 225 is small. The ring plate 225 has an annular convex limb 225*a* on a face opposite to the lid plate 201*c* of the clutch housing 201. In the ring plate 225, only the convex limb 225*a* is in contact with the lid plate 201*c*. Therefore, a sliding resistance between the ring plate 225 and the clutch housing 201 is small. These convex limbs 213, 225*a* may not be necessarily in contact with the opposing members 225, 201*c*.

Figure 42:
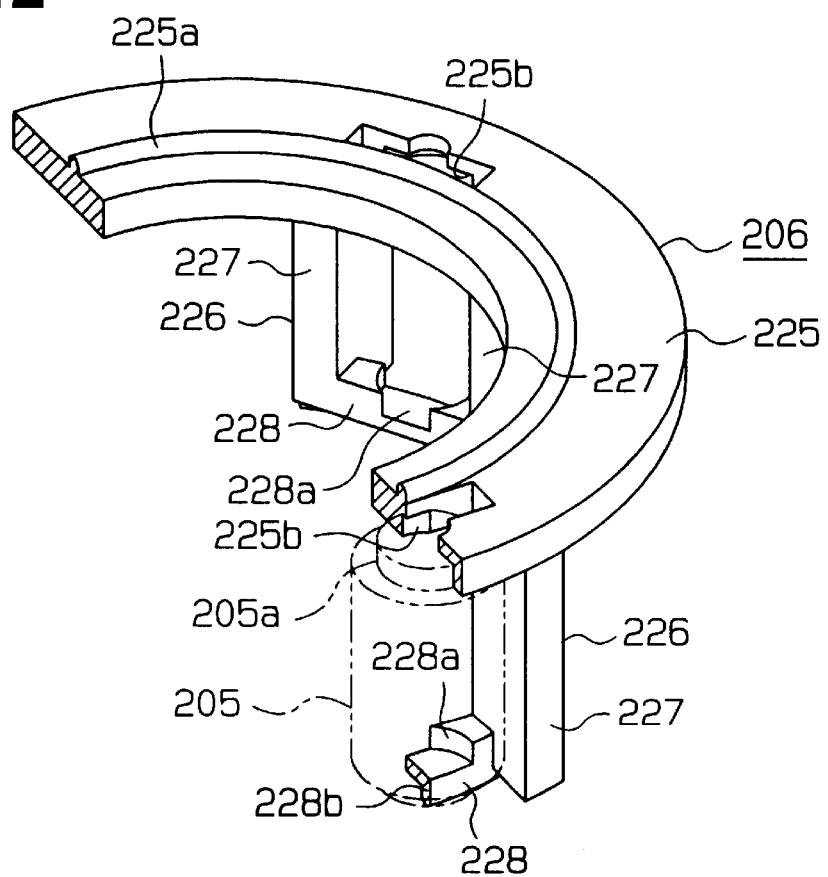
FIG. 42 is a partially cutaway perspective view illustrating a support member located in the clutch of FIG. 40.

As illustrated in FIGS. 40 and 42, each of the roller supports 226 comprises a pair of holding plates 227 axially extending from the ring plate 225 and positioned at predetermined intervals in the circumferential direction, and a coupler 228 for coupling ends of both holding plates 227 to each other. The interval between both holding plates 227 is slightly larger than the diameter of the rollers 205, so that the rollers 205 are rotatably held between both holding plates 227. The roller 205 have smaller diameter portions 205*a* at both ends. The smaller diameter portions 205*a* may be tapered just like both ends of the roller 86 illustrated in FIG. 19 or 30. The ring plate 225 has a holder 225*b* for rotatably holding one of the smaller diameter portions 205*a*, while the coupler 228 has a holder 228a for rotatably holding the other smaller diameter portion 205*a*. The distance between both holders 225*b*, 228*a* is slightly larger than the axial length of the rollers 205. The rollers 205 are slightly axially movable between both the holders 225*b*, 228*a*. The coupler 228 also has a convex limb 228*b* extending in the circumferential direction on a face opposite to the lid plate 201*b* of the clutch housing 201. As illustrated in FIG. 41, in the coupler 228, only the convex limb 228*b* is in contact with the lid plate 201*b*. Therefore, a sliding resistance between the coupler 228 and the clutch housing 201 is small. The convex limb 228*b* may not be necessarily in contact with the lid plate 201*b*.

The support member 206 is rotatable relative to the clutch housing 201 with the three rollers 205 held at equal angular intervals. The rollers 205 may only be restricted in movement in the circumferential direction of the support member 206, so that its movement in the radial direction of the support member 206 may be allowed.

As illustrated in FIG. 43(*a*), as the driving rotor 202 rotates in the clockwise direction, the first side face 211*a* of the driving engagement body 221 comes in contact with the first side face 220*a* of the driven engagement body 220 and the roller support 226. On the other hand, though not shown, as the driving rotor 202 rotates in the counterclockwise direction, the second side face 211*b* of the driving engagement body 211 comes in contact with the second side face 220*b* of the driven engagement body 220 and the roller support 226. In this event, as has been explained also with reference to FIGS. 33(*a*) and 33(*b*), the roller 205 is brought into a state in which it is not held between the inner peripheral face of the clutch housing 201 and the restriction face 220*c* of the driven engagement body 220, i.e., in the free state. Thus, the driven rotor 204 can rotate relative to the clutch housing 201, as it is pressed by the driving rotor 202. Likewise, the support member 206 rotates relative to the clutch housing 201 as it is pressed by the driving engagement body 211. The three rollers 205 held by the support member 206 circulate about the axial center of the driving rotor 202 while their relative positional relationship is held.

As illustrated in FIG. 43(*b*), as the driven rotor 204 itself rotates in the clockwise direction, the restriction face 220*c* moves toward the roller 205 such that the roller 205 is held between the restriction face 220*c* and the inner peripheral face of the clutch housing 201. Though not particularly shown, the same is true when the driven rotor 204 itself rotates in the counterclockwise direction. In this way, when the driven rotor 204 itself rotates, the roller 205 is brought into the lock state, as has been explained also with reference to FIGS. 34(*a*) and 34(*b*). Therefore, the rotation of the driven rotor 204 relative to the clutch housing 201, in other words, the unit housing 4 or 441 is blocked.

Since the operation when the roller 205 transits from the lock state to the free state is substantially similar to the operation explained with reference to FIGS. 35(*a*), 35(*b*), 36(*a*) and 36(*b*), explanation thereon is omitted.

As described above in detail, in this embodiment, the clutch 200 is previously assembled as a single unit, and the driving apparatus is assembled using the clutch 200 as a unit item. For this reason, the assembly of the driving apparatus can be facilitated, and the clutch 200 is readily managed.

Vibrations produced in the clutch 200 can be suppressed by the unit housing 4 or 441 which surrounds the clutch 200. In addition, if a buffer member such as rubber is provided between the clutch 200 and the unit housing 4 or 441, the vibrations of the clutch 200 can be more effectively suppressed.

The clutch 200 comprises the support member 206 for holding the relative positional relationship between the plurality of rollers 205. Therefore, the rollers 205 are maintained constant in their positional relationship in all states including the free state, so that they will never tremble in the clutch housing 201. This ensures the transition of the rollers 205 from the free state to the lock state and the reverse transition, and prevents strange noise and vibration from occurring associated with the trembling.

The convex limbs 212, 213, 214 minimize the contact areas of the driving rotor 202 to the clutch housing 201 and the support member 206. Also, the convex limbs 225*a*, 228*b* minimize the contact area of the support member 206 to the clutch housing 201. Therefore, the driving rotor 202 and the support member 206 can smoothly move with a small sliding resistance to the respective members opposing thereto.

Fourteenth Embodiment

Next, a fourteenth embodiment of the present invention will be described with reference to FIG. 44. This embodiment is an example of modifications to the clutch 200 in the embodiment of FIGS. 40 through 43. Specifically, as illustrated in FIG. 44, in this embodiment, the clutch housing 201 comprises a support cylinder 230 extending toward the motor 2. A bearing 231 is mounted to the support cylinder 230 for rotatably supporting the rotating shaft 80 of the motor 2. The bearing 231 is a radial bearing comprised of a slide bearing or a ball-and-roller bearing. By thus constructing, the bearing 418 (see FIG. 18 or 28) located in the brush holder 416 of the motor 2 can be omitted.

Fifteenth Embodiment

Figure 45:
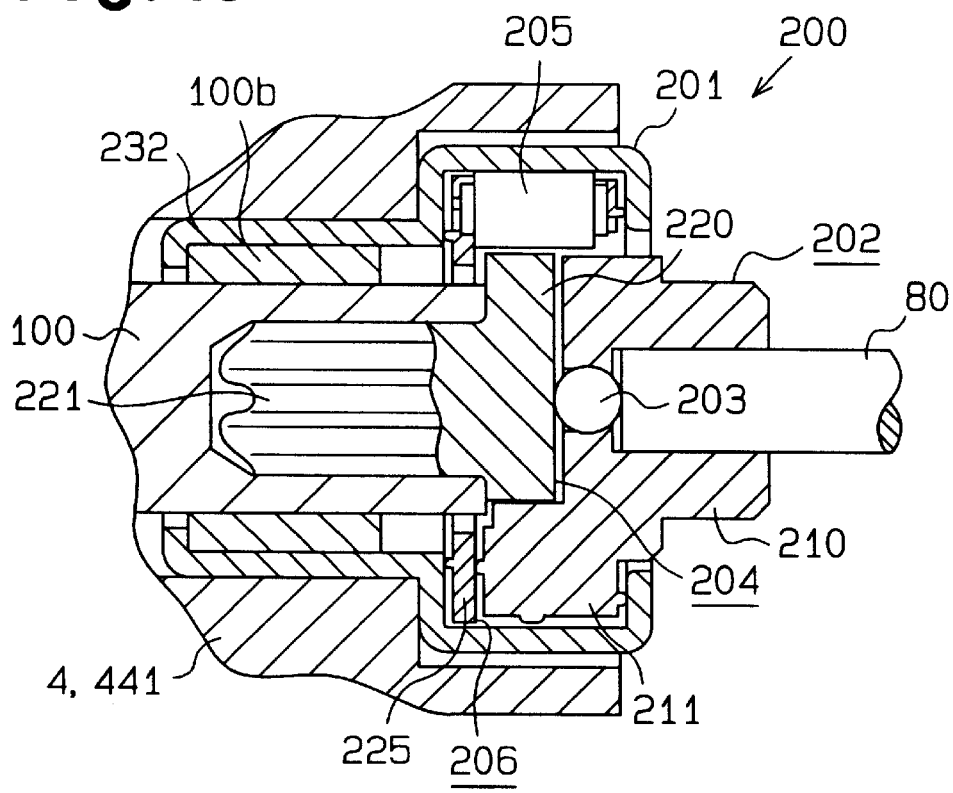
FIG. 45 is a cross-sectional view illustrating a clutch according to a fifteenth embodiment of the present invention.

Next, a fifteenth embodiment of the present invention will be described with reference to FIG. 45. This embodiment is an example of modifications to the clutch 200 in the embodiment of FIGS. 40 through 43. Specifically, as illustrated in FIG. 45, in this embodiment, the clutch housing 201 comprises a support cylinder 232 for mounting a slide bearing 100b for supporting one end of the worm shaft 100. The support cylinder 232 is press fitted into an insertion hole formed in the unit housing 4 or 441 for inserting the worm shaft 100 thereinto.

A clearance between the slide bearing 100b and the worm shaft 100 is extremely small. For this reason, when the slide bearing 100b has been mounted to the unit housing 4 or 441, it is difficult to perform a work for mounting the worm shaft 100 to the unit housing 4 or 441 such that it is inserted into the slide bearing 100b. However, when the slide bearing 100b has been mounted to the clutch housing 201, the worm shaft 100 can be readily inserted into the insertion hole of the unit housing 4 or 441. Moreover, since the slide bearing 100b has been previously assembled as a component of the clutch 200, the assembling work for the driving apparatus is facilitated as compared with the case where the slide bearing 100b alone is mounted to the unit housing 4 or 441.

Sixteenth Embodiment

Figure 46:
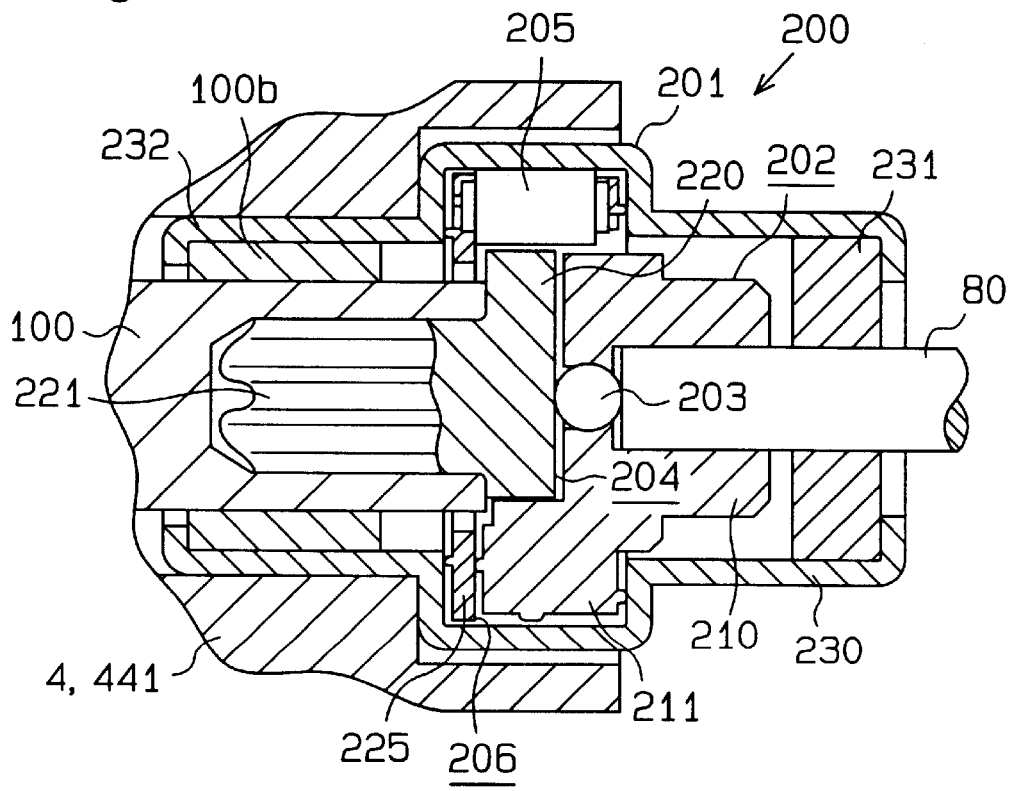
FIG. 46 is a cross-sectional view illustrating a clutch according to a sixteenth embodiment of the present invention.

Next, a sixteenth embodiment of the present invention will be described with reference to FIG. 46. This embodiment is a combination of the embodiment of FIG. 44 with the embodiment of FIG. 45. Specifically, as illustrated in FIG. 46, a clutch housing 201 of this embodiment comprises a support cylinder 230 for supporting the bearing 231, and a support cylinder 232 for supporting the bearing 100b.

Seventeenth Embodiment

Figure 47:
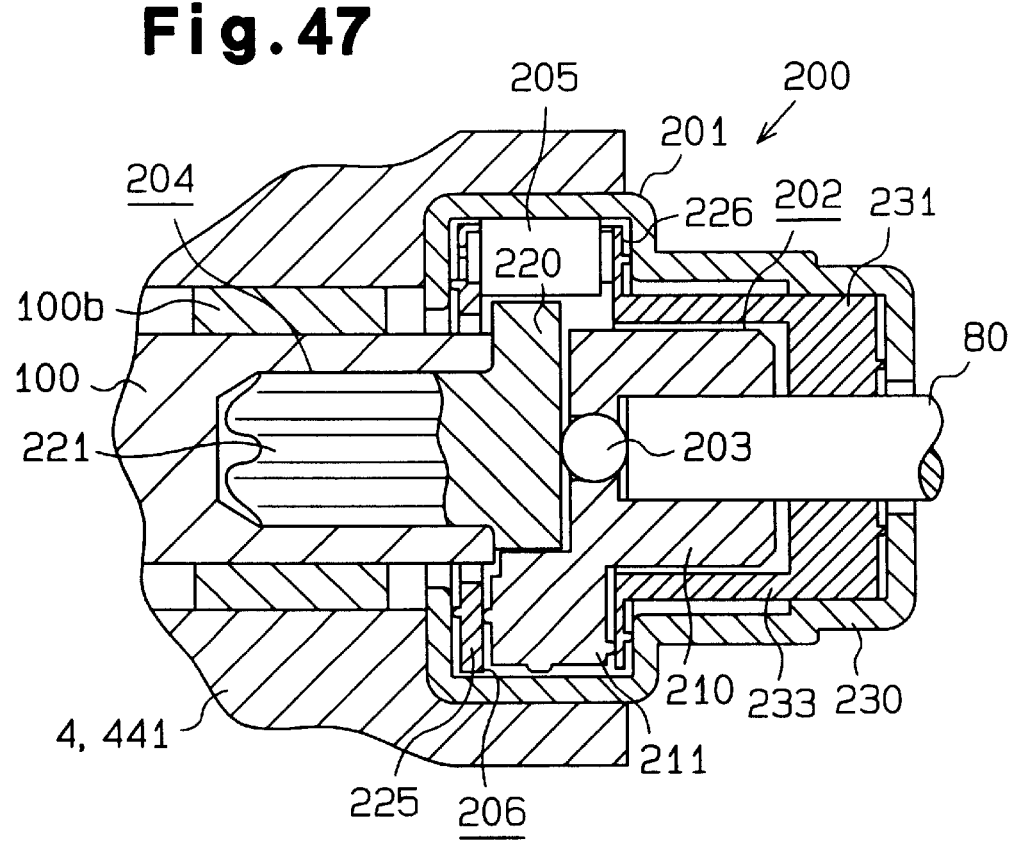
FIG. 47 is a cross-sectional view illustrating a clutch according to a seventeenth embodiment of the present invention.

Next, the seventeenth embodiment will be described with reference to FIG. 47. This embodiment is an example of modifications to the embodiment of FIG. 44. Specifically, as illustrated in FIG. 47, in this embodiment, the bearing 231 for supporting the rotating shaft 80 is formed integrally with the support member 206. The support member 206 has a coupling cylinder 233 which extends from an end of the roller support 226 to surround the fitting cylinder 210 of the driving rotor 202. The bearing 231 is connected to the coupling cylinder 233. In this way, the number of parts can be reduced to result in a reduction in the cost.

Eighteenth Embodiment

Figure 48:
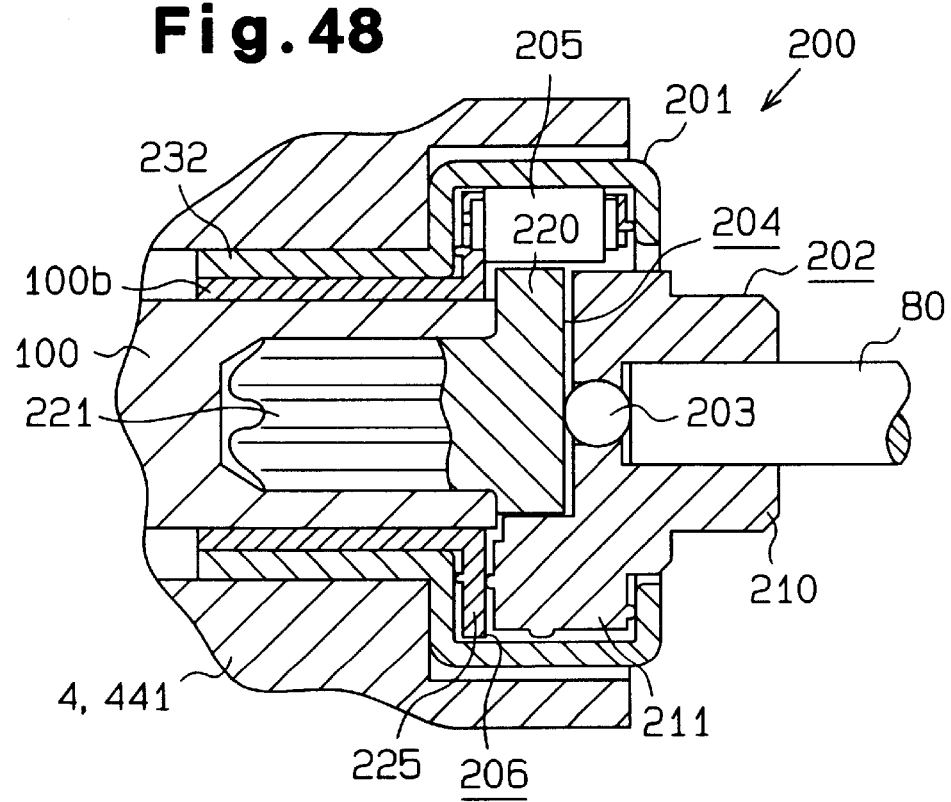
FIG. 48 is a cross-sectional view illustrating a clutch according to an eighteenth embodiment of the present invention.

Next, a eighteenth embodiment of the present invention will be described with reference to FIG. 48. This embodiment is an example of modifications to the embodiment of FIG. 45. Specifically, as illustrated in FIG. 48, in this embodiment, the bearing 100b for supporting the worm shaft 100 is formed integrally with the support member 206. The bearing 100b extends from the ring plate 225 of the support member 206. In this way, the number of parts can be reduced to result in a reduction in the cost.

Nineteenth Embodiment

Next, a nineteenth embodiment of the present invention will be described with reference to FIGS. 49 through 51. This embodiment is a further example of modifications to the clutch. A driving apparatus to which the clutch of this embodiment is applied may be any of the driving apparatus illustrated in the aforementioned embodiments of FIGS. 17 through 22 or FIGS. 27 through 37. Therefore, parts other than the clutch are indicated by the reference numerals used in the embodiments of FIGS. 1 through 28.

Any of the clutches in the respective embodiments in FIGS. 1 through 48 described above hold the rollers (lock members) in the radial direction of the clutch and thereby bring them into the lock state. In contract, the clutch of this embodiment holds the balls (lock members) in the axial direction of the clutch and thereby brings them into the lock state.

Figure 49:
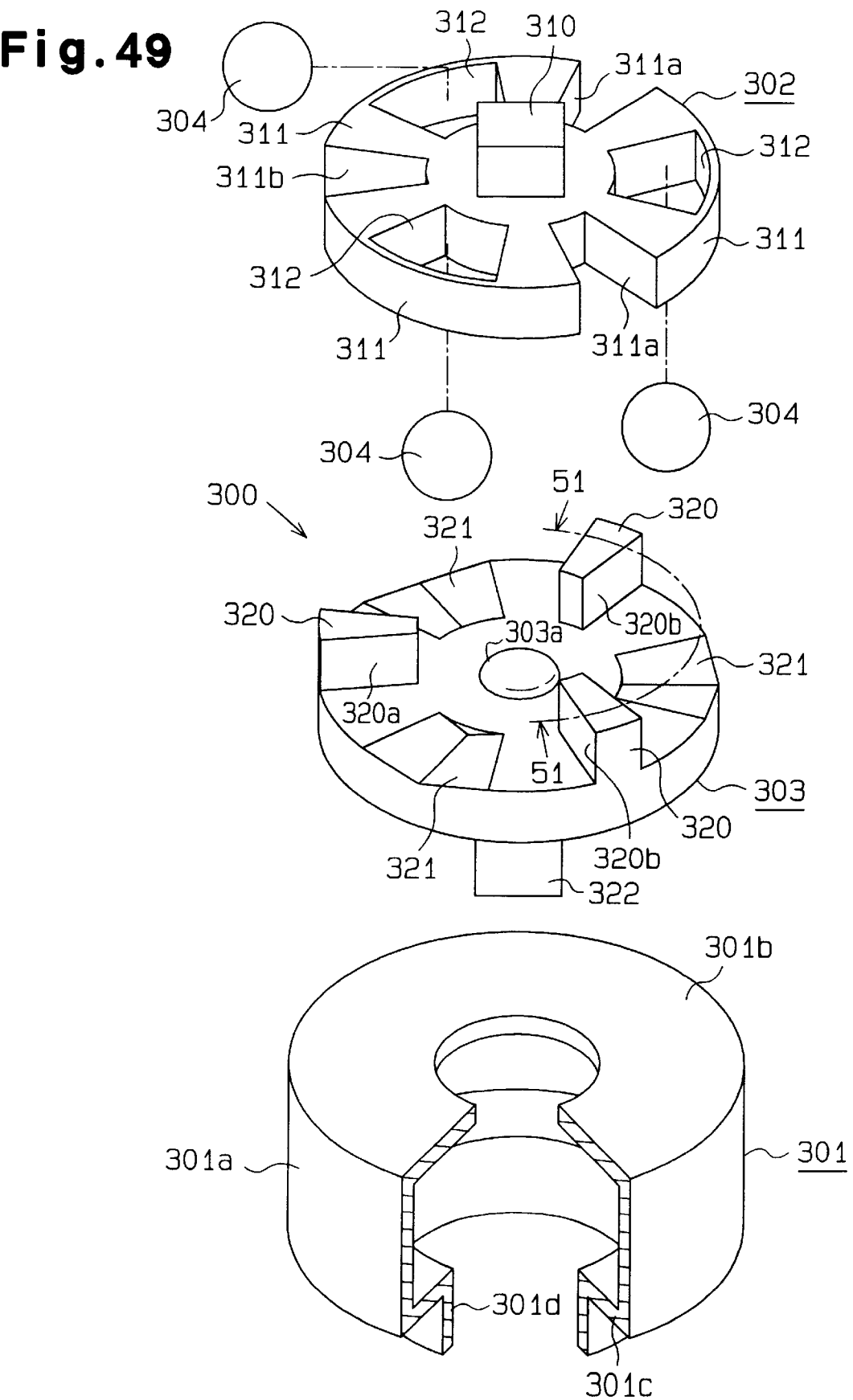
FIG. 49 is an exploded perspective view illustrating a clutch according to a nineteenth embodiment of the present invention.
Figure 50:
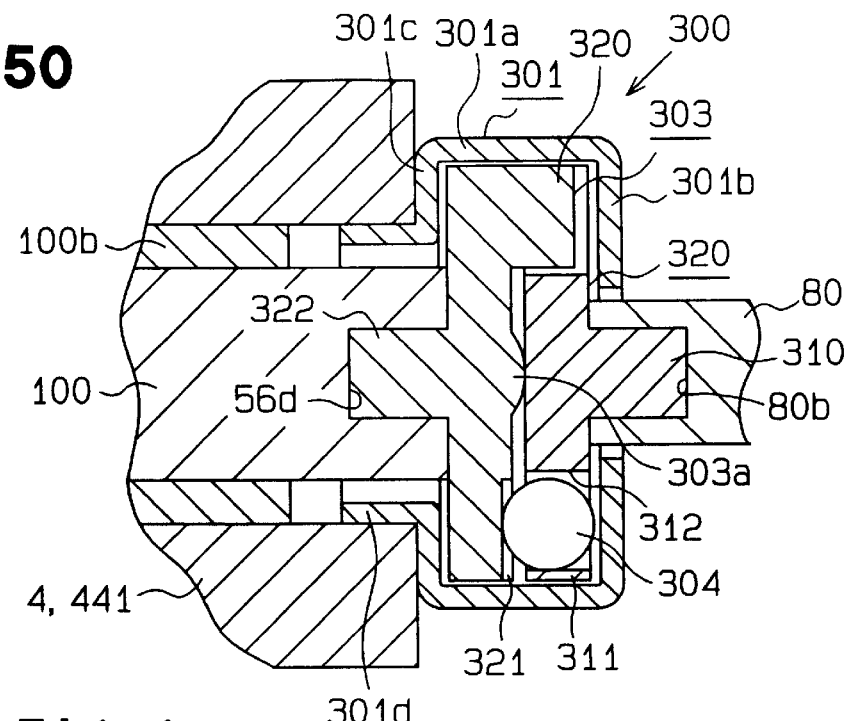
FIG. 50 is a cross-sectional view of the clutch of FIG. 49.

As illustrated in FIGS. 49 and 50, a clutch 300 of this embodiment comprises a clutch housing 301, a driving rotor 302, a driven rotor 303, and a plurality (three in this embodiment) of balls 304. The driving rotor 302, the driven rotor 303 and the balls 304 are assembled into the clutch housing 301 in such a manner that they cannot be removed therefrom. Then, the driving apparatus is assembled using the clutch 300 which has been previously assembled as a single unit.

As illustrated in FIG. 50, the clutch 300 is fixed to the unit housing 4 or 441 in a manner disabling the rotation relative to it to couple the rotating shaft 80 of the motor 2 to the worm shaft 100. However, the clutch 300 may be attached to the motor 2, preferably to the brush holder 416 (see FIG. 18 or 28).

As illustrated in FIGS. 49 and 50, the clutch housing 301, which is made of a metal material, comprises a cylindrical body 301a, annular lid plates 301b, 301c located at openings on both ends of the cylindrical body 301a, and a mounting cylinder 301d extending from the lid plate 301c. The lid plates 301b, 301c are formed, for example, by bending both ends of the cylindrical body 301a toward the inside, for restricting axial movements of parts within the clutch housing 301. The mounting cylinder 301d is fitted into the unit housing 4 or 441.

The driving rotor 302, which is formed of a resin material and in a generally disc-shape, comprises a fitting shaft 310 protruding outward from the lid plate 301b of the clutch housing 301. The fitting shaft 310 is fitted into a hole 80b which is formed at a distal end of the rotating shaft 80. Therefore, the driving rotor 302 is coupled to the rotating shaft 80 for rotation integral therewith. The driving rotor 302 further comprises a plurality (three in this embodiment) of driving engagement bodies 311 arranged at equal angular intervals. Each of the driving engagement bodies 311 generally has a fan shape, and has a first side face 311a and second side face 311b on both circumferential sides. A slight gap is formed between the outer peripheral faces of the driving engagement bodies 311 and the inner peripheral face of the clutch housing 301.

Each of the driving engagement bodies 311 has an accommodating hole 312 at its circumferential intermediate location. The ball 304 as a rolling body is located in the accommodating hole 312. The ball 304 functions as a lock member.

The driven rotor 303, which is formed of a resin material and in a generally disc shape, is overlapped with the driving rotor 302 for rotation relative to the driving rotor 302. The driven rotor 303 is formed with a hemispherical protrusion 303a at the center thereof, and the protrusion 303a is in contact with the driving rotor 302. The protrusion 303a permits smooth relative rotation between the driven rotor 303 and the driving rotor 302.

The driven rotor 303 comprises a fitting shaft 322 which protrudes outward from the mounting cylinder 301d of the clutch housing 301. The fitting shaft 322 is fitted into the fitting hole 100a of the worm shaft 100 such that the worm shaft 100 rotates integrally with the driven rotor 303. It should be noted that the driven rotor 303 may be formed integrally with the worm shaft 100.

The driven rotor 303 has a plurality (three in this embodiment) of driven engagement bodies 320 arranged at equal angular intervals. Each of the driven engagement bodies 320 is located between two adjacent driving engagement bodies 311. Each of the driven engagement bodies 320 has a first side face 320a opposite to the first side face 311a of the driving engagement body 311, and a second side face 320b opposite to the second side face 311b of the driving engagement body 311. The first side face 320a and the second side face 320b function as the driven engagement faces. The driven rotor 303 further has a V-shaped restriction face 321 which defines a V-shaped groove between the two adjacent driven engagement bodies 320. The balls 304 located in the accommodating holes 312 of the driving engagement bodies 311 are located between the restriction faces 321 and the lid plate 301b of the clutch housing 301.

Figure 51A:
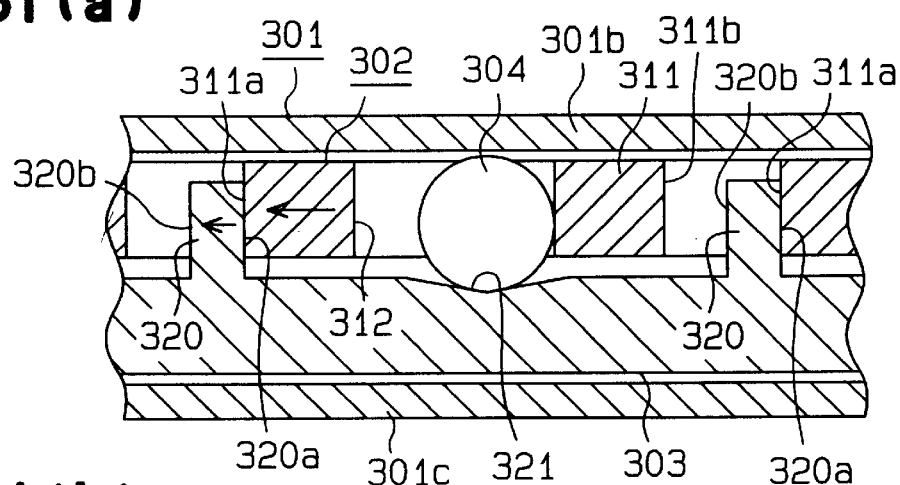
FIGS. 51(a) and 51(b) are partial cross-sectional views for explaining the operation of the clutch of FIG. 49.
Figure 51B:
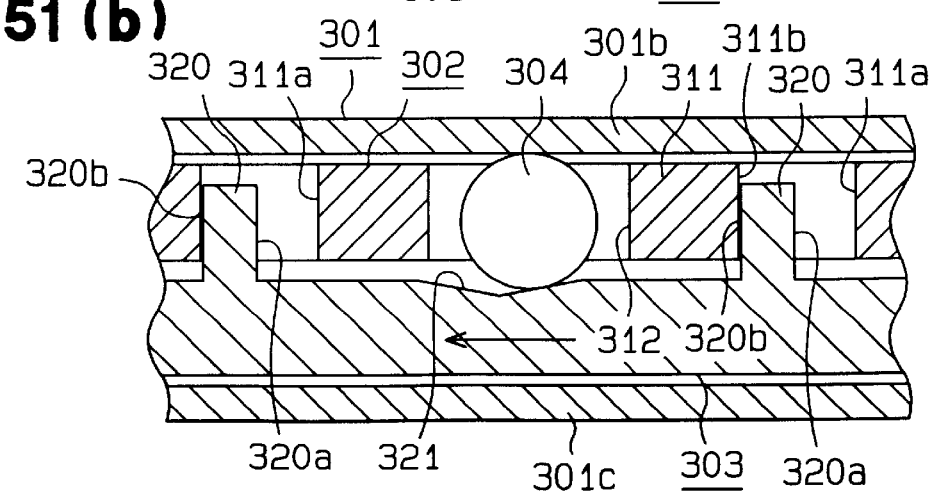
Figure 52:
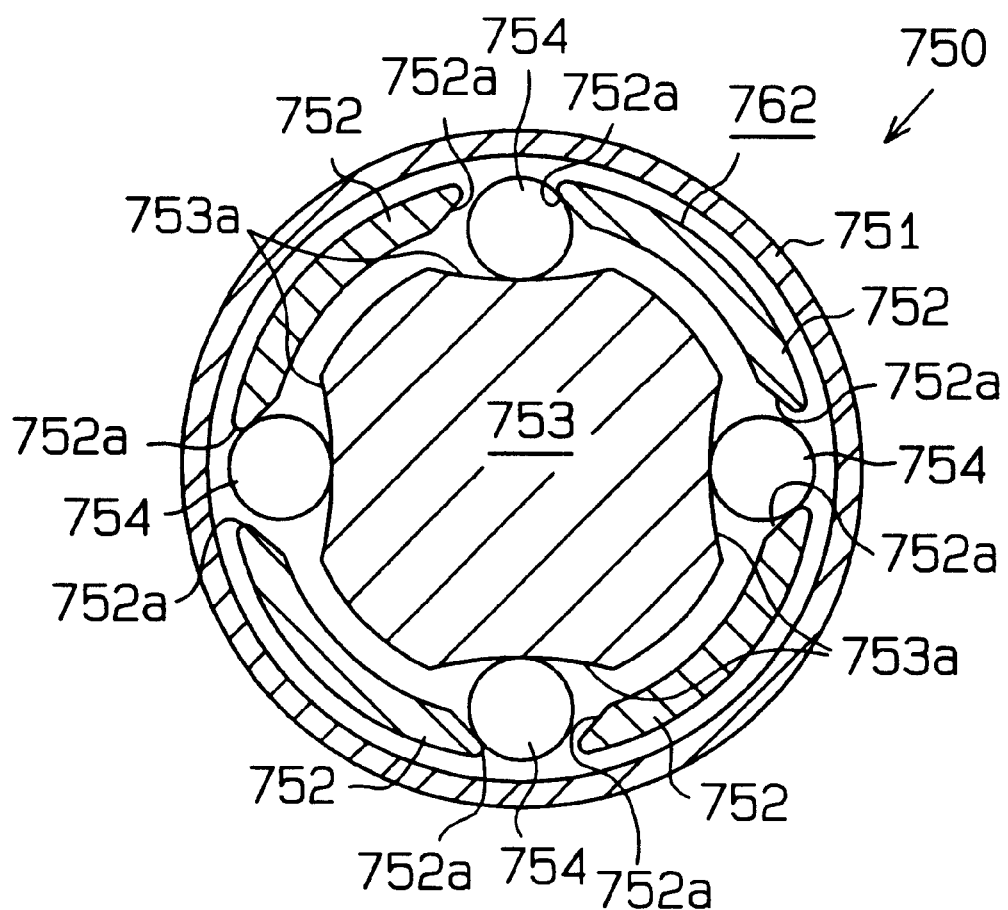
FIG. 52 is a plane cross-sectional view illustrating the clutch of prior art.

FIGS. 51(a) and 51(b) are cross-sectional views illustrating a portion of the clutch 300 (a portion corresponding to a line 51—51 in FIG. 49) in development. As the driving rotor 302 in FIG. 49 rotates in the clockwise direction, the first side face 311a of the driving engagement body 311 comes in contact with the first side face 320a of the driven engagement body 320, and the inner side face (pressing face) of the accommodating hole 312 comes in contact with the ball 304, as illustrated in FIG. 51(a). On the other hand, though not shown, as the driving rotor 302 in FIG. 49 rotates in the counterclockwise direction, the second side face 311b of the driving engagement body 311 comes in contact with the second side face 320b of the driven engagement body 320, and the inner side face of the accommodating hole 312 comes in contact with the ball 304. In this event, as has been explained also with reference to FIGS. 33(a) and 33(b), the ball 304 is in a state in which it is not held between the lid plate 301b of the clutch housing 301 and the restriction face 321, i.e., in the free state. Therefore, the driven rotor 303 can rotate relative to the clutch housing 301 as it is pressed by the driving rotor 302. Likewise, the ball 304 circulates about the axial center of the driving rotor 302 as it is pressed by the driving rotor 302.

When the driven rotor 303 itself illustrated in FIG. 49 rotates in the clockwise direction, the restriction face 321 moves toward the ball 304 such that the ball 304 is held between the restriction face 321 and lid plate 301b of the clutch housing 301, as illustrated in FIG. 51(b). Though not particularly shown, the same is true when the driven rotor 303 itself illustrated in FIG. 49 rotates in the counterclockwise direction. In this way, when the driven rotor 303 itself rotates, the ball 304 are brought into the lock state, as has been explained also with reference to FIGS. 34(a) and 34(b). Therefore, the rotation of the driven rotor 303 relative to the clutch housing 301, in other words, the unit housing 4 or 441 is blocked.

In the clutch 300 of this embodiment described above, substantially similar actions and effects can also be provided to those of the clutches in the aforementioned respective embodiments. While in this embodiment, the balls 304 are used as rolling bodies, conical rollers may be used instead of the balls 304.

The embodiments of the present invention are not limited to the foregoing embodiments, but may be modified in the following manner.

In the embodiment of FIGS. 1 through 8 or the embodiment of FIGS. 9 through 13, the second engagement holes 24, 63 of the driving rotors 11, 52 may be omitted, and the second engagement bodies 42, 72 of the driven rotors 12, 53 may be omitted.

The number of rollers 14, 54, 86, 205 or balls 304, 119 as rolling bodies is not limited to three, but may be at least one or more.

The driving rotor may be formed of a material other than synthetic resin. Also, the driven rotor may be formed of synthetic resin.

The structures of the clutches in the respective embodiments in FIGS. 1 through 51 described above are merely illustrative, and any structure may be employed as a clutch as long as it does not depart from the gist of the present invention.

The driving apparatus of the present invention is not limited to the power window apparatus but may be applied to driving apparatus for driving a variety of driven devices. In this case, a driving source of the driving apparatus may not be a motor, and a manually operated handle, for example, may be used as a driving source of the driving apparatus.

What is claimed is:

1. A clutch comprising:
a driving rotor coupled to a driving source, wherein the driving rotor has a driving engagement body;
a driven rotor directly engaged with the driving rotor such that the driven rotor is driven by the driving rotor, wherein the driven rotor has a driven engagement body that is opposite to the driving engagement body and is directly pressed by the driving engagement body in the circumferential direction of the driven rotor, and wherein rotation of the driving rotor is transmitted from the driving engagement body to the driven rotor through the driven engagement body;
a housing for accommodating the driving rotor and the driven rotor; and
a lock member located between the driven rotor and the housing, wherein, when the driven rotor itself is rotated, the lock member is held between the driven rotor and the housing to block rotation of the driven rotor relative to the housing, and wherein, when the driving source rotates the driving rotor, the lock member is released from the held state to allow the driving rotor to rotate the driven rotor relative to the housing and is circulated about an axial center of the driving rotor without being held between the driving rotor and the driven rotor.

2. The clutch according to claim 1, wherein, when the driving source rotates the driving rotor, the driving rotor directly contacts the lock member to press the lock member in the circumferential direction of the driving rotor.

3. The clutch according to claim 1, wherein the lock member is one of a plurality of lock members located about the axial center of the driving rotor, wherein, when the driven rotor rotates either in a first direction or in a second direction opposite thereto, each of the lock members is held between the driven rotor and the housing.

4. The clutch according to claim 3, wherein the driven rotor has a plurality of restriction faces provided in one-to-one correspondence to the lock members, wherein each of the lock members is held between the corresponding restriction face and the housing.

5. The clutch according to claim 1, wherein the driven rotor has a restriction face opposite to the housing through the lock member, wherein, when the driven rotor rotates in a first direction and in a second direction opposite thereto, the restriction face moves relative to the lock member such that the lock member is held between the restriction face and the housing.

6. The clutch according to claim 1, wherein the driven rotor has a restriction face opposite to the housing through the lock member, wherein the restriction face has an intermediate portion and both side portions separated from the intermediate portion in the circumferential direction of the driven rotor, and a distance between the restriction face and the housing becomes smaller from the intermediate portion to both the side portions.

7. The clutch according to claim 6, wherein the lock member has a diameter that is smaller than the distance between the intermediate portion of the restriction face and the housing and is larger than a distance between both the side portions of the restriction face and the housing, and the lock member is not held between the restriction face and the housing when the lock member is located at a position corresponding to the intermediate portion of the restriction face.

8. The clutch according to claim 6, wherein the driving rotor has a pressing face for pressing the lock member in the circumferential direction of the driving rotor, wherein, when the driving engagement body contacts the driven engagement body and when the pressing face contacts the lock member, the lock member is located at a position corresponding to the intermediate portion of the restriction face.

9. The clutch according to claim 1, wherein the driving engagement body or the driven engagement body comprises a buffer member.

10. The clutch according to claim 8, wherein the pressing face comprises a buffer member.

11. The clutch according to claim 8, wherein the driving rotor is entirely formed of a material capable of relieving an impulse.

12. The clutch according to claim 6, wherein the restriction face is generally V-shaped in cross section.

13. The clutch according to claim 6, wherein the restriction face comprises a single planar surface.

14. The clutch according to claim 4, wherein the housing has an inner peripheral face, and the restriction face opposes the inner peripheral face of the housing such that the lock member is held between the restriction face and the inner peripheral face of the housing.

15. The clutch according to claim 4, wherein the housing has an inner wall surface substantially perpendicular to the axis of the driven rotor, and the restriction face opposes the inner wall surface of the housing such that the lock member is held between the restriction face and the inner wall surface of the housing.

16. The clutch according to claim 1, further comprising restriction means for restricting a movement of the lock member in an axial direction of the driving rotor.

17. The clutch according to claim 16, wherein the restriction means includes urging means for urging the lock member in the axial direction of the driving rotor.

18. The clutch according to claim 17, wherein the restriction means includes a pair of restriction plates located to sandwich the lock member in the axial direction of the driving rotor, and the urging means is located between one of the restriction plates and the lock member.

19. The clutch according to claim 16, wherein the restriction means includes a pair of restriction plates located to sandwich the lock member in the axial direction of the driving rotor, and at least one of the restriction plates is made of a resin material.

20. The clutch according to claim 1, wherein the lock member includes a cylindrical roller or a ball.

21. The clutch according to claim 20, wherein the cylindrical roller has both axial ends and a middle portion located between the axial ends, wherein the diameter of each axial end is smaller than that of the middle portion.

22. The clutch according to claim 1, wherein the lock member is one of a plurality of lock members located about the axial center of the driving rotor, and a support member is provided for supporting the lock members to maintain a relative positional relationship between the lock members.

23. The clutch according to claim 22, wherein the driving source is a motor that has a rotating shaft coupled to the driving rotor, wherein a bearing for supporting the rotating shaft is provided integrally with the support member.

24. The clutch according to claim 22, wherein a worm shaft forming part of a worm gear mechanism is coupled to the driven rotor, wherein a bearing for supporting the worm shaft is provided integrally with the support member.

25. The clutch according to claim 1, wherein the driving source is a motor that has a rotating shaft coupled to the driving rotor, wherein a bearing for supporting the rotating shaft is attached to the housing.

26. The clutch according to claim 1, wherein a worm shaft forming part of a worm gear mechanism is coupled to the driven rotor, wherein a bearing for supporting the worm shaft is attached to the housing.

27. The clutch according to claim 1, further comprising a spherical member located between the driven rotor and the driving rotor to prevent the driven rotor from being pressed against the driving rotor in the axial direction of the driven rotor.

28. The clutch according to claim 27, wherein the spherical member is a ball.

29. The clutch according to claim 28, wherein the ball is received by the driving rotor.

30. The clutch according to claim 1, wherein the driven rotor has a hemispherical protrusion, which protrudes in the axial direction of the driven rotor, wherein the hemispherical protrusion is located between the driven rotor and the driving rotor to prevent the driven rotor from being pressed against the driving rotor in the axial direction of the driven rotor.

31. The clutch according to claim 1, wherein the driven engagement body is one of a plurality of driven engagement bodies, which are arranged at equal angular intervals, each driven engagement body being formed generally in a fan shape.

32. The clutch according to claim 31, wherein the number of the driven engagement bodies is three.

33. The clutch according to claim 1, wherein the driving rotor is made of a resin material, and the driven rotor is made of a metal material.

34. A clutch comprising:
  a driving rotor coupled to a driving source, wherein the driving rotor has a driving engagement body;
  a driven rotor directly engaged with the driving rotor such that the driven rotor is driven by the driving rotor, wherein the driven rotor has a driven engagement body that is opposite to the driving engagement body and is directly pressed by the driving engagement body in the circumferential direction of the driven rotor, wherein rotation of the driving rotor is transmitted from the driving engagement body to the driven rotor through the driven engagement body, and wherein at least one of the driving engagement body and the driven engagement body comprises a buffer member;
  a housing for accommodating the driving rotor and the driven rotor; and
  a lock member located between the driven rotor and the housing, the lock member being circulated about an axial center of the driving rotor associated with rotation of the driving rotor, wherein the lock member is held between the driven rotor and the housing to block rotation of the driven rotor relative to the housing when the driven rotor itself is rotated, and the lock member is released from the held state to allow the driving rotor to rotate the driven rotor relative to the housing when the driving source rotates the driving rotor.

35. The clutch according to claim 34, wherein the buffer member is made of rubber.

36. A driving apparatus for driving a driven device, comprising:
   a motor having a rotating shaft;
   an output unit coupled to the motor, the output unit having a decelerating mechanism for decelerating rotation of the rotating shaft before transmission to the driven device; and
   a clutch located between the rotating shaft and the decelerating mechanism, wherein the clutch includes:
      a driving rotor coupled to the rotating shaft, wherein the driving rotor has a driving engagement body;
      a driven rotor coupled to the decelerating mechanism, wherein the driven rotor is directly engaged with the driving rotor such that the driven rotor is driven by the driving rotor, wherein the driven rotor has a driven engagement body that is opposite to the driving engagement body and is directly pressed by the driving engagement body in the circumferential direction of the driven rotor, and wherein rotation of the driving rotor is transmitted from the driving engagement body to the driven rotor through the driven engagement body;
      a housing for accommodating the driving rotor and the driven rotor; and
      a lock member located between the driven rotor and the housing, wherein, when the driven rotor is rotated by the force applied to the driven device, the lock member is held between the driven rotor and the housing to block rotation of the driven rotor relative to the housing, and wherein, when the rotating shaft rotates the driving rotor, the lock member is released from the held state to allow the driving rotor to rotate the driven rotor relative to the housing and is circulated about an axial center of the driving rotor without being held between the driving rotor and the driven rotor.

37. The driving apparatus according to claim 36, wherein the decelerating mechanism includes a worm shaft separated from the rotating shaft and a worm wheel meshed with the worm shaft, wherein the clutch is located between the rotating shaft and the worm shaft and allows the rotating shaft and the worm shaft to be misaligned with each other.

38. The driving apparatus according to claim 36, wherein the driven device is a lifting mechanism for moving up and down a windowpane.

39. A driving apparatus for driving a driven device, comprising:
   a motor having a rotating shaft;
   an output unit coupled to the motor, the output unit having a decelerating mechanism for decelerating rotation of the rotating shaft before transmission to the driven device; and
   a clutch located between the decelerating mechanism and the driven device in the output unit, wherein the clutch includes:
      a driving rotor coupled to the decelerating mechanism, wherein the driving rotor has a driving engagement body;
      a driven rotor coupled to the driven device, wherein the driven rotor is directly engaged with the driving rotor such that the driven rotor is driven by the driving rotor, wherein the driven rotor has a driven engagement body that is opposite to the driving engagement body and is directly pressed by the driving engagement body in the circumferential direction of the driven rotor, and wherein rotation of the driving rotor is transmitted from the driving engagement body to the driven rotor through the driven engagement body;
      a housing for accommodating the driving rotor and the driven rotor; and
      a lock member located between the driven rotor and the housing, wherein, when the driven rotor is rotated by the force applied to the driven device, the lock member is held between the driven rotor and the housing to block rotation of the driven rotor relative to the housing, and wherein, when the decelerating mechanism rotates the driving rotor, the lock member is released from the held state to allow the driving rotor to rotate the driven rotor relative to the housing and is circulated about an axial center of the driving rotor without being held between the driving rotor and the driven rotor.

40. The driving apparatus according to claim 39, wherein the decelerating mechanism includes a worm shaft, a worm wheel meshed with the worm shaft, and a unit housing, wherein the unit housing includes a worm accommodating portion for accommodating the worm shaft and a wheel accommodating portion for accommodating the worm wheel, and wherein the clutch is accommodated in the wheel accommodating portion.

41. The driving apparatus according to claim 39, wherein the driven device is a lifting mechanism for moving up and down a windowpane.

42. A clutch comprising:
   a driving rotor coupled to a driving source;
   a driven rotor directly engaged with the driving rotor in the rotational direction of the driven rotor such that the driven rotor is driven by the driving rotor;
   a spherical member located between the driven rotor and the driving rotor to prevent the driven rotor from being pressed against the driving rotor in the axial direction of the driven rotor;
   a housing for accommodating the driving rotor and the driven rotor; and
   a lock member located between the driven rotor and the housing, the lock member being circulated about an axial center of the driving rotor associated with rotation of the driving rotor, wherein the lock member is held between the driven rotor and the housing to block rotation of the driven rotor relative to the housing when the driven rotor itself is rotated, and the lock member is released from the held state to allow the driving rotor to rotate the driven rotor relative to the housing when the driving source rotates the driving rotor.

43. The clutch according to claim 42, wherein the spherical member is a ball.

44. The clutch according to claim 42, wherein the ball is received by the driving rotor.

* * * * *

UNITED STATES PATENT AND TRADEMARK OFFICE
CERTIFICATE OF CORRECTION

PATENT NO. : 6,575,277 B1
DATED : June 10, 2003
INVENTOR(S) : Katsuhiko Torii, Hiroaki Yamamoto and Shinji Oka It is certified that error appears in the above-identified patent and that said Letters Patent is hereby corrected as shown below:

<u>Title page,</u>
Item [54], Title, please delete "DRIVE DEVICE HAVING" and insert
-- DRIVING APPARATUS EQUIPPED WITH --.

Signed and Sealed this

Seventh Day of October, 2003

JAMES E. ROGAN
*Director of the United States Patent and Trademark Office*